(12) United States Patent
Berardi et al.

(10) Patent No.: US 7,607,583 B2
(45) Date of Patent: *Oct. 27, 2009

(54) CLEAR CONTACTLESS CARD

(75) Inventors: Michael J Berardi, Fort Lauderdale, FL (US); Michael Bliman, Matawan, NJ (US); David S Bonalle, New Rochell, NY (US); Jennifer Anne Elwood, Okimos, MI (US); Becky Vander Eyk, Rochester Hills, MI (US); Matthew C Hood, Wayne, PA (US); Susan E Isenberg, New York, NY (US); Leigh Malnati, Mountain Lakes, NJ (US); Alexandra Mayers, New York, NY (US); Sue Mueller, Phoenix, AZ (US); Zarita Norcross, Glendale, AZ (US); Peter D Saunders, Salt Lake City, UT (US); Kathryn D Scheding, New York, NY (US); Sejal Ajit Shah, New York, NY (US); Lisa Skilling-Belmond, New York, NY (US); John R Williamson, Jersey City, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 11/871,981

(22) Filed: Oct. 13, 2007
(Under 37 CFR 1.47)

(65) Prior Publication Data

US 2008/0203172 A1 Aug. 28, 2008

Related U.S. Application Data

(63) Continuation of application No. 10/611,563, filed on Jun. 30, 2003, now Pat. No. 7,306,158, which is a continuation-in-part of application No. 10/192,488, filed on Jul. 9, 2002, now Pat. No. 7,239,226, said application No. 10/611,563 is a continuation-in-part of application No. 10/394,914, filed on Mar. 21, 2003, now Pat. No. 7,377,443, and a continuation-in-part of application No. 10/302,658, filed on Nov. 22, 2002, now abandoned, and a continuation-in-part of application No. 10/288,945, filed on Nov. 6, 2002, now abandoned, and a continuation-in-part of application No. 10/062,106, filed on Jan. 31, 2002, now Pat. No. 6,749,123.

(60) Provisional application No. 60/427,977, filed on Nov. 20, 2002, provisional application No. 60/304,216, filed on Jul. 10, 2001.

(51) Int. Cl.
*G06K 19/00* (2006.01)

(52) U.S. Cl. .................. 235/487; 235/492; 235/380

(58) Field of Classification Search .............. 235/492, 235/380, 487
See application file for complete search history.

(56) References Cited

U.S. PATENT DOCUMENTS

D61,466 S 9/1922 Foltz (Continued)

FOREIGN PATENT DOCUMENTS

AT 80091 9/1992

(Continued)

OTHER PUBLICATIONS

Specimen of credit card offered for sale at least as early as Feb. 1974.
PV-7A, Ultra Compact Color Camera (Date unknown).

(Continued)

*Primary Examiner*—Seung H Lee
*Assistant Examiner*—Christle I Marshall
(74) *Attorney, Agent, or Firm*—Snell & Wilmer L.L.P.

(57) ABSTRACT

The present invention relates to a process for producing an transparent or translucent transaction card having multiple features, such as a holographic foil, integrated circuit chip, RFID circuitry, silver magnetic stripe with text on the magnetic stripe, opacity gradient, an invisible optically recognizable compound, a translucent signature field such that the RFID circuitry and signature on back of the card is visible from the front of the card and an active thru date on the front of the card. The invisible optically recognizable compound is an infrared ink and/or film, which can be detected by a sensor found in an ATM or card assembly line.

21 Claims, 33 Drawing Sheets

U.S. PATENT DOCUMENTS

| | | |
|---|---|---|
| 3,536,894 A | 10/1970 | Travioli |
| 3,553,435 A | 1/1971 | Pike |
| 3,566,120 A | 2/1971 | Lane, Jr. |
| 3,573,731 A | 4/1971 | Schwend |
| 3,725,647 A | 4/1973 | Retzky |
| 3,763,356 A | 10/1973 | Berler |
| 3,829,662 A | 8/1974 | Furahashi |
| 3,836,754 A | 9/1974 | Toye et al. |
| 3,838,252 A | 9/1974 | Hynes et al. |
| 3,873,813 A | 3/1975 | Lahr et al. |
| 3,894,756 A | 7/1975 | Ward |
| 3,919,447 A | 11/1975 | Kilmer, Jr. et al. |
| 3,922,430 A | 11/1975 | Mayer |
| 3,955,295 A | 5/1976 | Mayer |
| 3,987,725 A | 10/1976 | Scantlin |
| 4,044,231 A | 8/1977 | Beck et al. |
| 4,058,839 A | 11/1977 | Darjany |
| 4,106,857 A | 8/1978 | Snitzer |
| 4,119,361 A | 10/1978 | Greenaway |
| 4,202,491 A | 5/1980 | Suzuki |
| 4,361,757 A | 11/1982 | Ehrat |
| D270,546 S | 9/1983 | Malmberg |
| D270,548 S | 9/1983 | Rimer |
| 4,436,991 A | 3/1984 | Albert et al. |
| 4,504,084 A | 3/1985 | Jauch |
| 4,519,155 A | 5/1985 | Gallagher et al. |
| D280,214 S | 8/1985 | Opel |
| 4,538,059 A | 8/1985 | Rudland |
| 4,544,836 A | 10/1985 | Galvin et al. |
| 4,547,002 A | 10/1985 | Colgate, Jr. |
| 4,563,024 A | 1/1986 | Blyth |
| 4,583,766 A | 4/1986 | Wessel |
| 4,593,936 A | 6/1986 | Opel |
| 4,597,814 A | 7/1986 | Colgate, Jr. |
| 4,641,017 A | 2/1987 | Lopata |
| 4,672,021 A | 6/1987 | Blumel et al. |
| 4,684,795 A | 8/1987 | Colgate, Jr. |
| 4,692,394 A | 9/1987 | Drexler |
| 4,694,148 A | 9/1987 | Diekemper et al. |
| 4,697,073 A | 9/1987 | Hara |
| 4,711,690 A | 12/1987 | Haghiri-Tehrani |
| 4,779,898 A | 10/1988 | Berning et al. |
| 4,794,142 A | 12/1988 | Alberts et al. |
| 4,795,894 A | 1/1989 | Sugimoto et al. |
| 4,837,134 A | 6/1989 | Bouldin et al. |
| 4,852,911 A | 8/1989 | Hoppe |
| 4,863,819 A | 9/1989 | Drexler et al. |
| 4,889,366 A | 12/1989 | Fabbiani |
| 4,945,215 A | 7/1990 | Fukushima |
| 4,950,877 A | 8/1990 | Kurihara et al. |
| D310,386 S | 9/1990 | Michels et al. |
| 5,005,873 A | 4/1991 | West |
| 5,010,243 A | 4/1991 | Fukushima et al. |
| 5,106,125 A | 4/1992 | Antes |
| 5,111,033 A | 5/1992 | Fujita et al. |
| 5,142,383 A | 8/1992 | Mallik |
| 5,217,844 A | 6/1993 | Fukushima et al. |
| 5,241,165 A | 8/1993 | Drexler |
| 5,251,937 A | 10/1993 | Ojster |
| 5,256,473 A | 10/1993 | Kotani et al. |
| 5,272,326 A | 12/1993 | Fujita et al. |
| 5,300,764 A | 4/1994 | Hoshino et al. |
| 5,304,789 A | 4/1994 | Lob et al. |
| 5,351,142 A | 9/1994 | Cueli |
| 5,355,411 A | 10/1994 | MacDonald |
| 5,383,687 A | 1/1995 | Suess et al. |
| 5,407,893 A | 4/1995 | Koshizuka et al. |
| 5,410,142 A | 4/1995 | Tsuboi et al. |
| 5,434,404 A | 7/1995 | Liu et al. |
| 5,514,860 A | 5/1996 | Berson |
| 5,516,153 A | 5/1996 | Kaule |
| 5,518,810 A | 5/1996 | Nishihara et al. |
| 5,608,203 A | 3/1997 | Finkelstein et al. |
| 5,611,965 A | 3/1997 | Shouji et al. |
| 5,614,289 A | 3/1997 | Kobayashi et al. |
| D384,971 S | 10/1997 | Kawan |
| 5,697,649 A | 12/1997 | Dames et al. |
| 5,700,037 A | 12/1997 | Keller |
| 5,705,101 A | 1/1998 | Oi et al. |
| 5,720,500 A | 2/1998 | Okazaki et al. |
| 5,786,587 A | 7/1998 | Colgate, Jr. |
| 5,789,733 A | 8/1998 | Jachimowicz et al. |
| 5,808,758 A | 9/1998 | Solmsdorf |
| 5,856,048 A | 1/1999 | Tahara et al. |
| 5,856,661 A | 1/1999 | Finkelstein et al. |
| 5,857,709 A | 1/1999 | Chock |
| D406,861 S | 3/1999 | Leedy, Jr. |
| 5,882,774 A | 3/1999 | Jonza et al. |
| D408,054 S | 4/1999 | Leedy, Jr. |
| 5,900,954 A | 5/1999 | Katz et al. |
| 5,928,788 A | 7/1999 | Riedl |
| 5,932,870 A | 8/1999 | Berson |
| 5,971,276 A | 10/1999 | Sano et al. |
| 5,978,348 A | 11/1999 | Tamura |
| 6,019,284 A | 2/2000 | Freeman et al. |
| 6,045,894 A | 4/2000 | Jonza et al. |
| 6,049,419 A | 4/2000 | Wheatley et al. |
| 6,074,726 A | 6/2000 | Vezinet et al. |
| 6,138,913 A | 10/2000 | Cyr et al. |
| 6,155,168 A | 12/2000 | Sakamoto |
| D436,620 S | 1/2001 | Webb et al. |
| 6,186,398 B1 | 2/2001 | Kato et al. |
| D438,563 S | 3/2001 | Webb et al. |
| 6,196,465 B1 | 3/2001 | Awano |
| 6,248,314 B1 | 6/2001 | Nakashimada et al. |
| 6,255,031 B1 | 7/2001 | Yao et al. |
| 6,277,232 B1 | 8/2001 | Wang et al. |
| 6,290,137 B1 | 9/2001 | Kiekhaefer |
| 6,296,188 B1 | 10/2001 | Kiekhaefer |
| 6,391,400 B1 | 5/2002 | Russell et al. |
| 6,581,839 B1 | 6/2003 | Lasch et al. |
| 6,749,123 B2 | 6/2004 | Lasch et al. |
| 6,764,014 B2 | 7/2004 | Lasch et al. |
| 2002/0066790 A1 | 6/2002 | Cocco |
| 2002/0130186 A1 | 9/2002 | Lasch et al. |
| 2002/0145049 A1 | 10/2002 | Lasch et al. |
| 2003/0017312 A1 | 1/2003 | Labrousse et al. |
| 2003/0047615 A1 | 3/2003 | Batoha |
| 2003/0141373 A1 | 7/2003 | Lasch et al. |
| 2004/0020992 A1 | 2/2004 | Lasch et al. |
| 2004/0046034 A1 | 3/2004 | Yamani et al. |
| 2005/0207002 A1 | 9/2005 | Liu et al. |

FOREIGN PATENT DOCUMENTS

| | | |
|---|---|---|
| AT | 171672 | 10/1998 |
| CA | 1228225 | 10/1987 |
| CA | 1328363 | 12/1994 |
| CH | 689680 | 8/1999 |
| DE | 2847756 | 5/1980 |
| DE | 3636921 | 5/1988 |
| DE | 3941070 | 6/1991 |
| DE | 3781502 | 1/1993 |
| DE | 19507144 | 4/1996 |
| DK | 734322 | 6/1999 |
| EP | 0181770 | 5/1986 |
| EP | 0264277 | 4/1988 |
| EP | 0343829 | 11/1989 |
| EP | 0354817 | 2/1990 |
| EP | 0368570 | 5/1990 |
| EP | 0388090 | 9/1990 |
| EP | 0403134 | 12/1990 |
| EP | 0411602 | 2/1991 |
| EP | 0473998 | 3/1992 |

| | | |
|---|---|---|
| EP | 0481388 | 4/1992 |
| EP | 0531605 | 3/1993 |
| EP | 0552047 | 7/1993 |
| EP | 0560318 | 9/1993 |
| EP | 0568185 | 11/1993 |
| EP | 0657297 | 6/1995 |
| EP | 0721850 | 7/1996 |
| EP | 0734322 | 10/1996 |
| EP | 0780839 | 6/1997 |
| EP | 0789316 | 8/1997 |
| EP | 0843280 | 5/1998 |
| EP | 0854461 | 7/1998 |
| EP | 0866420 | 9/1998 |
| EP | 0894620 | 2/1999 |
| EP | 0916519 | 5/1999 |
| EP | 1222620 | 7/2002 |
| ES | 548621 | 4/1987 |
| ES | 8704653 | 6/1987 |
| ES | 2121423 | 11/1998 |
| GB | 1371254 | 10/1974 |
| GB | 2086110 | 5/1982 |
| GB | 2106832 | 4/1983 |
| GB | 2108906 | 5/1983 |
| GB | 2229189 | 9/1990 |
| GB | 2240948 | 8/1991 |
| JP | 61130918 | 6/1986 |
| JP | 62264999 | 11/1987 |
| JP | 6372721 | 4/1988 |
| JP | 63098689 | 4/1988 |
| JP | 363071794 | 4/1988 |
| JP | 63175987 | 7/1988 |
| JP | 64-4934 | 1/1989 |
| JP | 1004934 | 1/1989 |
| JP | 64-78397 | 3/1989 |
| JP | 64-87395 | 3/1989 |
| JP | 64-87396 | 3/1989 |
| JP | 1307937 | 12/1989 |
| JP | 2130737 | 5/1990 |
| JP | 2252149 | 10/1990 |
| JP | 3-290780 | 12/1991 |
| JP | 4-303692 | 10/1992 |
| JP | 569689 | 3/1993 |
| JP | 5224000 | 9/1993 |
| JP | 5254283 | 10/1993 |
| JP | 6-191137 | 7/1994 |
| JP | 6183187 | 7/1994 |
| JP | 6234287 | 8/1994 |
| JP | 6243774 | 9/1994 |
| JP | 7-173358 | 7/1995 |
| JP | 7-205569 | 8/1995 |
| JP | 8-169192 | 7/1996 |
| JP | 9507266 | 7/1997 |
| JP | 9274640 | 10/1997 |
| JP | 010049345 | 2/1998 |
| JP | 10-129161 | 5/1998 |
| JP | 36307179 | 11/1998 |
| JP | 11-020356 | 1/1999 |
| JP | 11-053496 | 2/1999 |
| JP | 11-227367 | 8/1999 |
| JP | 2000177229 | 6/2000 |
| JP | 2001-204406 | 7/2001 |
| JP | 2001-315475 | 11/2001 |
| JP | 2001-319325 | 11/2001 |
| JP | 2002-274087 | 9/2002 |
| JP | 2003-145964 | 5/2003 |
| WO | WO 81/00776 | 3/1981 |
| WO | WO 89/03760 | 5/1989 |
| WO | WO 90/08661 | 8/1990 |
| WO | WO 91/08910 | 6/1991 |
| WO | WO 96/11805 | 4/1992 |
| WO | WO 92/16913 | 10/1992 |
| WO | WO 92/18972 | 6/1996 |
| WO | WO 99/14055 | 3/1999 |
| WO | WO 99/47983 | 9/1999 |
| WO | WO 01/18745 | 3/2001 |
| WO | WO 01/25872 | 4/2001 |
| WO | WO 02/05204 | 1/2002 |

OTHER PUBLICATIONS

Sport Optics International, Premium Optics Serious Outdoorsmen (Date unknown).
The Light Site Europe, Master Line ES (2000), no month.
Home Energy, Lighting Makeovers: The Best Is Not Always the Brightest (Nov./Dec. 1994).
IBM Technical Disclosure Bulletin, Infrared Transparent Credit Card (Dec. 1966).
Umaghan Instruments, The IRX Infrared Exclusion Filter (Jul. 31, 1999).
Optical Coatings Japan, Filters (2000), no month.
ISO/IEC 10373-1993(E), p. 17, Section 5.14 "Light transmittance" (Prior Art).
The 1995 ISO/IEC 7810 standard for identification cards.
The 1998 ISO/IEC 10373-1 test methods standard for identification cards.
The 1998 working draft amended ISO/IEC 7810 standard.
The 1997 working draft amended ISO/IEC 10373-1 test methods standard for identification cards.
Nilson Report Sep. 1999.
European Examination Report for 00961558.4 dated Jun. 26, 2003.
International Search Report for PCT/US00/24371 mailed on Feb. 28, 2001.
International Search report for PCT/US2000/027004 mailed on Dec. 20, 2000.
Notice of Allowance for U.S. Appl. No. 09/653,837 mailed on Nov. 27, 2002.
Notice of Allowance for U.S. Appl. No. 10/062,106 mailed on Jan. 02, 2004.
Notice of Allowance for U.S. Appl. No. 10/092,681 mailed on Feb. 2, 2004.
Notice of Allowance for U.S. Appl. No. 09/411,359 mailed on Jun. 20, 2001.
Notice of Allowance for U.S. Appl. No. 09/449,251 mailed on Jun. 20, 2001.
Notice of Allowance for U.S. Appl. No. 10/339,814 mailed on Nov. 12, 2003.
Notice of Allowance for U.S. Appl. No. 09/675,912 mailed on Nov. 26, 2003.
Notice of Allowance for U.S. Appl. No. 10/735,940 mailed on Aug. 12, 2005.
Notice of Allowance for U.S. Appl. No. 10/394,914 mailed on Mar. 19, 2008.
Non-Final Office Action for U.S. Appl. No. 12/062,489 mailed on Dec. 16, 2008.

| Number | Material | Specifications | Source | Comments |
|---|---|---|---|---|
| | Construction 1 - white needs work, lamination temperature too low, pvc core | | | bond low. |
| 1 | pvc laminate | 1.60 | oberthur | front 4.1, 4.4; back 4.0, 4.0 |
| 2 | pet adhesive both sides | 2.50 | allied signal | |
| 3 | printed core - white #1 | 12.00 | oberthur | |
| 4 | printed core - white #1 | 12.00 | oberthur | |
| 5 | wl-35 pvc (adh to xir) | 2.00 | klockner | |
| 6 | xir (metal to pet gs) | 1.00 | southwall | |
| 7 | pet glue/stamp | 1.70 | d & k | 1.2 mil adhesive, 0.5 mil pet. |
| Total | | 32.80 | | thickness .030 - .031 |
| | Construction 2 | | | |
| 1 | pvc laminate | 1.60 | oberthur | |
| 2 | pet adhesive both sides | 2.50 | allied signal | |
| 3 | printed core | 12.00 | oberthur | |
| 4 | printed core | 12.00 | oberthur | |
| 5 | wl-35 pvc (adh to xir) | 2.00 | klockner | |
| 6 | xir (metal to pet gs) | 1.00 | southwall | |
| 7 | pet glue/stamp (adh to xir) | 1.70 | d & k | 1.2 mil adhesive, 0.5 mil pet. |
| 8 | wl-35 pvc (adh to pet) | 2.00 | klockner | |
| Total | | 34.80 | | |
| | Construction 3 | | | |
| 1 | pvc laminate | 1.60 | oberthur | |
| 2 | pet adhesive both sides | 2.50 | allied signal | |
| 3 | printed core | 12.00 | oberthur | |
| 4 | printed core | 12.00 | oberthur | |
| 5 | wl-35 pvc (adh to xir) | 2.00 | klockner | |
| 6 | xir (metal to pet gs) | 1.00 | southwall | |
| 7 | pet glue/stamp (adh to xir) | 1.70 | d & k | 1.2 mil adhesive, 0.5 mil pet. |
| 8 | gomar pvc (adh to pet) | 2.00 | allied signal | |
| Total | | 34.80 | | |
| | Construction 4 - white #2 too dark, temperature too low, pvc lamination bond | | | low |
| 1 | pvc laminate | 1.60 | oberthur | front - 4.0, 4.3; back tear |
| 2 | pet adhesive both sides | 2.50 | allied signal | |
| 3 | printed core - white #2 | 12.00 | oberthur | |
| 4 | printed core - white #2 | 12.00 | oberthur | |
| 5 | bemis (adh to xir) | 2.00 | klockner | |
| 6 | xir (metal to pet gs) | 1.00 | southwall | |
| 7 | pet glue/stamp | 1.70 | d & k | 1.2 mil adhesive, 0.5 mil pet. |
| Total | | 32.80 | | thickness .030 - .031 |
| | Construction 5 - white #3 too dark, temperature too low - pvc lamination bon | | | low |
| 1 | pvc laminate | 1.60 | oberthur | |
| 2 | pet adhesive both sides | 2.50 | allied signal | |
| 3 | printed core - white #3 | 12.00 | oberthur | |
| 4 | printed core - white #3 | 12.00 | oberthur | |
| 5 | w-35 (adh to xir pet) | 2.00 | klockner | |
| 6 | xir (metal to pet gs) | 1.00 | southwall | |
| 7 | pet glue/stamp | 1.70 | d & k | 1.2 mil adhesive, 0.5 mil pet. |
| | Total | 32.80 | | thickness .030 - .031 |
| | howard 1.0 coating | | | |
| 1 | neocryl b725 | 33.60 | zeneca? | |
| 2 | EtOH | 31.20 | | |
| 3 | nPOAc | 31.20 | | |

FIGURE 13

|  |  |  |  |  |
|---|---|---|---|---|
| | 4 citraflex a4 | 4.00 | moreslip, greensboro | |
| Total | | 100.00 | | | construction #6 - seems to stick ok, best so far, scale up. Make sub-laminat (aka - s)

| | | | | |
|---|---|---|---|---|
| 1 pvc laminate | 1.60 | oberthur | |
| 2 core pvc | 12.00 | oberthur | |
| 3 bemis | 2.00 | bemis | |
| 4 petgs | 1.70 | d & k | |
| 5 xir (metal to pet gs) | 1.00 | southwall | plasma treated |
| 6 bemis | 2.00 | bemis | |
| 7 core pvc | 12.00 | oberthur | |
| 8 pvc laminate | 1.60 | oberthur | magnetics |

Total 33.90 herslow sublamination

Total Price construction #7-- seems to stick ok, best so far, scale up. Make sub-laminat (aka - t)

| | | | | |
|---|---|---|---|---|
| 1 pvc laminate | 1.60 | oberthur | |
| 2 core pvc | 12.00 | oberthur | |
| 3 w-35 | 2.00 | bemis | |
| 4 petgs | 1.70 | d & k | |
| 5 xir (metal to pet gs) | 1.00 | southwall | plasma treated |
| 6 bemis | 2.00 | bemis | |
| 7 core pvc | 12.00 | oberthur | |
| 8 pvc laminate | 1.60 | oberthur | magnetics |

Total 33.90 construction #7 - seems to stick ok, best so far, scale up. Make sub-laminat (aka - t)

| | | | | |
|---|---|---|---|---|
| 1 pvc laminate | 1.60 | oberthur | |
| 2 core pvc | 12.00 | oberthur | |
| 3 w-35 | 2.00 | bemis | |
| 4 petgs | 1.70 | d & k | |
| 5 xir (metal to pet gs) | 1.00 | southwall | plasma treated |
| 6 w-35 | 2.00 | bemis | |
| 7 core pvc | 12.00 | oberthur | core to core = 14.2 lb.in |
| 8 pvc laminate | 1.60 | oberthur | magnetics |

Total 33.90 construction #8 - sublaminate to be used with 12 mil pvc core

| | | |
|---|---|---|
| 1 w-35 | 2.00 | |
| 2 petgs | 1.70 | |
| 3 xir (metal to pet gs) | 1.00 | |

Total 4.70 construction #9 - sublaminate to be used with 10 mil pvc core

| | | |
|---|---|---|
| 1 pvc laminate | 1.60 | |
| 2 w-35 | 2.00 | |
| 3 petgs | 1.70 | |
| 4 xir (metal to pet gs) | 1.00 | |
| 5 bemis | 2.00 | |
| 6 pvc laminate | 1.60 | |

Total 9.90 construction #10 (if u works)

| | | |
|---|---|---|
| 1 w35 | 2.00 | |
| 2 petgs | 1.70 | |
| 3 xir (metal to pet gs) | 1.00 | |
| 4 w35 | 2.00 | |

FIGURE 13 (Continued)

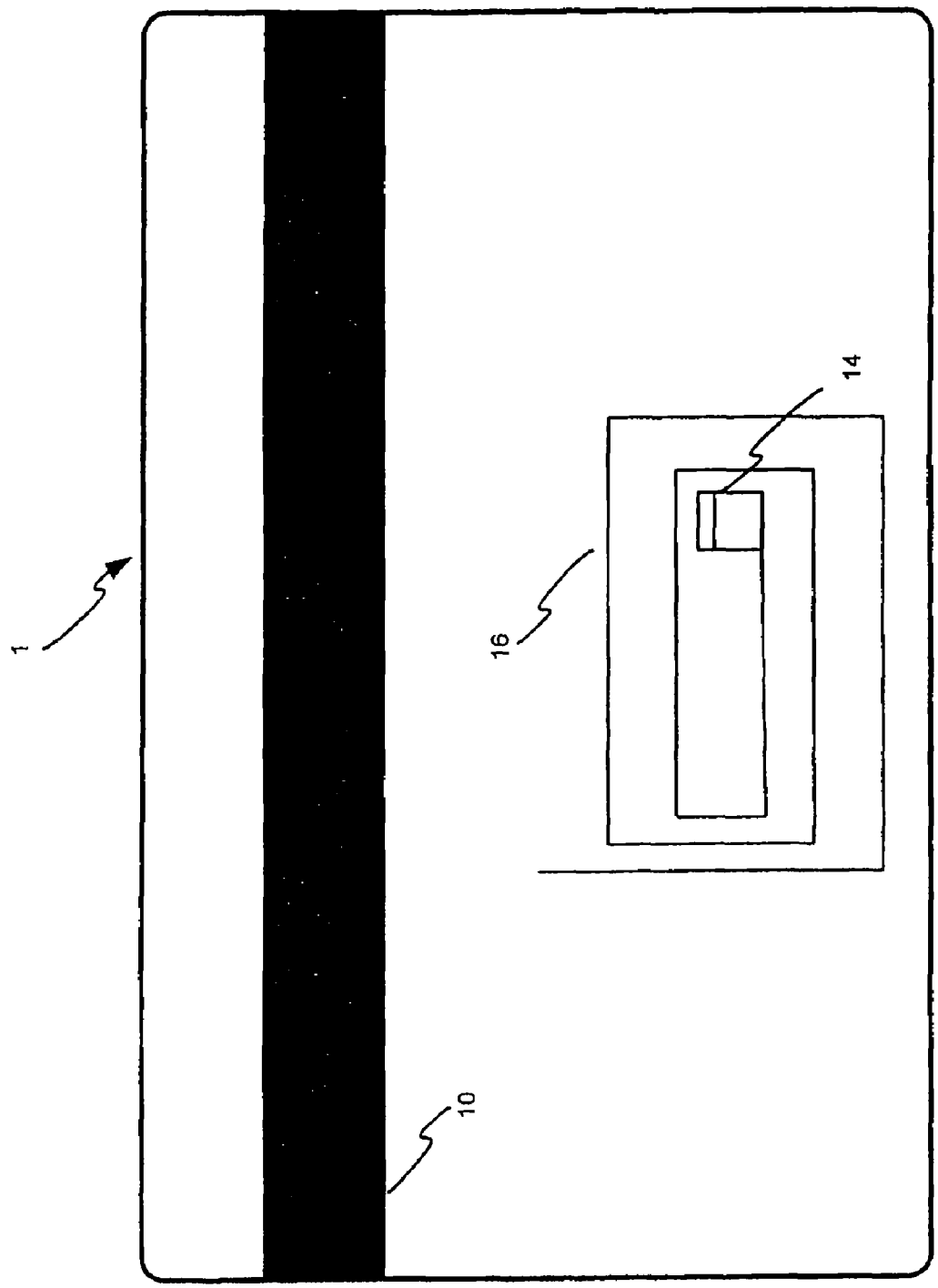

CLEAR CONTACTLESS CARD

CROSS-REFERENCE TO RELATED APPLICATIONS

This application is a continuation of U.S. patent application Ser. No. 10/611,563 filed on Jun. 30, 2003 and entitled "TRANSPARENT TRANSACTION CARD (now called CLEAR CONTACTLESS CARD)," which application is a continuation-in-part of and claims priority to U.S. patent application Ser. No. 10/192,488 entitled "SYSTEM AND METHOD FOR PAYMENT USING RADIO FREQUENCY IDENTIFICATION IN CONTACT AND CONTACTLESS TRANSACTIONS," filed on Jul. 9, 2002 and issued on Jul. 3, 2007 as U.S. Pat. No. 7,239,226 (which itself claims priority to U.S. Provisional Patent Application No. 60/304,216 filed Jul. 10, 2001); which application is also a continuation-in-part of U.S. patent application Ser. No. 10/062,106 entitled "TRANSACTION CARD," filed Mar. 7, 2002 and issued on Jun. 15, 2004 as U.S. Pat. No. 6,749,123; which application is also a continuation-in-part of U.S. patent application Ser. No. 10/288,945 entitled "PERFORATED TRANSACTION CARD," filed Nov. 6, 2002 which has since been abandoned; which application is also a continuation-in-part of U.S. patent application Ser. No. 10/302,658 entitled "TRANSACTION CARD WITH DUAL CHIPS," filed on Nov. 22, 2002 which has since been abandoned; which application is also a continuation-in part of U.S. patent application Ser. No. 10/394,914 entitled "TRANSACTION CARD," filed Mar. 21, 2003 (which itself claims priority to U.S. Provisional Patent Application No. 60/427,977 filed Nov. 20, 2002), the entire contents of which are hereby incorporated by reference.

FIELD OF THE INVENTION

The present invention generally relates to transaction cards, and more particularly, to a system and method for fabricating a transparent transaction card and using a transparent transaction card in contact and contactless transactions.

BACKGROUND OF THE INVENTION

For many years personal checks, travelers checks, money orders, traditional currency and the like were the most popular means for paying for goods or services. These payment means, however, were often difficult or impossible to replace if lost or stolen. Moreover, since the traditional means of payment were made of lightweight material and were somewhat disposable, the traditional means of payment were not easy to store and/or guard against theft. In addition, these means of payment were somewhat disposable in that they were typically single-use devices, meaning that once the devices were used, the ability to reuse the devices was instantly lost to the user.

As such, recent years has seen the development of transaction cards, such as credit cards, debit cards, smart cards, pre-paid cards and the like as a popular substitute for traditional means of payment. In general, a transaction card is about the size of a driver's license, business card or the like making the transaction card easier to guard against theft by storing it. Additionally, the transaction card is typically made of plastic, and not meant to be exchanged for goods or services. That is, the cardholder may negotiate a transaction involving goods or services while maintaining control of the transaction card for later re-use.

To facilitate the transaction, the transaction card may include a unique identifier which may be retrieved from the card and/or presented to a merchant for payment. The transaction card unique identifier may be associated, linked, or correlated with a funding source, such as a bank, credit account, debit account, line of credit, or the like, which may contain a value (e.g., credit, monetary, etc.) for use in the payment. Such a funding source may typically be managed by a transaction card provider.

When the transaction card is presented to a merchant for payment of goods or services, the merchant may verify the validity of the card, the identity of the cardholder, and whether the associated funding source may be used for purchases. If authorized, the merchant may contact the transaction card provider and receive funds from the funding source for payment in accordance with the value of the transaction.

It should be noted, however, that transaction cards are not limited to use as substitute currency. A transaction card may be an information carrier including means for storing and presenting information. One such transaction card may be a smart card which includes circuitry which may be used to store and transfer information relevant to the cardholder. For example, information such as the cardholder's address, medical history, transaction history or the like, may be stored on a database contained on the transaction card. The cardholder may present the card to a transaction card reader (e.g., smart card reader) so that the information contained thereon may be retrieved as needed.

For the transaction card provider, transaction cards are preferred because the cardholder often must subscribe to a membership plan managed by the provider. This, in turn, gives the provider greater access to the cardholder. For example, the provider may use a membership list compiled from the subscriptions to encourage purchase of the provider's goods and services. A provider may use its membership list to encourage use through use based incentive programs. Alternatively, to generate revenue, the provider may charge the cardholder a nominal fee for use of the provider's transaction card services. In either case, the transaction card represents an additional means of generating revenue by establishing an easily accessible, ready made customer base for the transaction card provider.

The advantages to a transaction card provider have not gone unnoticed. That is, because of the increased popularity and benefits associated with transaction cards, many banking and financing institutions, department stores, petroleum companies and other organizations have developed their own transaction cards for use by the organization's consumers. Today, virtually every major provider of goods and services has its own unique transaction card such that hundreds of millions of transaction cards are now produced and issued annually.

The proliferation of cards has given the consumer many choices on which card the consumer may choose to carry and use. The multitude of choices has given rise to competition amongst individual card providers to encourage use of the provider's transaction card over one issued by a provider's competitors.

In response to this competition, transaction card providers have developed cards including different shapes and appearances which are designed to encourage use of their card and to distinguish their card from other cards on the market. For example, as disclosed in U.S. Application Publication No. U.S. 2003/0014891 A1, entitled "Non-rectangular shaped credit card with case," filed Feb. 27, 2002, Discover Financial Services has released its teardrop Discover 2GO card which permits the cardholder to swivel the transaction card free from a similarly shaped plastic key case. Discover Financial Services developed their 2GO card to encourage consumers to enroll in membership of it services by providing the cardholder with a more convenient method of presenting the transaction card for payment and for storing the transaction card upon completion of a transaction.

Other transaction card providers are encouraging use of their transaction cards by providing unique means of ensuring secure card usage. For example, traditional security means such as personal identification numbers (PINs) and security signature stripes may be combined with photographs of the cardholder, a hologram, or other graphic images visible on a surface of the transaction card. In one such case, an image may be included in a diffraction grating to produce a holographic image on the card surface. The incorporation of holograms onto transaction cards provides a more reliable method of determining the authenticity of the transaction card in ordinary white light, namely by observing if the hologram has the illusion of depth and changing of colors. Thus, use of the holograms may minimize the ability to fraudulently copy or reproduce the transaction card, since the holographic images are produced using extremely complex steps and highly expensive equipment.

Still other transaction card providers attempt to encourage usage of a particular card by personalizing the card thereby making the card more aesthetically pleasing. For example, the card may include a logo, picture, apparition, or the like which holds some sentimental or endearing value to the user. In addition, the transaction card provider may agree to contribute a percentage of an overall purchase to a charity or organization in which the user has an interest. In either case, the user is encouraged to use a particular transaction card since the card includes an aspect with which the user personally identifies.

Some transaction card providers have addressed the aesthetics of their cards by attempting to produce a transparent or translucent transaction card. That is, the transaction card may be constructed such that the cardholder may view objects though the card body. Where the card includes internally placed electrical circuitry, such as, for example, databases, transmitters, receivers, antennas, and/or microcontrollers, the internal circuitry may be viewed by the cardholder through casual inspection of the card surface.

As noted, consumers presently have many options for deciding which transaction cards to use. To encourage wide use of transaction cards, the International Standards Organization ("ISO") developed standards governing size and shape of the transaction card which are often adhered to by the myriads of transaction card providers. For example, the transaction card's physical dimensions, features and embossing area were standardized under ISO 7810 and ISO 7811. The issuer's identification, the location of particular compounds, coding requirements, and recording techniques were standardized in ISO 7812 and ISO 7813, while chip card standards for smart cards were established in ISO 7813.

ISO 7811 defines the standards for the magnetic stripe. In accordance with ISO 7811, the magnetic stripe must be a 0.5 inch stripe located either in the front or rear surface of the card. The magnetic stripe is divided into three (3) longitudinal parallel tracks. The first and second tracks hold read-only information with room for 79 alphanumeric characters and 40 numeric characters, respectively. The third track is reserved for financial transactions and includes enciphered versions of the user's personal identification number, country code, currency units, amount authorized per cycle, subsidiary accounts, and restrictions. More information regarding the features and specifications of transaction cards can be found in, for example, Smart Cards by Jose Luis Zoreda and Jose Manuel Oton, 1994; Smart Card Handbook by W. Ranki and W. Effing, 1997, and the various ISO standards for transaction cards available from ANSI (American National Standards Institute), 11 West 42nd Street, New York, N.Y. 10036, the entire contents of all of these publications are herein incorporated by reference.

The incorporation of machine-readable components onto transaction cards encouraged the proliferation of devices for automatically reading from and/or writing onto transaction cards. Such devices, sometimes called "card acceptance devices" herein, include, for example, bar code scanners, magnetic stripe readers, point of sale terminals (POS), automated teller machines (ATM) and card-key devices.

Many of the card acceptance devices are configured such that the transaction card is inserted into the device. The card is inserted such that the device can appropriately align its reading head with the relevant component of the transaction card for retrieving information. For example, many ATMs are configured such that a transaction card must be substantially inserted into a slot for reading. The ATM typically includes an additional mechanical device for further retracting the transaction card into the ATM slot after insertion of the card into the slot. Alternatively, the cardholder may be asked to insert the card into a slot (or swipe the card) and quickly remove the card to activate the ATM.

To aid in activation of the ATM, a sensor is included in the ATM for detecting the presence of the card. For example, the sensor may include a phototransistor and a light emitting diode (LED) such as those produced, for example, by Omron and Sankyo-Seeiki of Japan, 4800 Great America Parkway, Suite 201, Santa Clara, Calif. The LED may emit light onto a surface of the phototransistor which may receive the light from the LED. A card is detected by the sensor when the card substantially interferes with the receipt of the light by the phototransistor. That is, upon insertion into the ATM and into the transmission path of the light emitted from the LED to the phototransistor, the card blocks the infrared radiation from the LED, therefore indicating that a card has been detected.

A typical LED in an ATM is an IRED (infrared emitting diode) source having a wavelength in the range of about 820-920 nm or 900-1000 nm (see FIG. 5), which is not present in ambient light at the levels needed by a phototransistor sensor. The spectral sensitivity curve of the typical phototransistor is in the range of about 400 nm-1100 nm. However, the visible spectrum is about 400 nm-700 nm, and the spectral sensitivity of the phototransistor is about 60% at 950 nm and 90% at 840 nm. Thus, visible light is not part of the analog-to-digital algorithm and therefore, is not effective for activating a phototransistor. Moreover, ISO 7810 stand, clause 8.10 requires that all machine readable cards have an optical transmission density from 450 nm-950 nm, greater than 1.3 (less than 5% transmission) and from 950 nm-1000 nm, greater than 1.1 (less than 7.9% transmission).

As noted, for the card to be detected by the ATM, the light emitted from the LED interrupted, re-directed or blocked by the card body. However, the amount of light necessary to be blocked by a card for activation of the ATM is related to the voltage data received from the analog to digital conversion performed in part by the phototransistor. The voltage range of the sensor is typically in a range of about 1.5V to 4.5V. When a card is inserted into a sensor, the voltage drops to less than 1.5V indicating the presence of a card in the transport system. After the card is detected by the phototransistor, the magnetic stripe reader scans the card body and acquires the information recorded on the magnetic stripe.

As previously mentioned, transaction cards and card acceptance devices are subject to various ISO standards which are designed to make card usage more desirable since the card may be used interchangeably with card acceptance devices produced by different manufacturers. One aspect of the card acceptance device which has thus far escaped standardization however is the location of the sensor. It should be noted that heretofore varying locations of the sensor within the ATM did not affect the ability of the ATM to sense the transaction card because the transaction card included a substantially opaque surface. Thus, any portion of the opaque transaction card could interrupt the IRED emission and activate the insert phototransistor.

More recently, however, companies have attempted to develop transparent or translucent transaction cards to meet consumer demands for uniqueness in transaction card appearance. Conventional transparent transaction cards include problems in that the transparent transaction cards often not activate the insert phototransistor because the IRED emission would not sufficiently reflect off a transparent surface. That is the radiation would simply travel through the card and become detected by the phototransistor. The machine, therefore, could not detect the presence of the card and the card often jammed the equipment.

In an attempt to solve this problem, card providers have printed opaque areas onto transparent cards in an effort to provide an opaque area to activate the input sensors on ATMs. However, due to the aforementioned variations in the location of the sensor in many ATMs, the use of limited opaque areas on a transparent card did not allow the card to activate the sensor in a sufficient number of ATMs.

In another attempt to solve the problem, the card providers have incorporated a lens onto a transaction card for redirecting the LED light in similar manner as if the card were opaque. However, the lens often did not survive the card fabrication process, which often involves substantial pressure and heat, the lensing surface would be disrupted or destroyed.

Furthermore, during the card fabrication process, the cards typically must be detected on the assembly line in order to accurately count the number of cards produced during a predetermined time interval. To count the cards, typical card fabrication assembly lines include counters with LED sensors, similar to the ATM sensors, which count the cards based upon the reflection of the LED light beam off of the opaque card surface. The production of transparent transaction cards suffers from similar limitations as ATM devices in that the LED beam does not reflect or is not sufficiently absorbed from a transparent surface.

Although existing systems may allow for the identification and detection of transparent cards, most contain a number of drawbacks. For example, identification features based on UV, visible light detection, etc., are sometimes difficult to view, often require certain lighting requirements and typically depend on the distance between the article and the detection device. Further, the use of certain types of plastic, paper or other material which contain the identification mark may be limited by the particular identification device. For example, opaque materials typically deactivate the phototransistors in ATM's by blocking light in both the visible (near IR) and far IR light regions.

Although it is important for transparent transaction cards to be detected by a machine, especially a machine such as an ATM whereby the card is entered to conduct a transaction, it can be quite inconvenient for a user to utilize a machine, or to otherwise manipulate a transaction card in a merchant POS card reader or the like. This requires the physical manipulation of the card, and typically requires a transaction card owner to relinquish control of the transaction card to a merchant for swiping the card or otherwise entering the card into a machine. By having to physically enter a transaction card into a machine, or to physically slide a transaction card through a card reader, much time is wasted that could be better spent by a merchant or by a consumer thereby prolonging the transaction experience. In addition, when a user of a transaction card conducts a transaction, a representative of the merchant is typically necessary to be present to conduct the transaction. Thus, a need exists for a transaction card that allows a consumer to conduct a transaction without needing a representative of the merchant to be present.

To address the inconvenience associated with relinquishing the transaction card to a merchant representative, card providers are increasingly incorporating technology enabling the card to be used in a contactless environment. One such method involves incorporating an RFID system inside the card body. Like barcode and voice data entry, RFID is a contactless information acquisition technology. RFID systems are wireless, and are usually extremely effective in hostile environments where conventional acquisition methods fail. As such, RFID technology has established itself in a wide range of markets, such as, for example, the high-speed reading of railway containers, tracking moving objects such as livestock or automobiles, and retail inventory applications. As can be understood, RFID technology has become a primary focus in automated data collection, identification and analysis systems worldwide.

In general, a typical RFID system may include an transaction card antenna in communication with a transaction card transponder, and a RFID reader for providing an interrogation signal to the transponder and receiving cardholder information stored on the transaction card. The transponder may be powered by the interrogation signal which is received by the transaction card antenna. The fob may exist independent of an internal power source. In some instances, a battery may be included on the card to power the transponder. In which case the internal circuitry of the fob (including the transponder) may draw its operating power from the battery power source. In this instance the internal circuitry of the fob (including the transponder) may gain its operating power directly from an RF interrogation signal.

U.S. Pat. No. 5,053,774 issued to Schuermann describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like. One typical example of a RFID technology used to complete a transaction is included in U.S. application Ser. No. 10/192,488 entitled "SYSTEM AND METHOD FOR PAYMENT USING RADIO FREQUENCY IDENTIFICATION IN CONTACT AND CONTACTLESS TRANSACTIONS" Filed Jul. 9, 2002, incorporated herein by reference in its entirety.

One of the more visible uses of the RFID technology is found in the introduction of Exxon/Mobil's Speedpass® , Shell's EasyPay®) and American Express' ExpressPay products. These products use RFID transponders placed in a fob or tag which enables automatic identification of the user when the fob is presented at a Merchant Point of Sale (POS) device. Fob identification data is typically passed to a third party server database, where the identification data is referenced to a customer (e.g., user) credit or debit account. In an exemplary processing method, the server seeks authorization for the transaction by passing the transaction and account data to an authorizing entity (e.g., card provider). Once authorization is received by the server, clearance is sent to the point of sale device for completion of the transaction.

It should be noted, however, that up until now, RFID technology has not been successfully incorporated into a transparent transaction card. This is because, conventional methods of transparent card manufacture often damages the card internal circuitry, disenabling the cards capability to be used in a contactless environment. Thus, a need exist for a transparent transaction card which is additionally capable of effective and consistent contactless environment usage.

SUMMARY OF THE INVENTION

The present invention relates to a contactless transparent transaction card and methods of using the same. Specifically, the present invention relates to a contactless transaction card, such as a credit card, debit card, stored-value card, or other type of transaction card, having one or more layers that are transparent or otherwise clear so that the transaction card is viewable therethrough. The transaction card includes means for conducting a contactless transaction, such as, for example a transponder system. In one exemplary embodiment, the transponder system includes RF-based chip and antenna embedded therein for conducting transactions without contacting a machine or card reader to obtain the required information from the transaction card. In addition, the transaction card may further include a traditional magnetic stripe so that the transaction card can alternatively be fed through a magnetic stripe reader.

It is, therefore, an embodiment of the present invention to provide a transaction card that is clear or otherwise transparent, thereby giving the transaction card a distinctive appearance. Moreover, it is an embodiment of the present invention to provide a transparent transaction card having means for sending information to a machine or card reader in a contactless operating environment.

In addition, it is an embodiment of the present invention to provide a transparent transaction card having one or more RF-based chips therein and corresponding antennae for sending information stored on the chips to a receiver or reader. The RF-based chips and antennae are incorporated into the clear transaction card to further give the transaction card a distinctive appearance, since the RF-based chip and the antenna are viewable through the transaction card body.

Further, it is an embodiment of the present invention to provide a contactless transparent transaction card that allows consumers and merchants to more effectively, more quickly, and more efficiently conduct transactions. The present invention allows a consumer to maintain a substantial amount of control over the transaction card during transaction processing. In that regard, the present invention allows for a consumer to conduct a transaction with minimal need for, or without the need for, a representative of the merchant to be present.

Still further, it is an embodiment of the present invention to provide a contactless transparent transaction card having the ability to store more information that can typically be contained on a magnetic stripe or other information storage means that may be placed on or within a transaction card. The information allows card issuers (e.g., card providers) to better track information that may be contained within the RF-based chip.

In one embodiment, the present invention relates to a process for producing a transparent or translucent transaction card having any one or more features, such as a holographic foil, integrated circuit chip, silver magnetic stripe with text on the magnetic stripe, opacity gradient, perforations included in the transparent card body for forming an outline of a shape, an optically recognizable ink or film contained within the construction of the card, a translucent signature field such that the signature on back of the card is visible from the front of the card and an "active thru" date on the front of the card. The card is optically recognizable due to an invisible or transparent infrared ink or film which is distributed over the card's surface, thereby allowing the card to block (absorb, refract, diffuse and/or reflect) infrared light and transmit all other light. Particularly, when the transaction card is inserted into an ATM device, the light beam from the IRED is blocked by the infrared ink or film, thereby deactivating the phototransistor permitting the card reader to detect transaction card presence. Moreover, during the manufacturer of transaction cards, the optically recognizable card allows an IRED light beam from a personalization device, inspection unit or counter device to count the number of transaction cards produced in an assembly line.

The transparent transaction card of the present invention uses RFID technology to initiate and complete financial transactions. In that regard, the transparent transaction card may include an RF transponder and antenna in the card body, which is visible by casual inspection. The transparent transaction card system described herein may include a RFID reader operable to provide a RF interrogation signal for powering the transparent transaction card transponder system, receiving a transponder system RF signal, and providing transponder system account data relative to the transponder system RF signal. The RFID reader may include an RFID protocol/sequence controller in electrical communication with one or more interrogators for providing an interrogation signal to a transponder, a RFID authentication circuit for authenticating the signal received from the transponder, and a serial or parallel interface for interfacing with a point of interaction device.

The transparent transaction card transponder system may further include one or more transponders (e.g., modules or chips) responsive to the interrogation signal and for providing an authentication signal for verifying that the transponder and/or the RFID reader are authorized to operate within the transponder-reader payment system. In this way, since the transponder system may include multiple transponders, the transponder may be responsive to multiple interrogation signals provided at different frequencies.

The RFID reader may be configured to send a standing RFID recognition signal which may be continuously or intermittently transmitted from the RFID reader via radio frequency (or electromagnetic) propagation. In one instance, the transparent transaction card may be placed within proximity to the RFID reader such that the RFID recognition signal may interrogate the card and initialize card identification procedures.

In one exemplary embodiment, as a part of the identification process, the transparent transaction card and the RFID reader may engage in "mutual authentication." The RFID reader may identify the card as including an authorized system transponder for receiving encrypted information and storing the information on a transparent transaction card memory (e.g., data base). Similarly, the transponder included in the transparent transaction card, upon interrogation by the RFID reader, may identify the RFID reader as authorized to receive the encrypted and stored information, thereby authenticating the reader. Where the RFID reader and the card successfully mutually authenticate, the card may transmit to the RFID reader certain information identifying the transaction account or accounts to which the card is associated. The RFID reader may receive the information and forward the information to facilitate the completion of a transaction. In one exemplary embodiment, the RFID reader may forward the information to a point of interaction device (e.g., POS or computer interface) for transaction completion. The mutual authorization process disclosed herein aids in ensuring transparent transaction card transponder-reader payment system security.

Additional features and advantages of the present invention are described in, and will be apparent from, the detailed description of the present exemplary embodiments and from the drawings.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIGS. 7A-7I shows exemplary test results for various card embodiments in a graph of percent transmission v. wavelength (nm) in accordance with an exemplary embodiment of the present invention;

FIG. 13 shows exemplary embodiments of layers for card construction in accordance with an exemplary embodiment of the present invention;

FIGS. 16-18 illustrate plan views of examples of a transparent transaction card having RFID circuitry including an antenna coil embedded therein in accordance with an exemplary embodiment of the present invention.

DETAILED DESCRIPTION

The present invention relates to a contactless transparent transaction card and methods of making and using the same. Specifically, the present invention relates to a contactless, transparent transaction card, such as a credit card, debit card, stored-value card, smart card, or other type of transaction card, having a plurality of layers that is transparent or otherwise clear so that the transaction card is see through. The transaction card may include means for conducting a transaction in a contactless environment. For example, the transaction card may include a transponder system, which may include a RF-based chip and antenna embedded therein. The contactless transparent transaction card can be utilized to more efficiently conduct cashless transactions at merchants, for example, a merchant POS, by permitting the cardholder to maintain possession of the card throughout the transaction. Instead, the cardholder information necessary to complete the transaction is retrieved from the card using contactless means. In addition, the transaction card may further include a traditional magnetic stripe so that the transaction card can alternatively be fed through a magnetic stripe reader or inserted in a card acceptance device for transaction completion. In that regard the card layers may include IR blocking ink or film for activating a card acceptance device in a traditional contact transaction.

Figure 1:
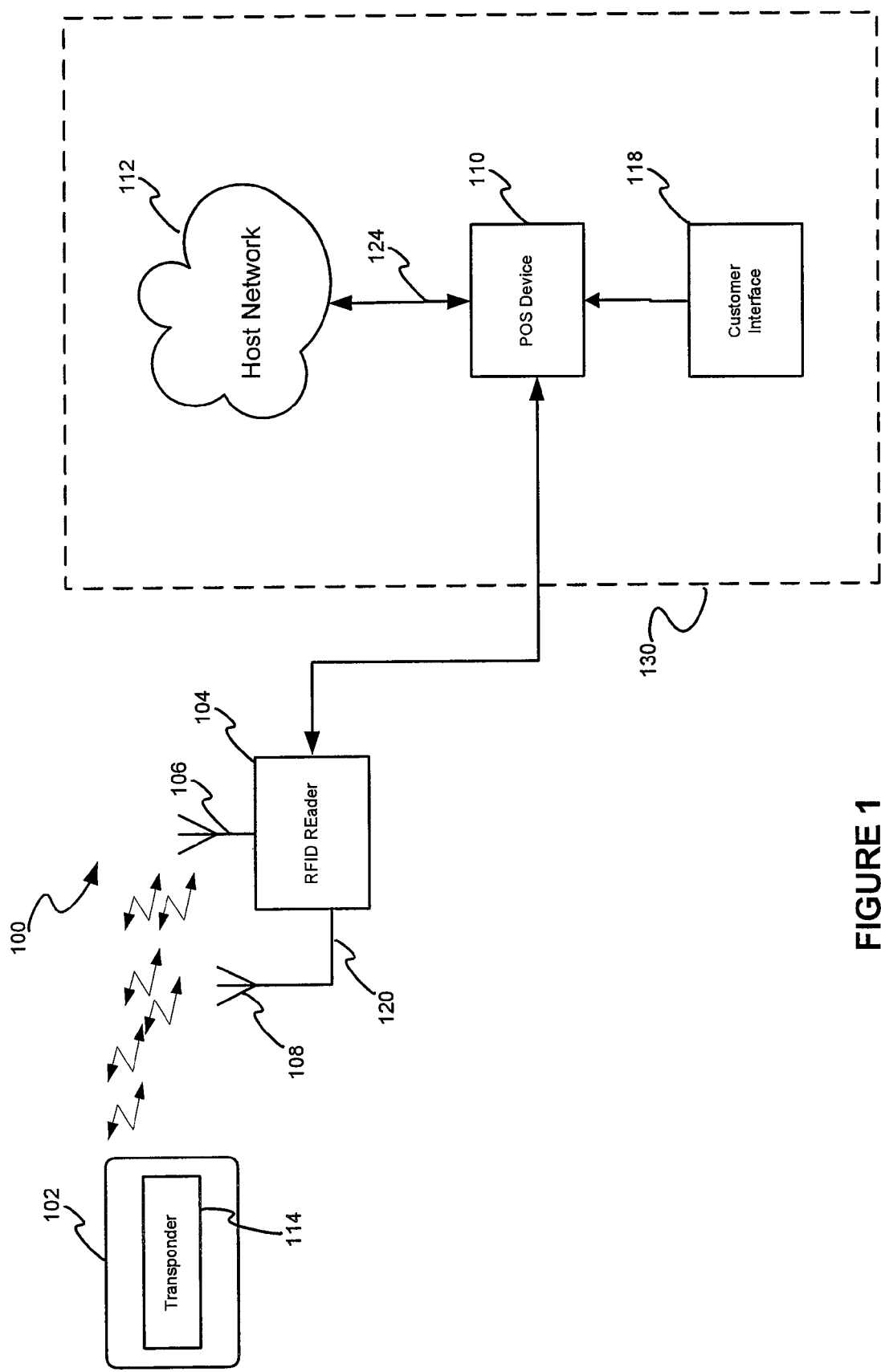
FIG. 1 illustrates an exemplary RF transaction card system in accordance with an exemplary embodiment of the present invention.

FIG. 1 illustrates an exemplary Radio Frequency (RF) transaction card system 100 in accordance with the present invention, wherein exemplary components for use in completing a contactless transparent transaction card transaction are depicted. In general, the operation of system 100 may begin when a contactless transparent transaction card 102 is presented for payment. An RFID reader 104 which may provide an interrogation signal for powering the card 102 then interrogates the contactless transparent transaction card. The contactless transparent transaction card 102 and RFID reader 104 may then engage in "mutual authentication" after which the card 102 may provide a transponder identifier and/or account identifier to the RFID reader 104 which may further provide the identifier to the merchant system 130 POS device 110.

It should be noted that although the present invention is described herein with reference to including only one RFID transponder system, one RFID or IC chip, the invention is not so limited. The invention contemplates the inclusion of one or more RFID transponder systems, IC chips or modules, or any combination thereof. For example, the dual transponder chip system disclosed in U.S. patent application Ser. No. 10/302, 658, entitled "TRANSACTION CARD WITH DUAL IC CHIPS," filed Nov. 22, 2002, discloses a suitable multi-chip arrangement which may be used with the present invention, and is therefore incorporated by reference in its entirety.

The RFID reader 104 may be configured to communicate using a RFID internal antenna 106. Alternatively, RFID reader 104 may include an external antenna 108 where the external antenna 108 may be made remote to the RFID reader 104 using a suitable cable and/or data link 120. RFID reader 104 may be further in communication with a transaction completion system (e.g., merchant system 130) via a data link 122. In one exemplary embodiment the transaction completion system may include POS device 110 in communication with a RFID reader 104 (via data link 122), and a customer interface 118 in communication with the POS device 110.

Although the point of interaction device is described herein with respect to a merchant point of sale (POS) device, the invention is not to be so limited. Indeed, a merchant POS device is used herein by way of example, and the point of interaction device may be any device capable of receiving card account data. In this regard, the POS may be any point of interaction device or card acceptance device enabling the user to complete a transaction using an RF responsive transponder.

POS device 110 may be in further communication with a customer interface 118 (via data link 128) for entering at least an alternate customer identity verification information such as, for example, a person identification number. POS device 110 may also be in communication with a merchant host network 112 (via data link 124) for processing any transaction request. In this arrangement, information provided by RFID reader 104 is provided to the POS device 110 of merchant system 130 via data link 122. The POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130 including the POS device 110 and host network 112 may reside on a local area network which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which is incorporated herein by reference.

An account number, as used herein, may include any identifier for an account (e.g., credit, charge debit, checking, savings, reward, loyalty, or the like) which may be maintained by a transaction account provider (e.g., payment authorization center) and which may be used to complete a financial transaction. A typical account number (e.g., account data) may be correlated to a credit or debit account, loyalty account, or rewards account maintained and serviced by such entities as American Express, Visa and/or MasterCard or the like. For ease in understanding, the present invention may be described with respect to a credit account. However, it should be noted that the invention is not so limited and other accounts permitting an exchange of goods and services for an account data value is contemplated to be within the scope of the present invention (e.g., barter account, rewards or points account).

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. The account number stored as Track 1 and Track 2 data as defined in ISO/IEC 7813, and further may be made unique to transparent transaction card 102. In one exemplary embodiment, the account number may include a unique card serial number and user identification number. The account number may be stored in transparent transaction card 102 inside a database 214 (shown in FIG. 2) as described more fully below. Database 214 may be configured to store multiple account numbers issued to the card 102 user by the same or different account providing institutions. Where the account data corresponds to a loyalty or rewards account, the database 214 may be configured to store the attendant loyalty or rewards points data.

Figure 2:
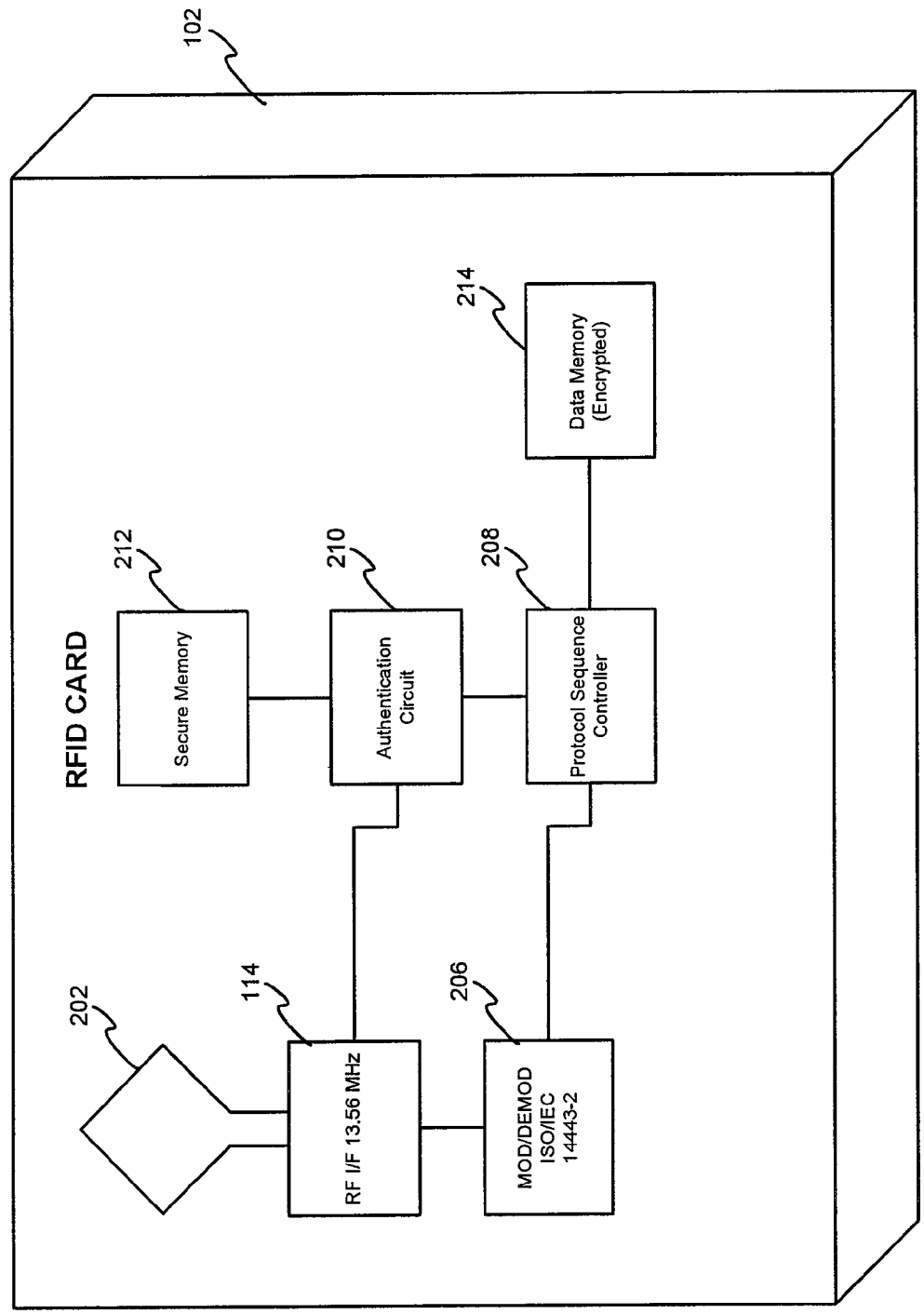
FIG. 2 illustrates an exemplary block diagram of an exemplary RFID transponder circuit for including in a contactless transparent transaction card in accordance with an exemplary embodiment of the present invention.

FIG. 2 illustrates a block diagram of the many functional blocks of exemplary transparent transaction card 102 circuitry, in accordance with the present invention. Card 102 may include one or more transponder responsive to RF interrogation by an RFID reader 104. As described herein, by way of example, the transparent transaction card 102 may include an RFID circuitry which may facilitate contactless payment for goods and/or services.

In one exemplary embodiment, card 102 may include an antenna 202 for receiving the RF interrogation signal from the RFID reader 104 via antenna 106 (or alternatively, via external antenna 108). Card antenna 202 may be in communication with a transponder 114. Where multiple antennas are included as part of the card internal circuitry, such as, where the card includes multiple transponder systems, chips or modules, each antenna may be configured to respond to multiple distinct frequencies with regards to the requirements of each. For example, transponder 114 may be a 13.56 MHz transponder compliant with the ISO/IEC 14443 standard, and antenna 202 may be of the 13 MHz variety. The transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 is of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of the transparent transaction card 102 account number. In this regard, protocol/sequence controller 208 may be any suitable digital or logic driven circuitry capable of facilitating determination of the sequence of operation for the card 102 inner-circuitry. For example, protocol/sequence controller 208 may be configured to determine whether the signal provided by the RFID reader 104 is authenticated, and thereby providing to the RFID reader 104 the account number stored on Card 102, database 214.

Protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 214 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The data may be used by protocol/sequence controller 208 for data analysis and used for management and control purposes, as well as security purposes. Authentication circuitry 210 may authenticate the signal provided by RFID reader 104 by association of the RFID signal to authentication keys stored on database 212. Encryption circuitry may use keys stored on database 212 to perform encryption and/or decryption of signals sent to or from the RFID reader 104.

In addition, protocol/sequence controller 208 may be in communication with a database 214 for storing at least a transparent transaction card 102 account data, and a unique card 102 identification code. Protocol/sequence controller 208 may be configured to retrieve the account number from database 214 as desired. Database 214 may be of the same configuration as database 212 described above. The card account data and/or unique card identification code stored on database 214 may be encrypted prior to storage. Thus, where protocol/sequence controller 208 retrieves the account data, and or unique card identification code from database 214, the account number may be encrypted when being provided to RFID reader 104. Further, the data stored on database 214 may include, for example, an unencrypted unique card 102 identification code, a user identification, Track 1 and Track 2 data, as well as specific application applets.

Figure 3:
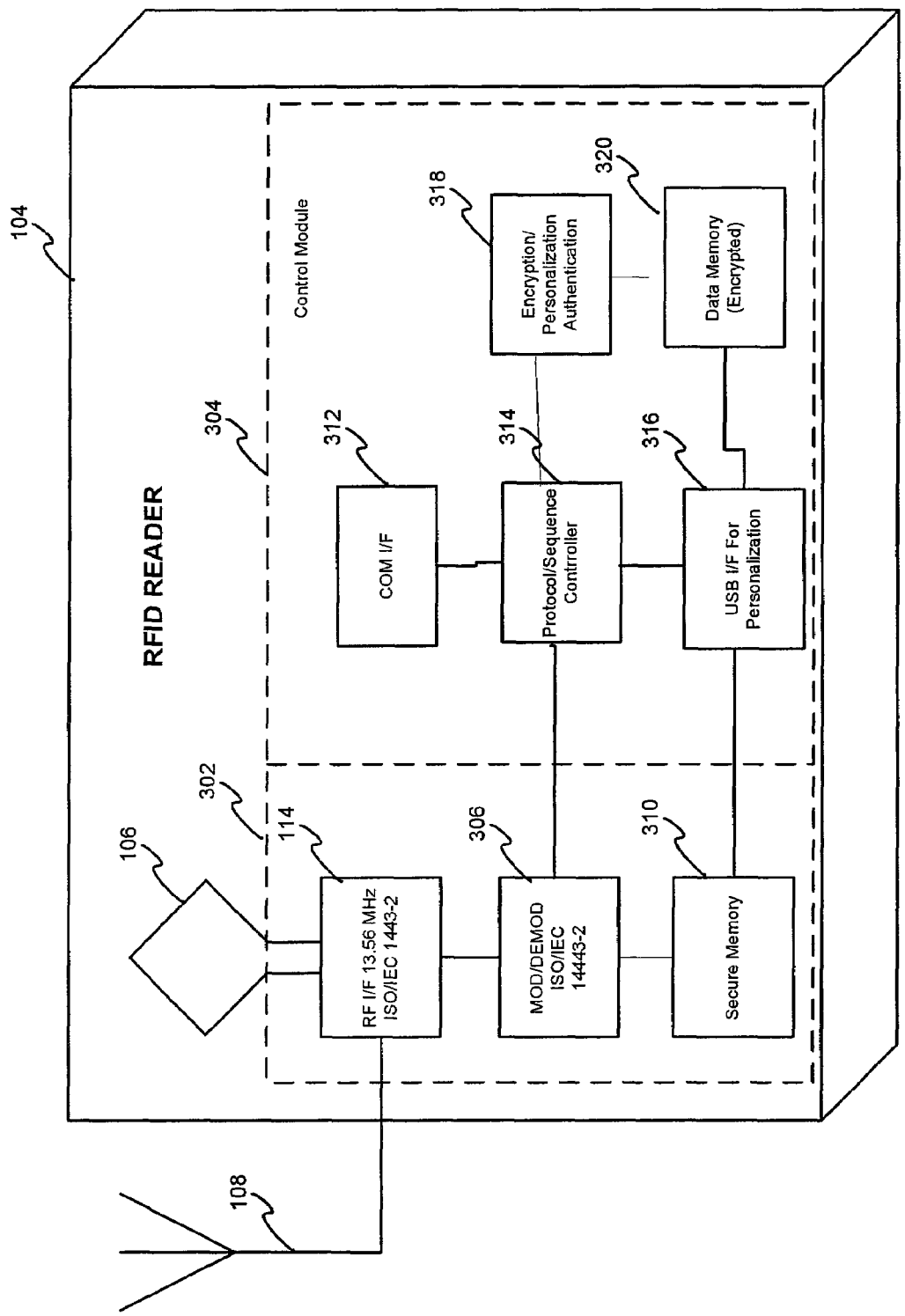
FIG. 3 illustrates an exemplary block diagram of an exemplary RFID reader in accordance with an exemplary embodiment of the present invention.

FIG. 3 illustrates an exemplary block diagram of a RFID reader 104 which may be used in accordance with an exemplary embodiment of the present invention. RFID reader 104 includes, for example, an antenna 106 coupled to a RF module 302, which is further coupled to a control module 304. In addition, RFID reader 104 may include an antenna 108 positioned remotely from the RFID reader 104 and coupled to RFID reader 104 via a suitable cable 120, or other wire or wireless connection.

RF module 302 and antenna 106 may be suitably configured to facilitate communication with an RF responsive transponder 114 contained in a card 102. Where transparent transaction card 102 is formatted to receive a signal at a particular RF frequency, RF module 302 may be configured to provide an interrogation signal at that same frequency. For example, in one exemplary embodiment, transparent transaction card 102 may be configured to respond to an interrogation signal of about 13.56 MHz. In this case, RFID antenna 106 may be 13 MHz and may be configured to transmit an interrogation signal of about 13.56 MHz.

RFID antenna 202 (e.g., antenna 106) may be in communication with a transponder 306 for transmitting an interrogation signal and receiving at least one of an authentication request signal and/or an account data from card 102. Transponder 306 may be of similar description as transponder 114 of FIG. 2. In particular, transponder 306 may be configured to send and/or receive RF signals in a format compatible with antenna 202 in similar manner as was described with respect to fob transponder 114. For example, where transponder 306 is 13.56 MHz RF rated antenna 202 may be 13.56 MHz compatible. Similarly, where transponder 306 is ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to the transparent transaction card 102 which are authorized to transact business over system 100. Database 310 may additionally store RFID reader 104 identifying information for providing to card 102 for use in authenticating whether RFID reader 104 is authorized to be provided the card 102 account number stored on card database 214.

Authentication circuitry 308 may be of similar description and operation as authentication circuitry 210. That is, authentication circuitry 308 may be configured to authenticate the signal provided by card 102 in similar manner as authentication circuitry 210 may be configured to authenticate the signal provided by RFID reader 104. In accordance with the invention, card 102 and RFID reader 104 engage in mutual authentication. In this context, "mutual authentication" may mean that operation of the system 100 may not take place until card 102 authenticates the signal from RFID reader 104, and RFID reader 104 authenticates the signal from card 102. Such methods of mutual authentication are described in detail in application Ser. No. 10/192,488, commonly owned by the Assignee of the present invention. Therefore, mutual authentication may not be repeated herein for brevity.

Figure 4:
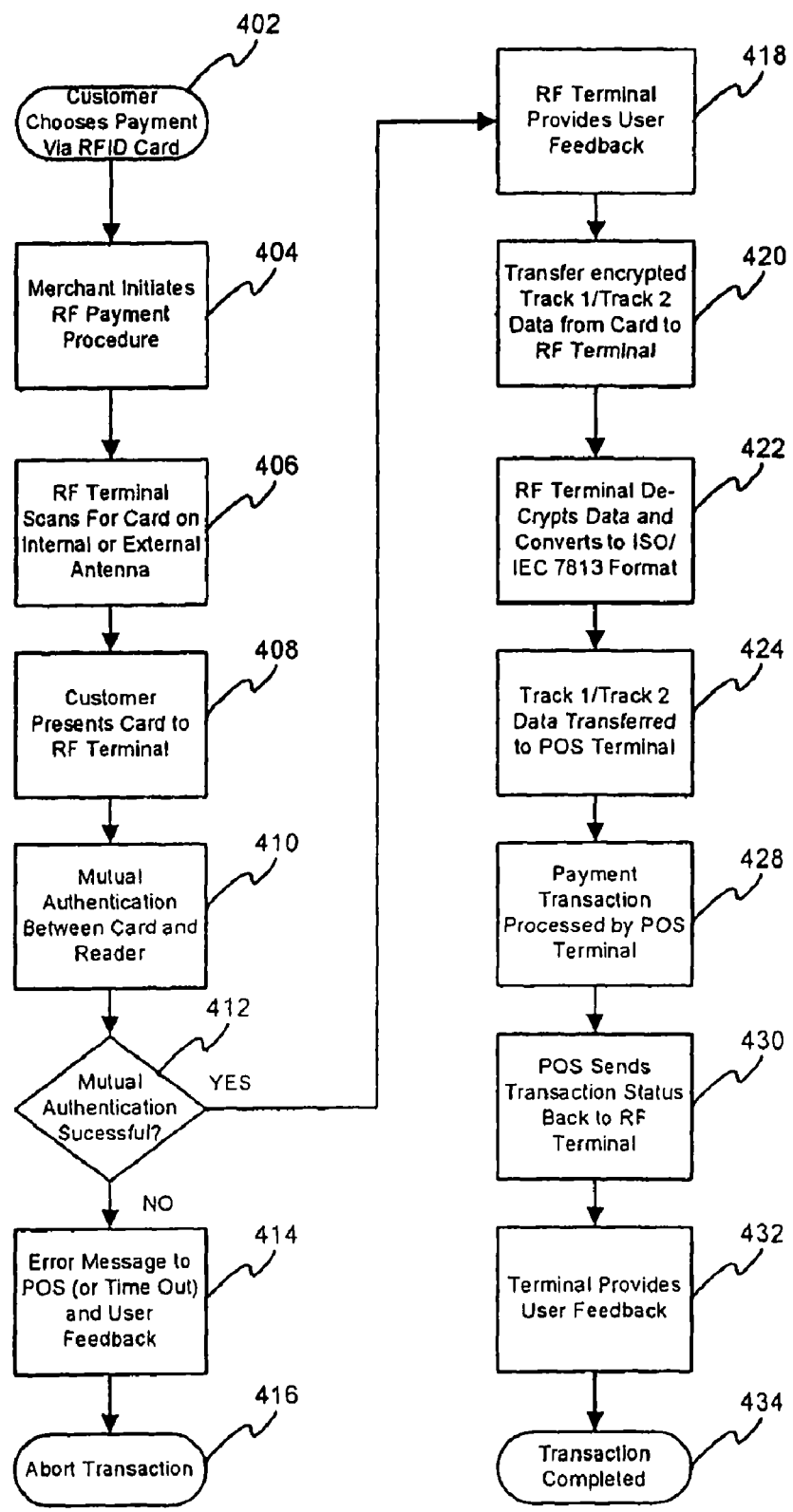
FIG. 4 illustrates an exemplary flow diagram of the operation of an exemplary RF transaction card system in accordance with an exemplary embodiment of the present invention.

FIG. 4 illustrates an exemplary flow diagram for the operation of system 100. The operation may be understood with reference to FIG. 1, which depicts the elements of system 100 which may be used in an exemplary transaction involving the contactless transaction card of the present invention. The process is initiated when a customer desires to present a contactless transparent transaction card 102 for payment (step 402). Upon presentation of the card 102, the merchant initiates the RF payment procedure via an RFID reader 104 (step 404). In particular, the RFID reader sends out an interrogation signal to scan for the presence of card 102 (step 406). The RF signal may be provided via the RFID reader antenna 106 or optionally via an external antenna 108. Upon presenting the transparent transaction card 102 for payment (step 408), the card 102 is activated by the RF interrogation signal provided.

The card 102 and the RFID reader 104 may then engage in mutual authentication (step 410). Where the mutual authentication is unsuccessful, an error message may be provided to the customer via the RFID optical and/or audible indicator (step 414) and the transaction may be aborted (step 416). Where the mutual authentication is successful (step 412), the RFID reader 104 may provide the customer with an appropriate optical and/or audible message (e.g., "transaction processing" or "wait") (step 418). The transparent transaction card protocol/sequence controller 208 may then retrieve from database 214 an encrypted card account number and provide the encrypted account number to the RFID reader 104 (step 420).

The RFID reader 104 may then decrypt the account number (step 422) and convert the account number into magnetic stripe (ISO/IEC 7813) format (step 424) and provide the unencrypted account number to the merchant system 130 (step 428). In particular, the account number may be provided to the POS 110 device for transmission to the merchant network 112 for processing under known business transaction standards. The POS device 110 may then send an optical and/or audible transaction status message to the RFID reader 104 (step 430) for communication to the customer (step 432).

The preceding paragraphs describe in general an exemplary contactless transaction system which may be used with the present invention. It should be noted, however, that the present invention is not limited to the embodiment described. That is, any contactless data transfer system which may be incorporated on a standard size transaction card may be used. For example, the transponder system described in U.S. Pat. No. 6,073,840, entitled "FUEL DISPENSING AND RETAIL SYSTEM PROVIDING FOR TRANSPONDER PAYMENT" and issued Jul. 13, 2000, and U.S. Pat. No. 5,519,381, entitled "DETECTION OF MULTIPLE ARTICLES," issued May 21, 1996, may be suitable for use with the present invention.

The ability of the transparent transaction card to communicate in a contactless environment is but one aspect of the present invention. In another aspect, the circuitry, such as that described above for facilitating the contactless transaction is preferably included in a transparent transaction card as described below.

The present invention overcomes the problems of the prior art (e.g., undetectable transparent card, ATM jamming, etc.) by incorporating materials having machine recognizable compounds into the layers of the transaction card body. In an exemplary embodiment, the machine recognizable compounds are optically recognizable compounds containing infrared blocking (absorbing, refracting, diffusing, reflecting or otherwise blocking) ingredients. The optically recognizable compounds may be invisible, visible, or colored to produce a desired effect and/or they may contain other detectable compounds, such as, for example, UV-Fluorescent or IR-Fluorescent features. The optical compounds preferably have good stability, resistance properties, durability and other physical properties, such as good appearance, flexibility, hardness, solvent resistance, water resistance, corrosion resistance and exterior stability. Moreover, the use of such compounds typically does not interfere with UV compounds that may be present in many substrates. One skilled in the art will appreciate that the optically recognizable compound is any chemical, solution, dye, ink substrate, material and/or the like which is recognizable by a sensor. In an exemplary embodiment, the optically recognizable ink is an infrared ink which blocks, absorbs or reflects most infrared light, but transmits most other wavelengths of light. The optically recognizable compound is referred to as an IR ink for ease in understanding and not by way of limitation.

In an exemplary embodiment, the optically recognizable compound is incorporated into a material in the form of a film, plastic, fiber, ink, concentrate, thermoplastic or thermoset matrix, thread, planchette, and/or other medium which contains in the range of about 0.001 to 40.0 wt. (%) of a compound derived from organic or inorganic materials. If incorporated in a film, the film containing the compound may be extrusion coated to one or more transparent or translucent layers, as described herein. A suitable process for applying the machine recognizable film is disclosed in U.S. patent application Ser. No. 10/092,681, entitled "TRANSACTION CARD," filed Mar. 7, 2002, and incorporated herein in its entirety.

If incorporated in an ink, the infrared ink may be applied to transparent or translucent layers of transaction card (see FIGS. 5 and 6) by, for example, a screen printing process or any other printing or coating means such as lithography, gravure, flexo, calender coating, curtain coating, roller coating and/or the like. An exemplary screen printing process utilizes a screen press equipped with drying equipment (UV curable or convection heat) and a screen with a specific mesh size of about 80 lines/cm. The IR ink may be printed across any portion of the entire card surface of plastic using a silk screen press, as described below.

Because the relative eye sensitivity of an ordinary observer for a specified level of illumination is between around 400-770 nm, infrared ink at over 770 nm is preferable because it is invisible to the human eye in normal white light. As such, the invisible infrared material will not substantially obscure the transparent surface of the transaction card. Additionally, the exemplary ink withstands card production temperatures of about 200° F. to 400° F. degrees and includes a "light fastness period" (which is the resistance of the ink to fade or degrade in the presence of any light, and specifically, UV light) of about at least three years under normal credit card usage conditions. Moreover, the exemplary ink blocks, absorbs or reflects the spectral output of IRED's, such as, for example, the Sankyo Seiki LED's, which is about 800-1000 nm. The exemplary ink also limits the light reaching the phototransistors, so the presence of a clear card having the ink is detected in a transaction machine, such as, for example, a card grabbing-type ATM machine.

Exemplary compositions of the machine recognizable compounds of the present invention comprise a mixture of a wide variety of compounds. The active compounds are derived of inorganic, organometallic, ore organic layered materials or rare earth compounds, most commonly rare earth oxides, oxysulfides or oxyhalides. The compounds are relatively inert, so the effects on the performance properties of the final product are minimized. The infrared compound comprises either a dye, layered material, pigment and/or encapsulated pigment that is dispersed in a particular medium which can be incorporated into a wide variety of end-usable products. The particle size of the infrared compound allows the materials (plastic, thread, ink, etc.) to optimally dispersed or dissolved and uniformly exist within the articles which it is incorporated.

Conventionally known infrared materials comprising layered dielectric and metallic materials or doped rare-earth materials can be effectively used as pigments for compounds in accordance with exemplary embodiments of the present invention. In this context, the pigments or dyes absorb specific wavelengths of energy and may change one wavelength of energy to another. The energy conversions or absorptions may be above or below any stimulation within the electromagnetic spectrum. The compounds may absorb specific wavelengths of light or change from one color to another or the compounds may change from invisible to visible and/or the like. The infrared compounds of the present invention are thus incorporated into a system which reversibly changes one wavelength of energy to another, hence causing a "fingerprint"—type of detectable feature within the articles.

Moreover, the prepared films or materials can be mixed with a binder to form infrared compounds for use in threads, fibers, coatings, and the like. Binders that can be incorporated in the present invention include conventional additives such as waxes, thermoplastic resins, thermoset resins, rubbers, natural resins or synthetic resins. Such examples of such binders are, polypropylene, nylon, polyester, ethylene-vinyl acetate copolymer, polyvinyl acetate, polyethylene, chlorinated rubber, acrylic, epoxy, butadiene-nitrile, shellac, zein, cellulose, polyurethane, polyvinylbutyrate, vinyl chloride, silicone, polyvinyl alcohol, polyvinyl methyl ether, nitrocellulose, polyamide, bismaleimide, polyimide, epoxy-polyester hybrid and/or the like. Films that can be used include polyester, polyvinylchloride, polypropylene, polyethylene, acrylic, polycarbonate and/or the like. As discussed below, any film can be laminated or adhered to common card articles using heat, adhesives, or a combination of both.

If the content of the compound is too low, adequate blocking may not be achieved and the phototransistor may not send the proper signal to the capture device, which will mean that the card will not be detected. Therefore, the infrared compounds are usually present in the composition at a total amount from about 1 PPM to 80.0 wt. (%), and preferably from about 0.25%-25.0% by weight. Moreover, the present invention contemplates that other materials such as, for example, UV absorbers, reflectors, antioxidants, and/or optical brighteners, may be add in order to achieve better resistance properties, aesthetics, or longevity of the materials.

Particularly, other materials may be added to allow for color shifts from one color to another color after stimulation. Commonly employed materials such as dyes, pigments, fluorescent dyes, luminous pigments, and/or the like, can be used to promote reversible color changes from one color state to another color state. Such materials can be incorporated directly with the infrared compounds during initial processing or may be added after the infrared compounds have been processed. The use of materials such as solvents, water, glycols, and/or the like can be added to adjust rheological properties of the material. Also, the use of surfactants, defoamers, release agents, adhesion promoters, leveling agents, and/or the like may be added to the formulations for improved processing properties. Optical brightening materials may also be added to ensure whiteness in a colorless state and to maintain a low level of contrast between many substrates where infrared compounds are located.

The exemplary infrared compounds in accordance with this invention are deposited onto films of various compositions and can be used in most card applications. Moreover, the infrared compounds in accordance with the present invention can be used alone or blended with other materials at ranges from 0.001 to 50.0 parts by weight, but most preferable from 1.0 to 15.0 parts by weight.

Typical examples of suitable inks and films for use with the present invention are described in U.S. Pat. No. 6,581,839 issued Jun. 24, 2003, incorporated herein in its entirety. As such, the various suitable compositions of the IR blocking ink will not be repeated here for brevity.

FIGS. 7A-7I represent various spectra of films, coatings, cards, etc. which demonstrate the ability of the materials used in the card constructions to block sufficient quantities of infrared radiation and transmit visible light in order to produce cards described in the embodiment. The mechanism of blocking may be absorption, reflection, diffusion, dispersion or other methods of blocking radiation in the electromagnetic spectrum. A complete description of the representations in FIGS. 7A-7I may be found in U.S. Pat. No. 6,581,839 incorporated herein. Thus, the description will not be repeated herein for brevity.

Figure 8:
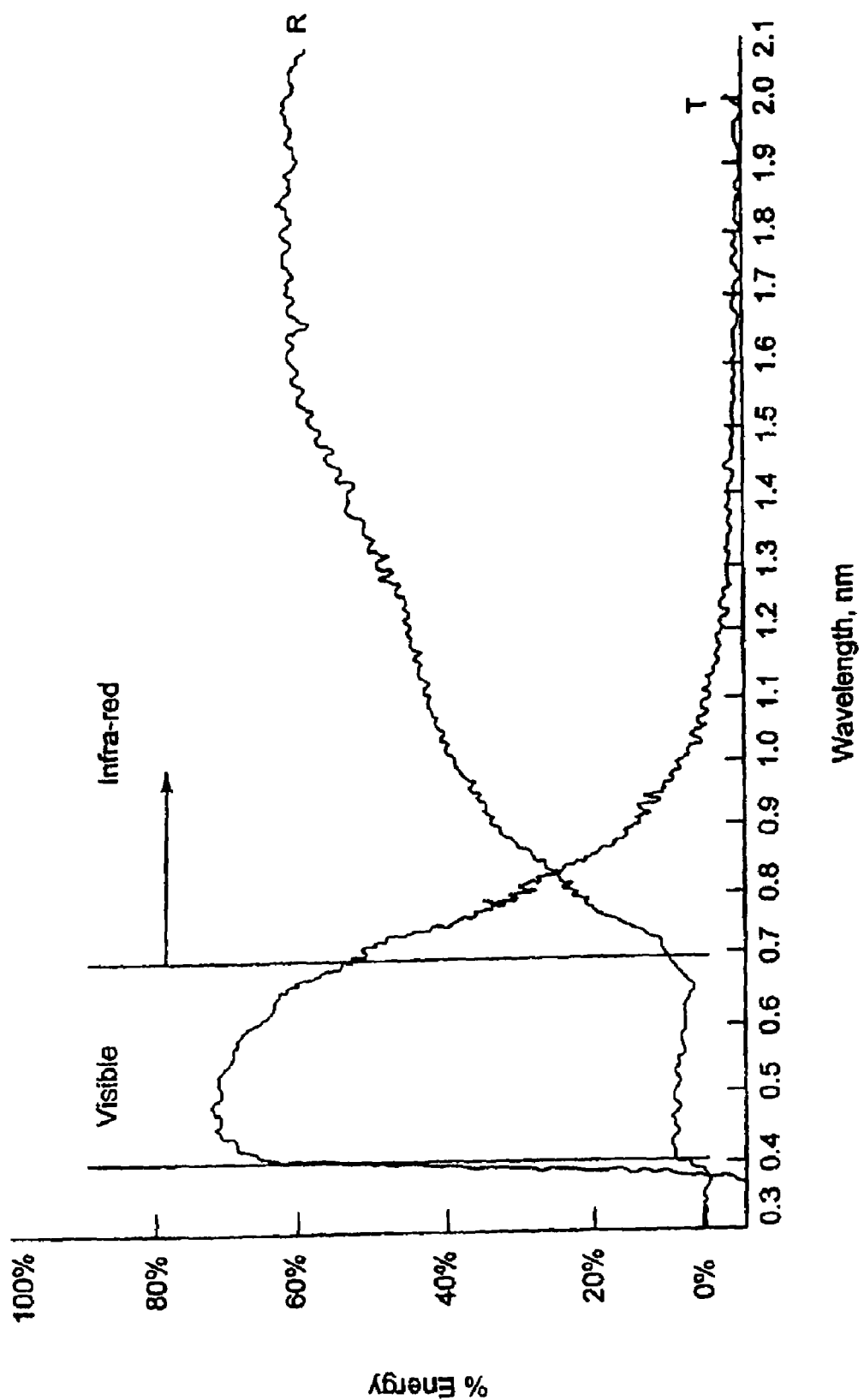
FIG. 8 is a graph of energy v. wavelength for the reflection and transmission of IR film in accordance with an exemplary embodiment of the present invention.

In addition to the IR inks, the optically recognizable compound may alternatively be a film or hot mirror which also blocks (absorbs or reflects) infrared light, but transmits all other wavelengths of light. The placement of the optically recognizable compound may be understood with respect to FIG. 5 (depicting a transparent transaction card 500 front surface) and FIG. 6 (depicting a transparent transaction card 500 rear surface). For example, in an exemplary embodiment, the film is set between a transparent/translucent front sheet 11 and back sheet 17. FIG. 8 is a graph of energy v. wavelength for the reflection and transmission of an exemplary IR film including the optically recognizable compound, in accordance with an exemplary embodiment of the present invention. FIG. 8 shows that, while the visible light is transmitted through the film, the infrared light is blocked at higher wavelengths and a substantial amount of infrared light is reflected.

As noted, the optically recognizable compounds may be incorporated into a transaction card via a film, plastic, printing ink, coating or other application medium by grinding or the use of dispersed or deposited material into a liquid, paste or other type of medium. To minimize environmental damage to the ink, such as the ink being scratched, the ink is preferably applied directly onto the plastic sheets under the laminate (in step 170 described more fully below). Moreover, the infrared ink may be applied on the inside or outside surface of the plastic sheets.

In an exemplary embodiment, incorporating the optically recognizable compound into a transparent transaction card may not require a separate printing unit, modifications to existing processing equipment or an additional operational step. Particularly, the fabrication of the articles, such as a transaction card, typically utilizes existing equipment which incorporate colorants anyway, so the application of the optically recognizable compounds to the existing colorants do not add extra equipment or steps to the process.

In a further exemplary embodiment, the optically recognizable compounds block light which is detectable by machines. More particularly, the machines suitably detect the presence of a card via infrared interference at one or several wavelengths. In an exemplary embodiment, detection of materials may include the production of a visual effect when the materials are interrogated with invisible infrared radiation from the proper instrument, and when such radiation contacts the infrared material, a visual effect, such as a colored light, can be seen. Alternatively, the materials may be detected by a remote detector that will indicate the presence of the materials. Detection or authentication of the materials occurs above and below the stimulation wavelength of the reading device.

As such, once the optically recognizable material has been detected, the detection device may then provide the user with a positive identification signal, which is preferably located on or near the detection device.

Figure 9:
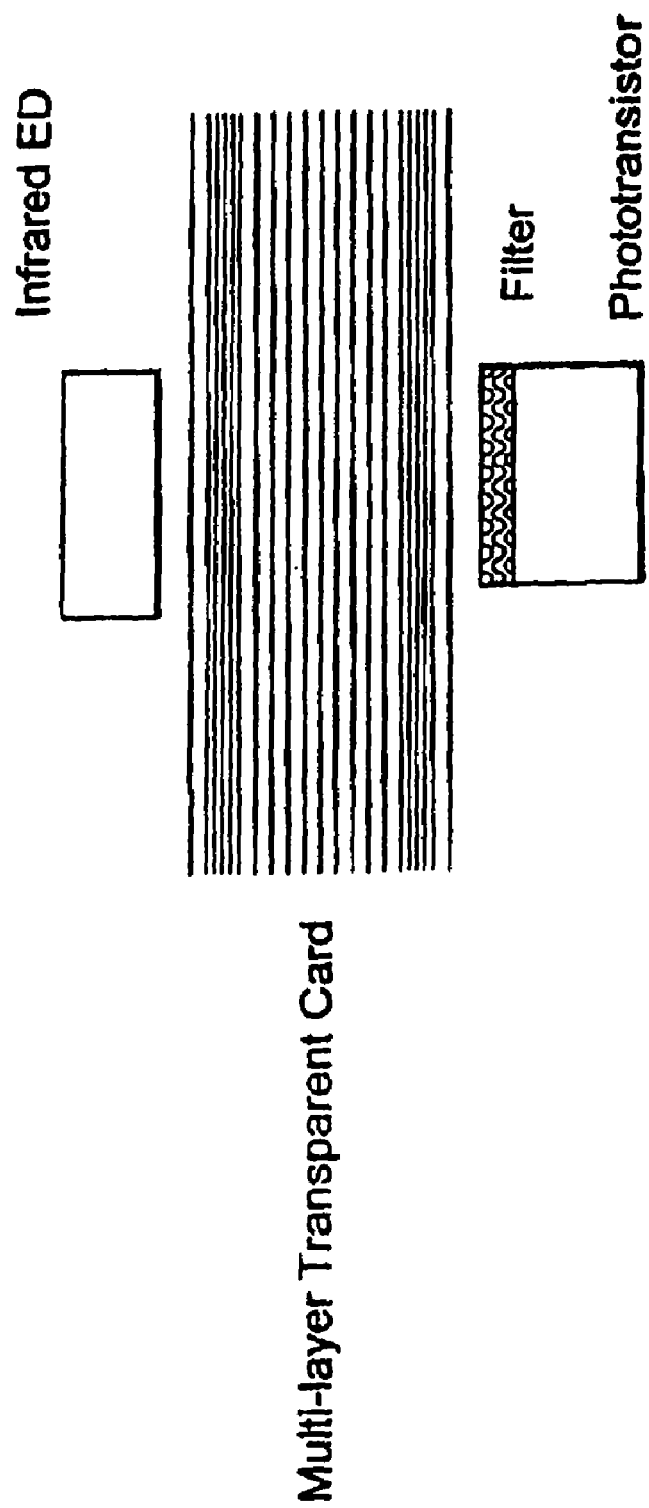
FIG. 9 is a schematic diagram of an exemplary sensor mechanism within an ATM in accordance with an exemplary embodiment of the present invention.

When used in a contact environment, the detection of IR materials trigger the sensors in ATM machines. In particular, with respect to FIG. 9, the present invention allows for the passage of a greater percentage of visible light (from about 400 nm to 700 nm), which allows the card to appear translucent in nature, while allowing for the blockage of certain light (from about 700 nm and above) to allow the phototransistors in ATM's to detect that a card has been inserted into the carriage mechanism. As discussed above, an exemplary ATM sensing device includes an IRED, a filter and a phototransmitter.

In addition to triggering the sensors in ATM machines, transparent transaction card 500 can be used with any magnetic stripe or smart card reader. The reader system can include a card reader/writer, a point-of-sale terminal, ATM or any other acceptance device as described above. In an exemplary embodiment, card 500 is used in conjunction with a reader which, not only detects the existence of the card, but also may illuminate the transparent portion of card 500 when the card is inserted into the reader. The illumination source can be either an incandescent or solid-state source (infrared emitting diode or laser). In operation, when the card is inserted into the acceptance device, the edge of the card presses against the illumination assembly (or activates a switch, interrupts a beam, etc.). Depending upon the application of the card, the illumination source can be under the control of the acceptance device or external software. Thus, the illumination source can flash or display a particular color if directed by the external software program. Additionally, depending on the structure of the card, the illumination source could be used to excite an embedded design useful for security or product enhancement.

Figure 5:
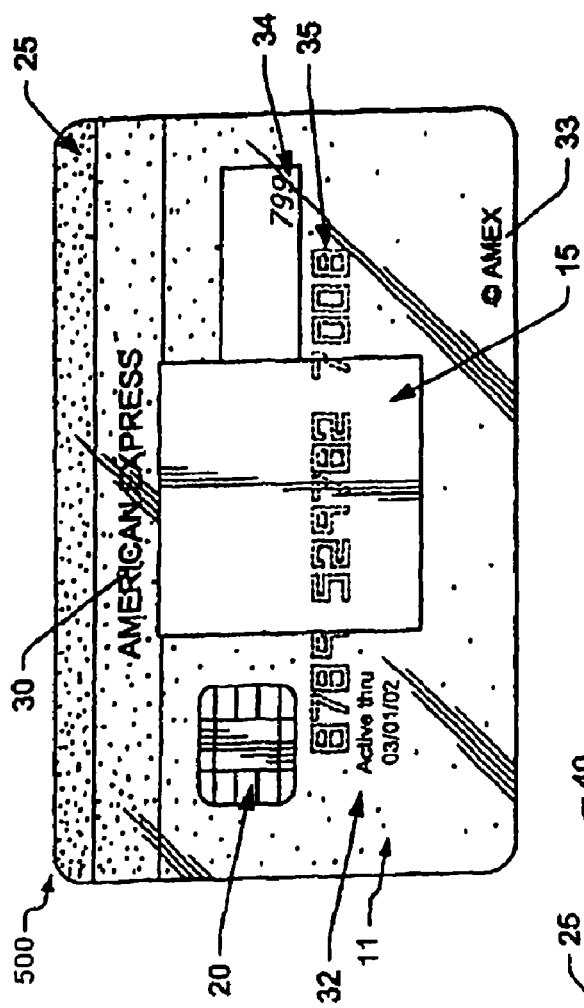
FIG. 5 depicts the front surface of an exemplary contactless transparent transaction card in accordance with an exemplary embodiment of the present invention.
Figure 6:
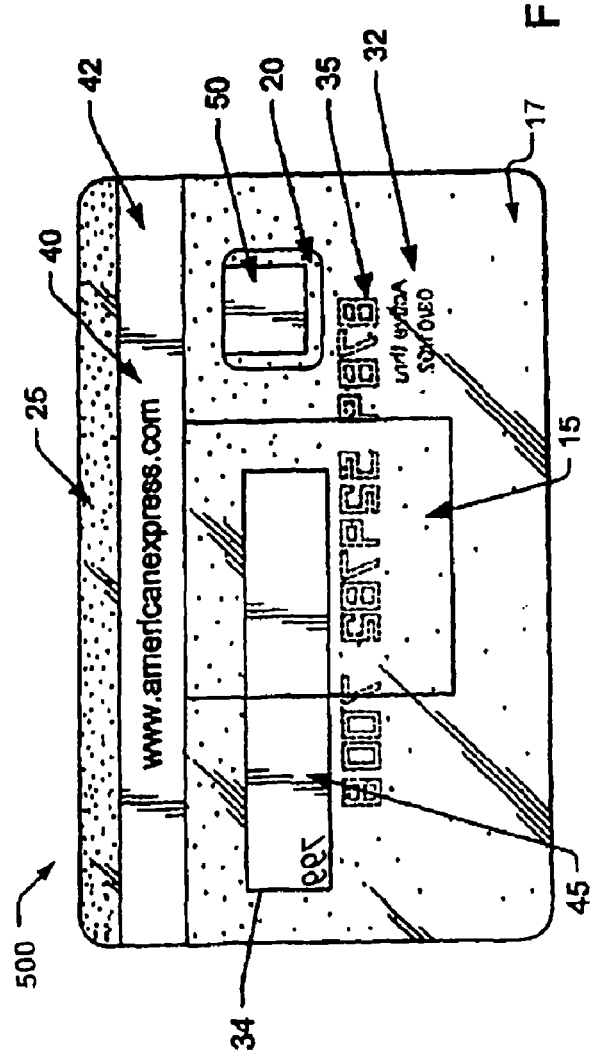
FIG. 6 depicts the rear surface of an exemplary contactless transparent transaction card in accordance with an exemplary embodiment of the present invention.
Figure 7A:
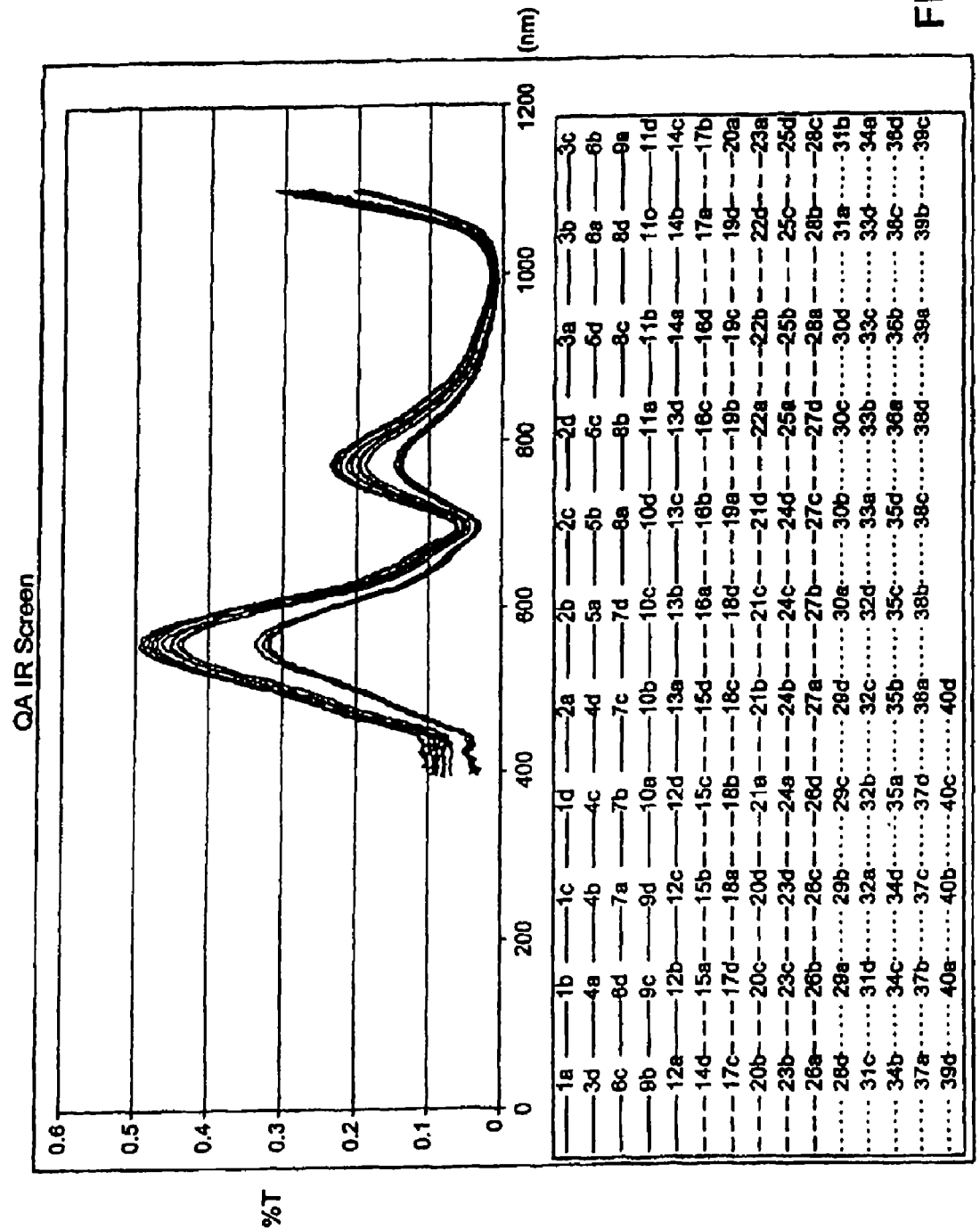
Figure 7B:
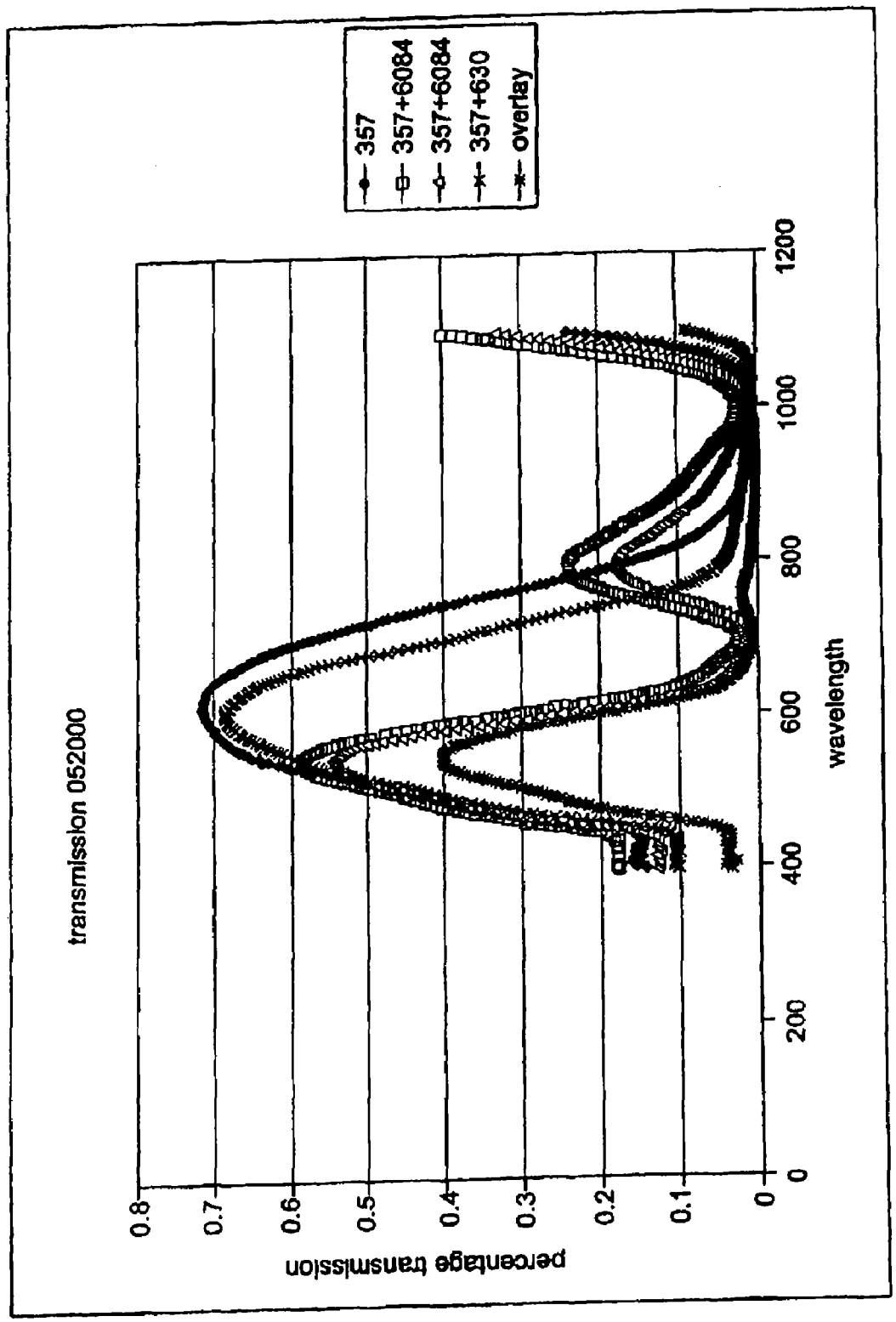
Figure 7C:
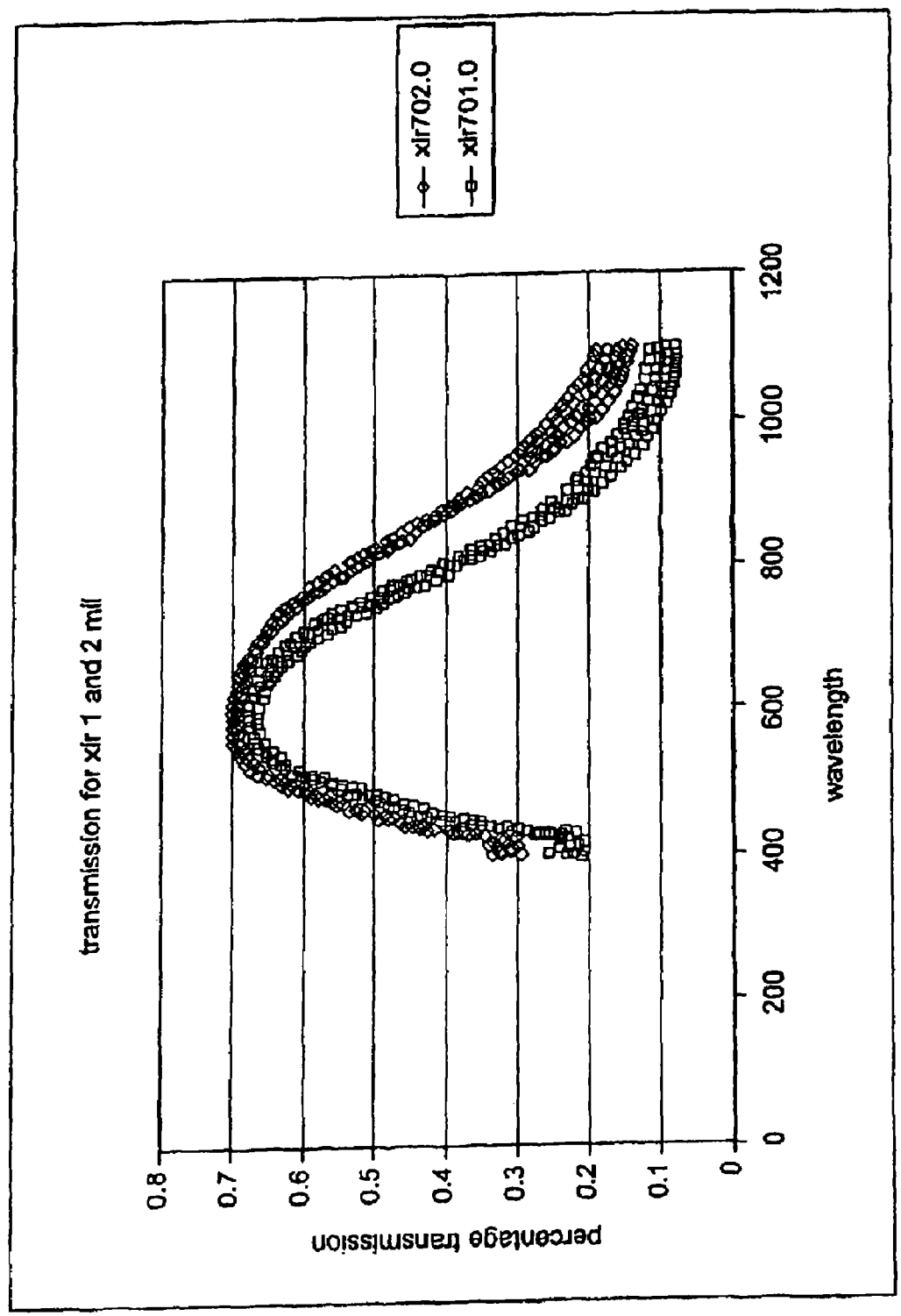
Figure 7D:
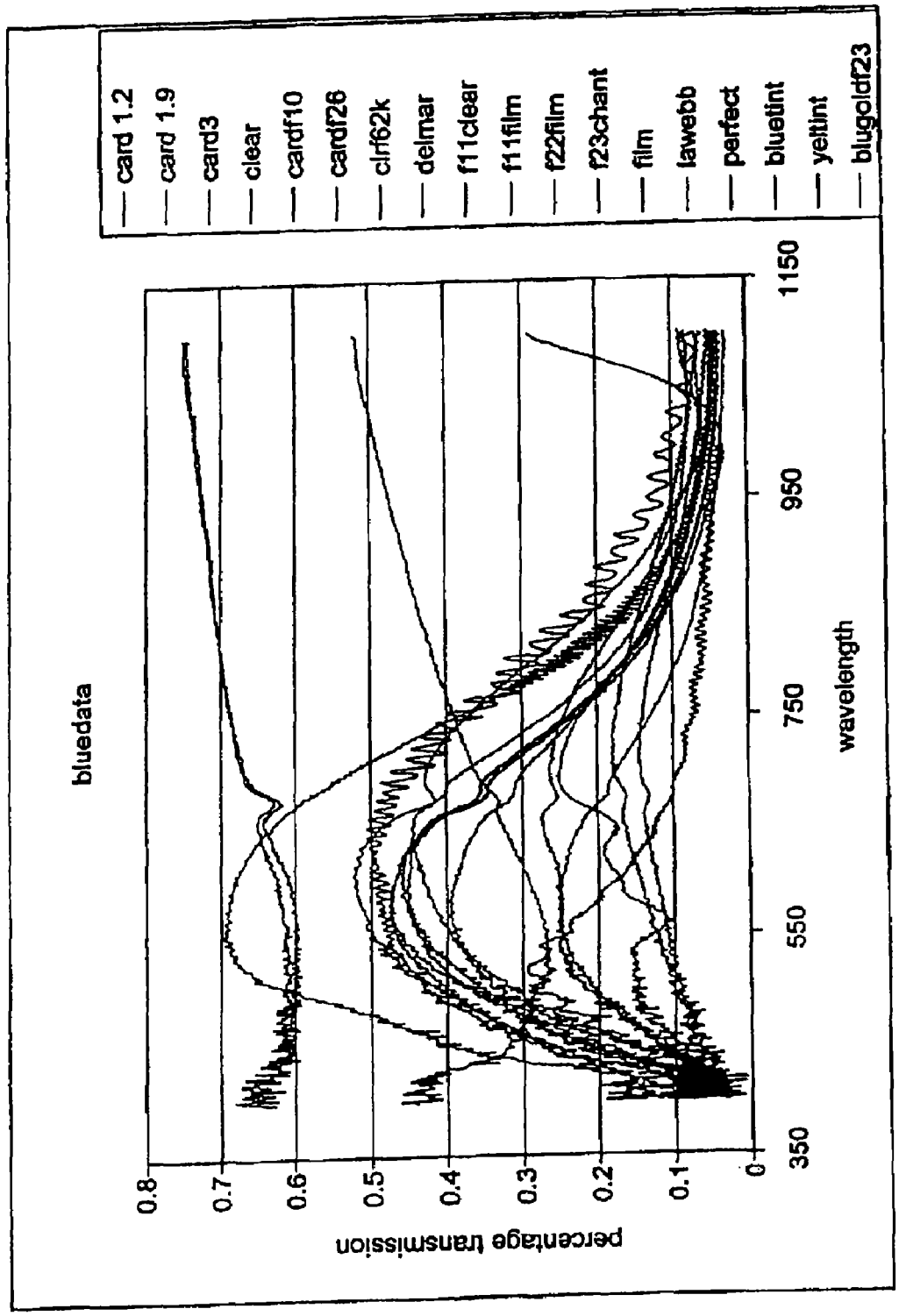
Figure 7E:
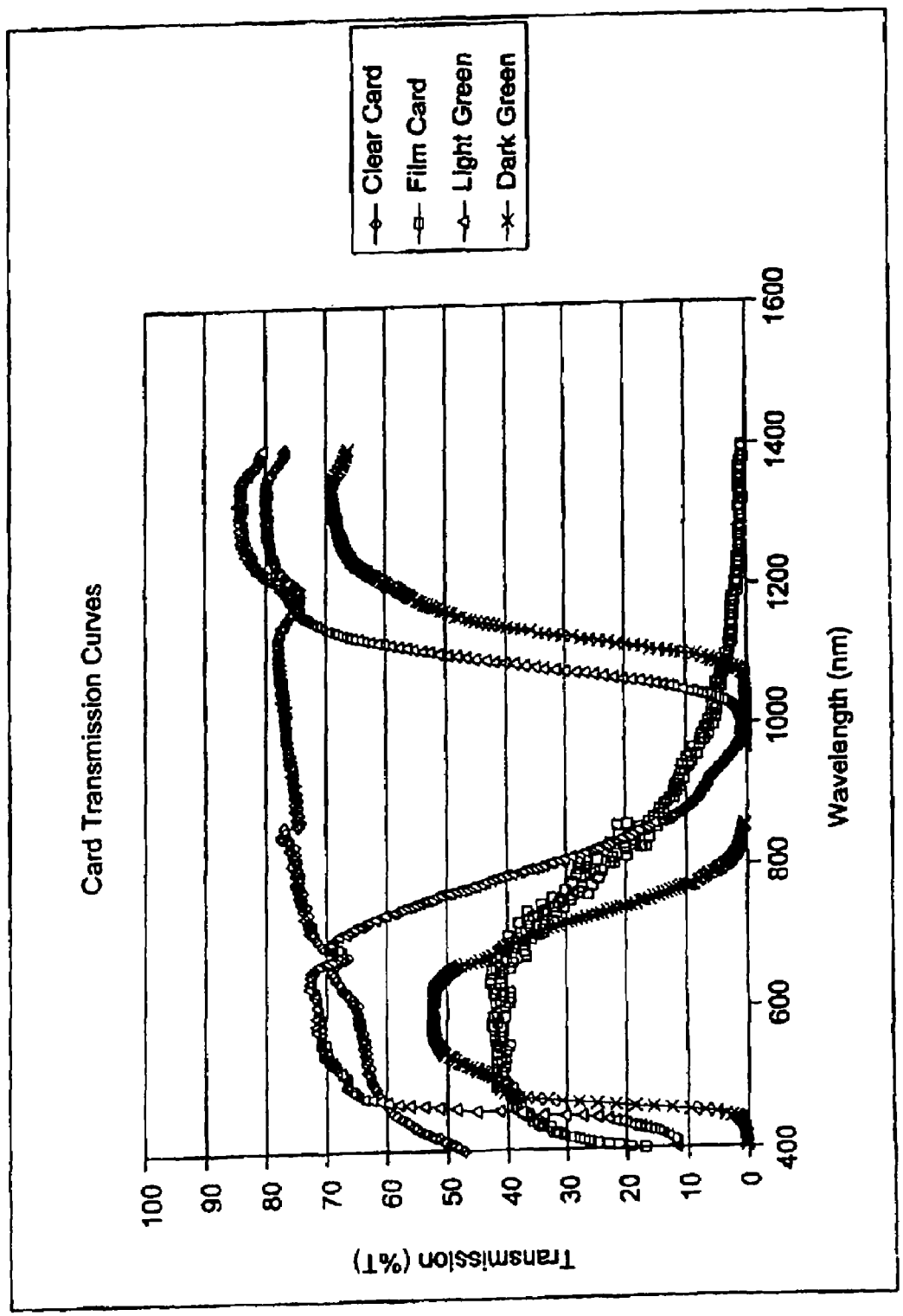
Figure 7F:
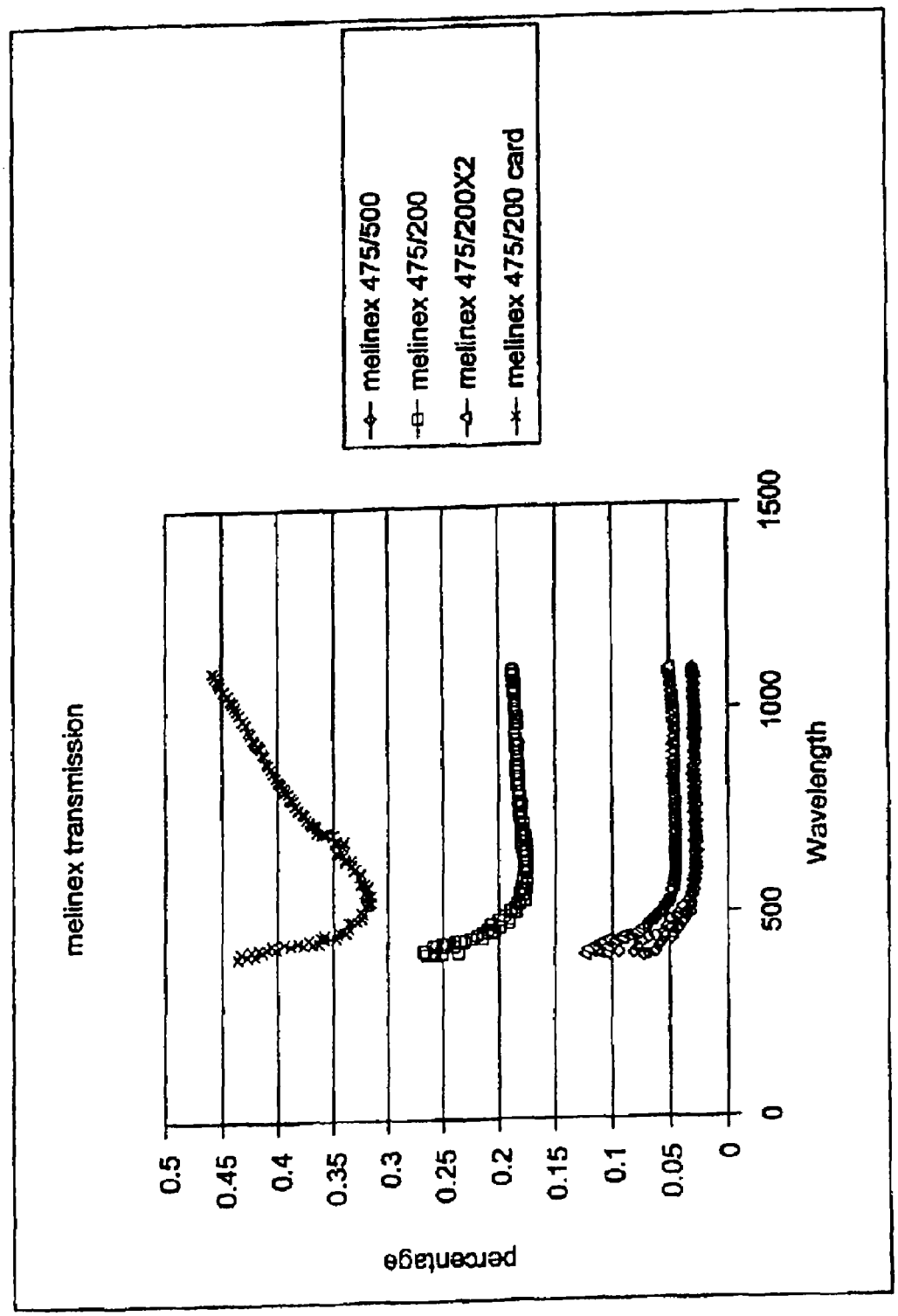
Figure 7G:
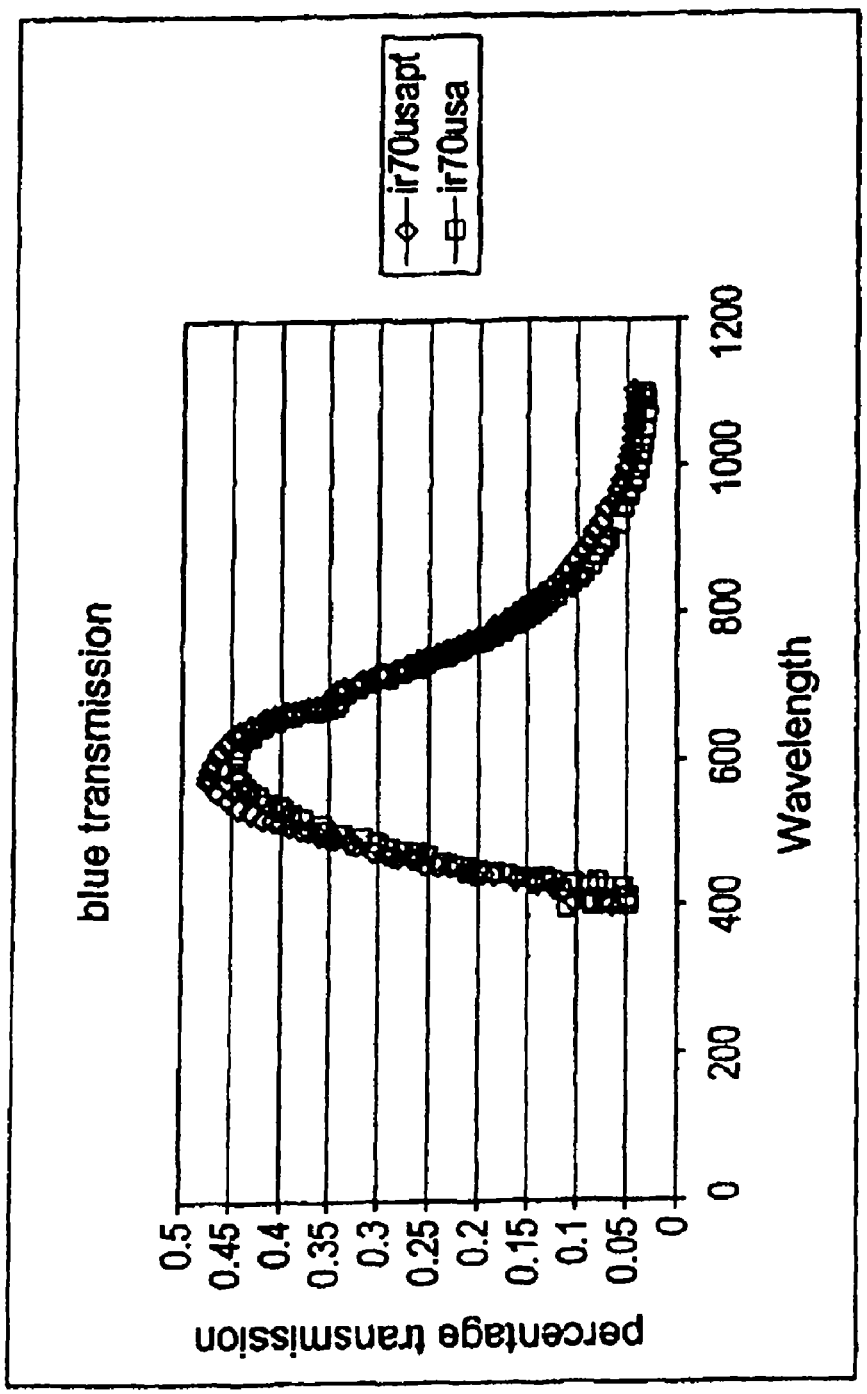
Figure 7H:
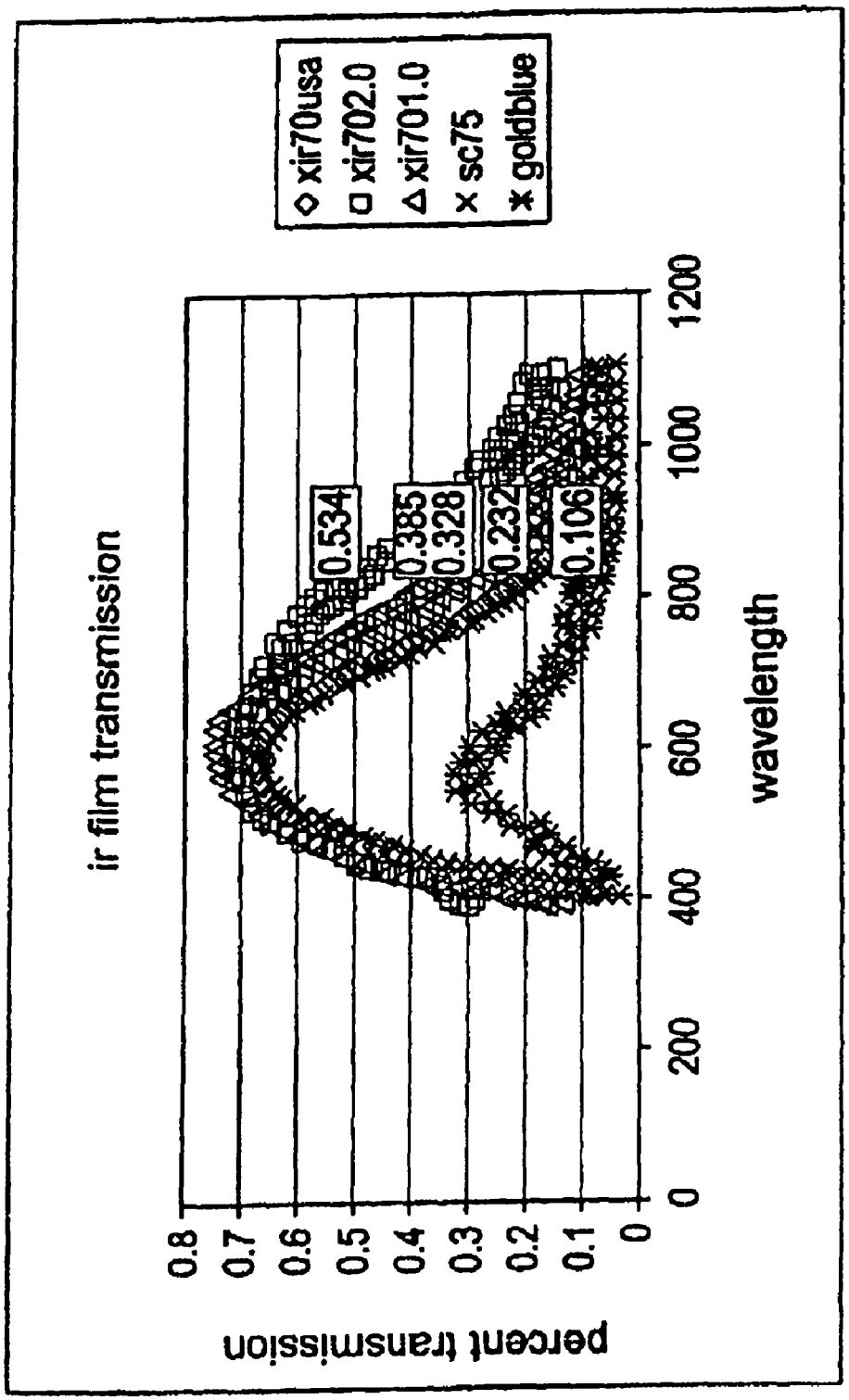
Figure 71:
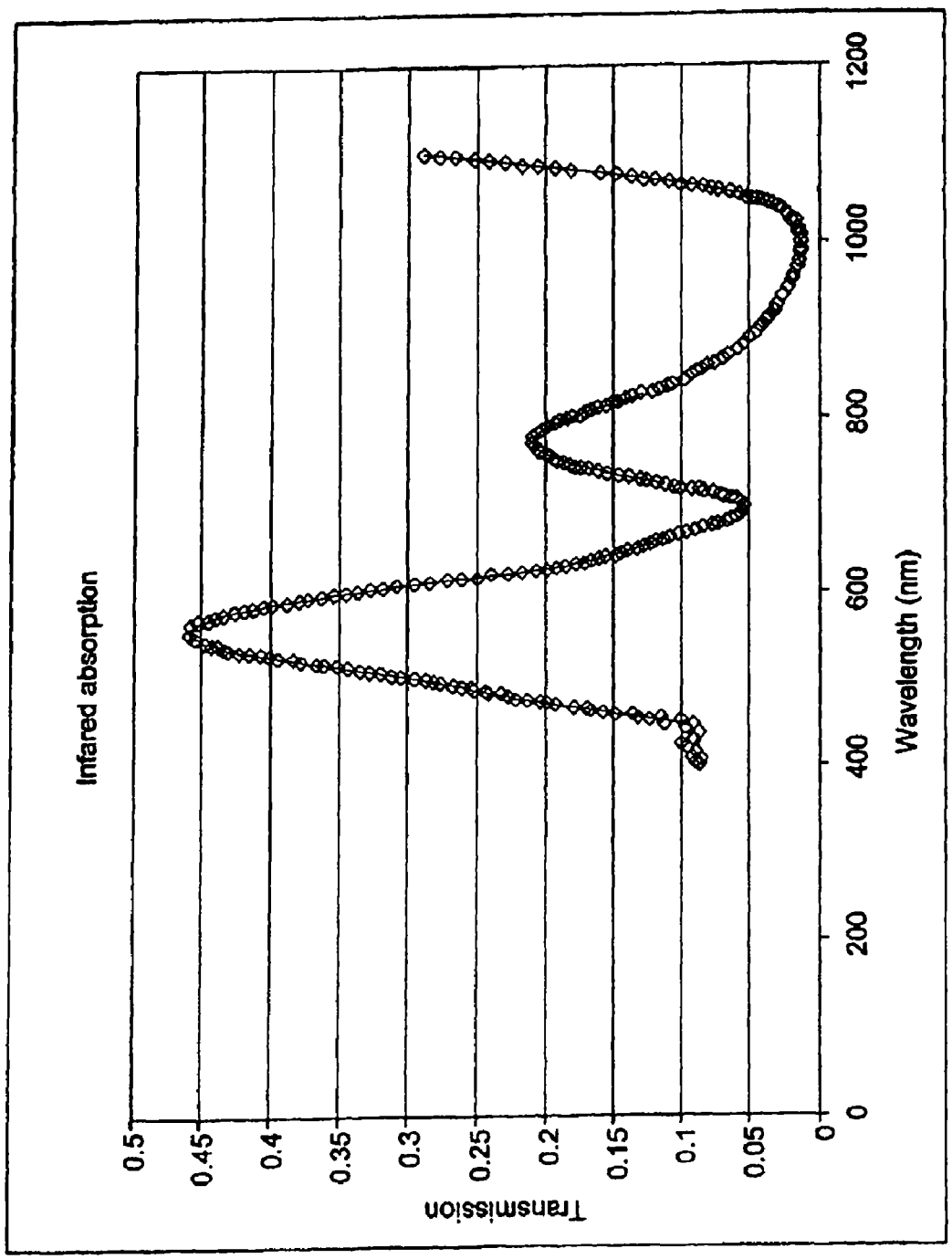

In an exemplary embodiment, the present invention includes, generally, a transaction card 500 may be comprised of base containing, transparent or translucent plastic layers 11, 17 and multiple features affixed to the transparent/translucent card 500 such as text 30, 32, 34, logos 50, embossed characters 35, magnetic stripe 42, signature field 45, holographic foil 15, RFID circuitry of similar description as described with respect to FIG. 2, 20 and opacity gradient 25 (FIGS. 5 and 6).

Card 500 also includes an optically recognizable compound, described above, for allowing the transparent or translucent transaction card 500 to be recognized by card reading devices, such as ATMs, and/or for allowing the transparent transaction card 500 to be recognized and counted during card fabrication. The optically recognizable compound on transparent card 500 is a substantially invisible or translucent infrared ink, mirror or film which blocks (absorbs or reflects) infrared light but transmits all other wavelengths of light (see FIG. 8). Card 500 can be used for credit, charge, debit, access, identification, information storage, electronic commerce and/or other functions.

Figure 10:
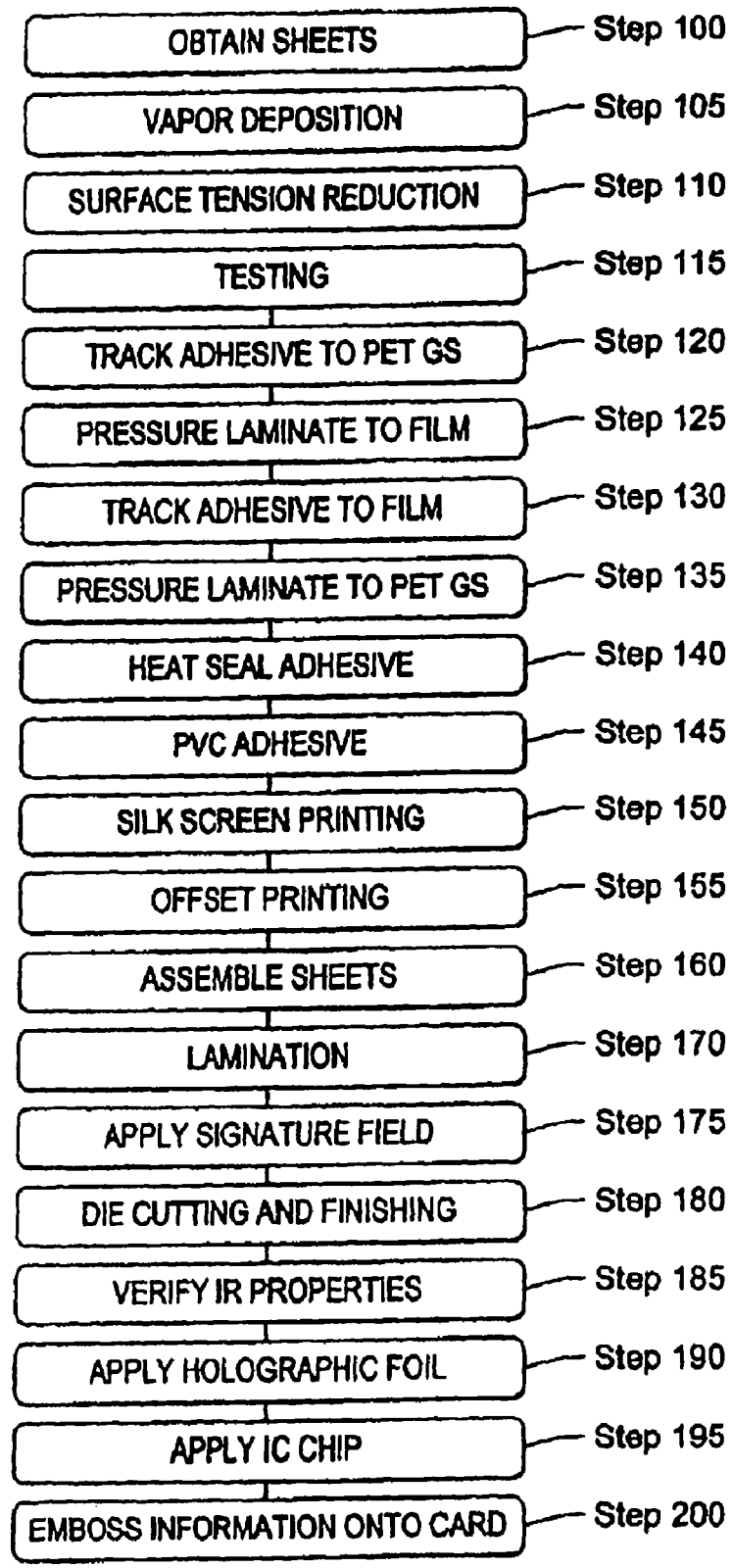
FIG. 10 is a flow diagram of the card fabrication process in accordance with an exemplary embodiment of the present invention.
Figure 14:
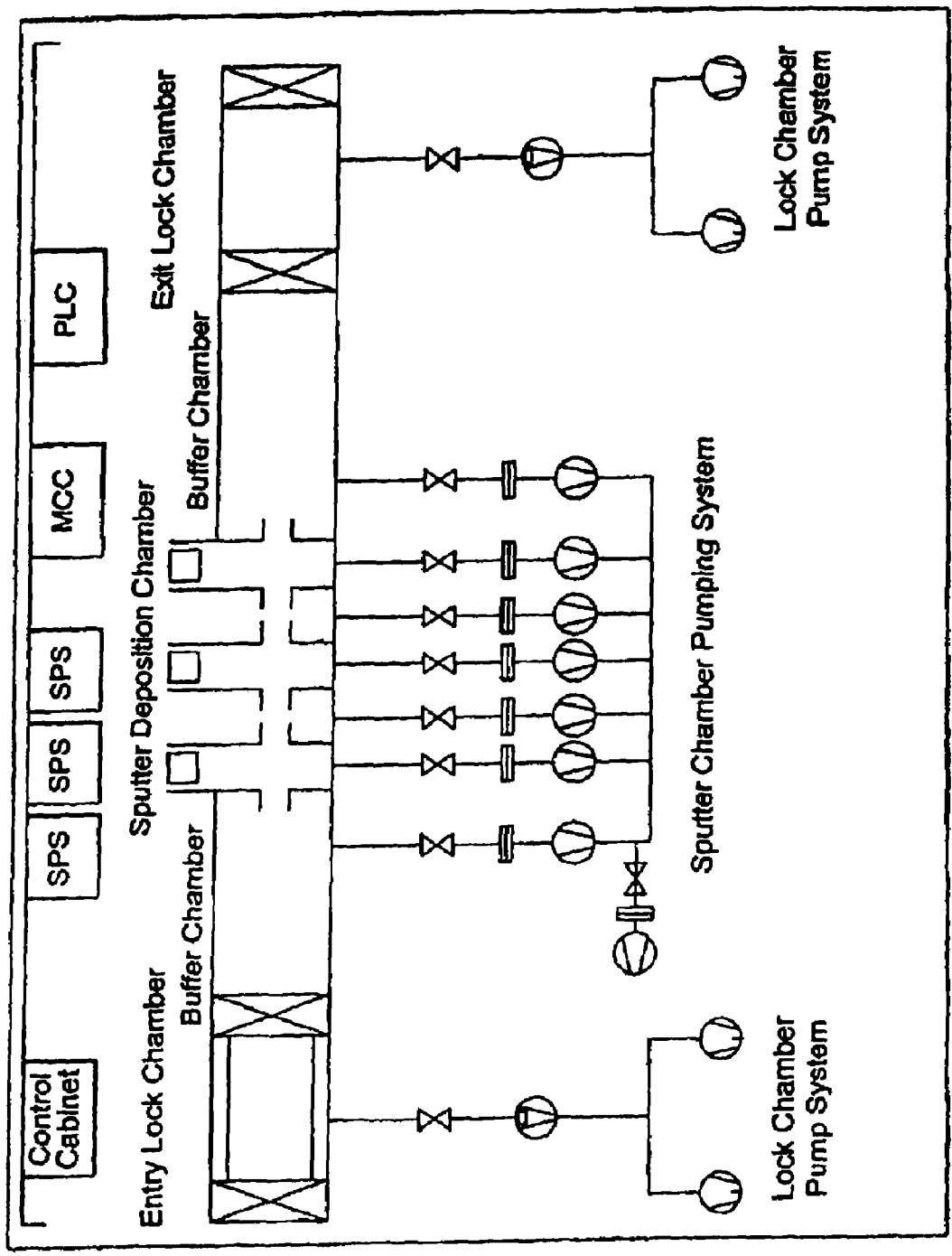
FIG. 14 shows an exemplary system for chemical vapor deposition of PET film in accordance with an exemplary embodiment of the present invention.

With respect to FIGS. 10 and 14, an exemplary process for manufacturing a transparent transaction card 500 is described. To fabricate card 500 having a front and back surface in accordance with an exemplary embodiment of the present invention, a front sheet 11 and back sheet 17 (FIGS. 5 and 6) consisting of a plastic substrate such as, for example, clear core PVC, are produced (step 100). One skilled in the art will appreciate that sheets 11 and 17 of card 500 may be any suitable transparent and/or translucent material such as, for example, plastic, acrylic and/or any combination thereof.

Each sheet 11, 17 is substantially identical and is preferably about 3'×4' (622 mm×548 mm) and about 0.005-0.350 inches, or more preferably 0.01-0.15 inches or 13.5 mil thick.

With respect to FIG. 11, the fabrication of the individual card sheets includes either direct layout (9 layers) of film or the use of a sub-assembly (2-5 layers). An exemplary subassembly consists of 5 layers of film with room temperature tack adhesive applied over thermoset and thermoplastic adhesives. In addition, the RFID circuitry for facilitating contactless transactions may be included integral to the subassembly or between one surface of the subassembly and any other card layer by locating the circuitry in an inlay.

In one particular embodiment, the RFID circuitry may be incorporated into an inlay interposed within layers of the transaction card. Alternatively, the RFID circuitry, and/or the inlay, may be made from polyvinyl chloride (PVC) in a subassembly including at least three layers: a core layer of machine recognizable ink, surrounded by a layer of PVC on either side. The inlay may be added to a surface of the machine recognizable material and laminated within the subassembly between one of the layers of PVC and the machine recognizable material.

Figure 11A:
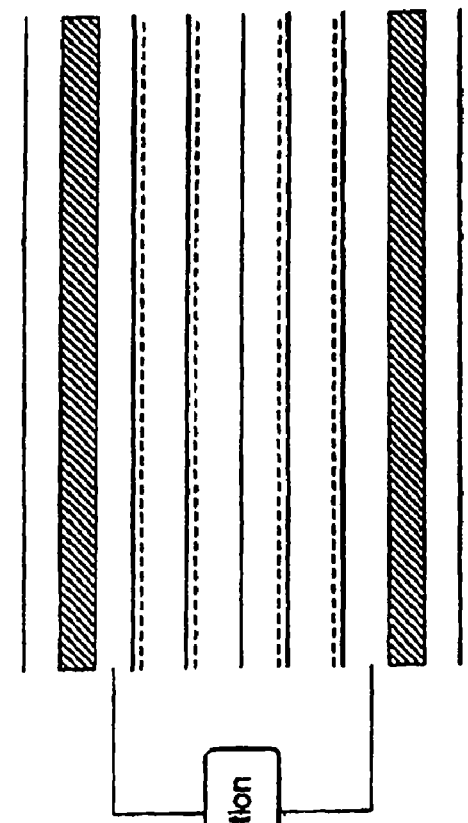
FIGS. 11A-11F shows exemplary embodiments of card layers in accordance with an exemplary embodiment of the present invention.
Figure 11B:
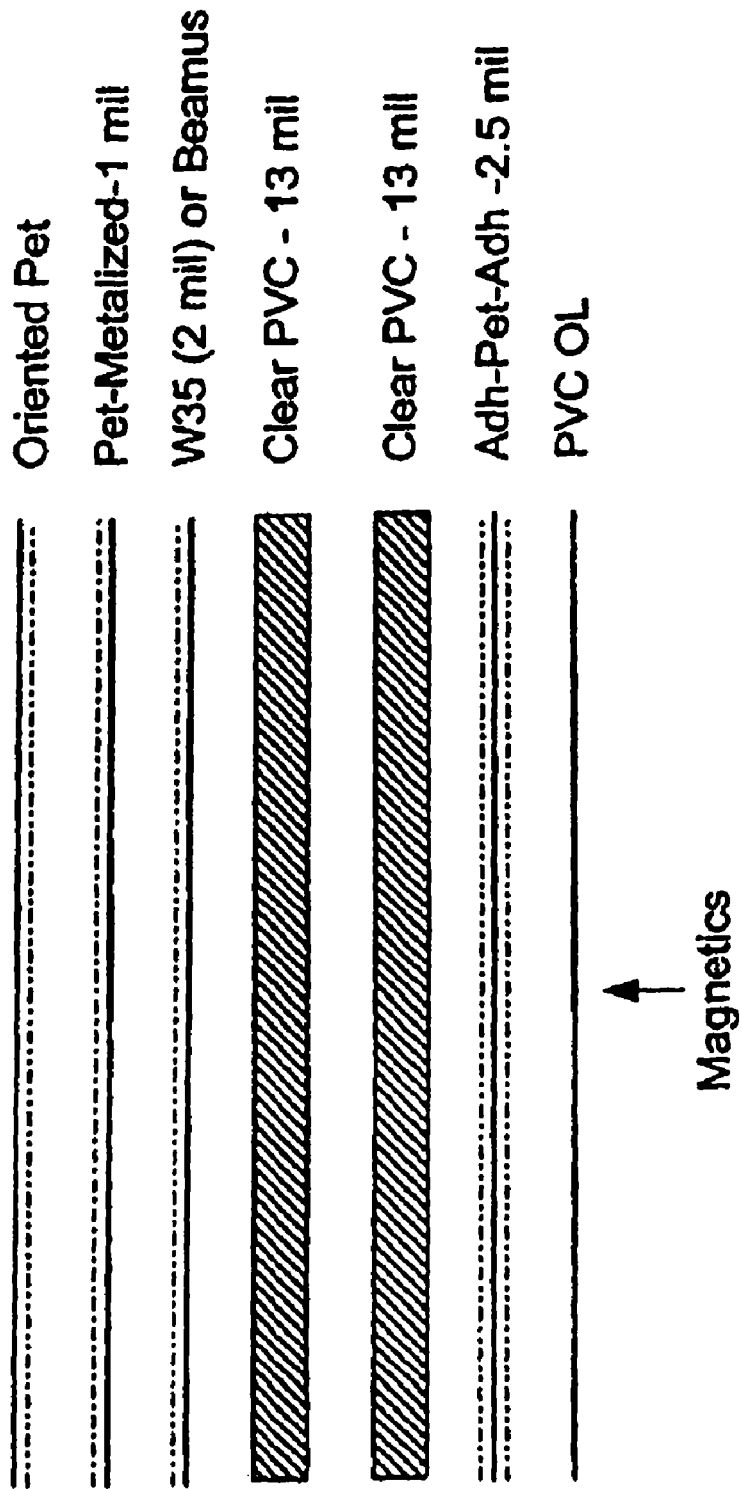
Figure 11C:
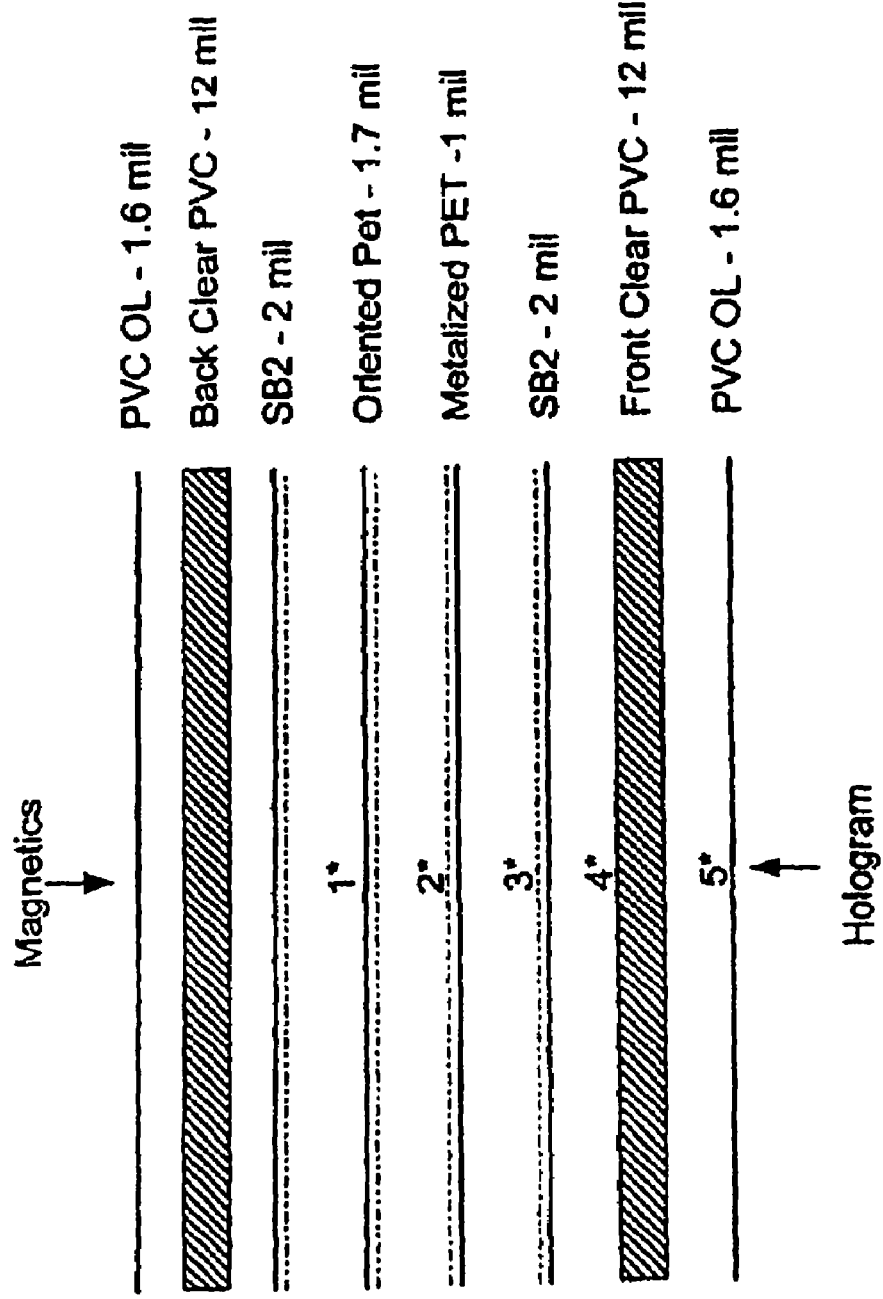
Figure 11D:
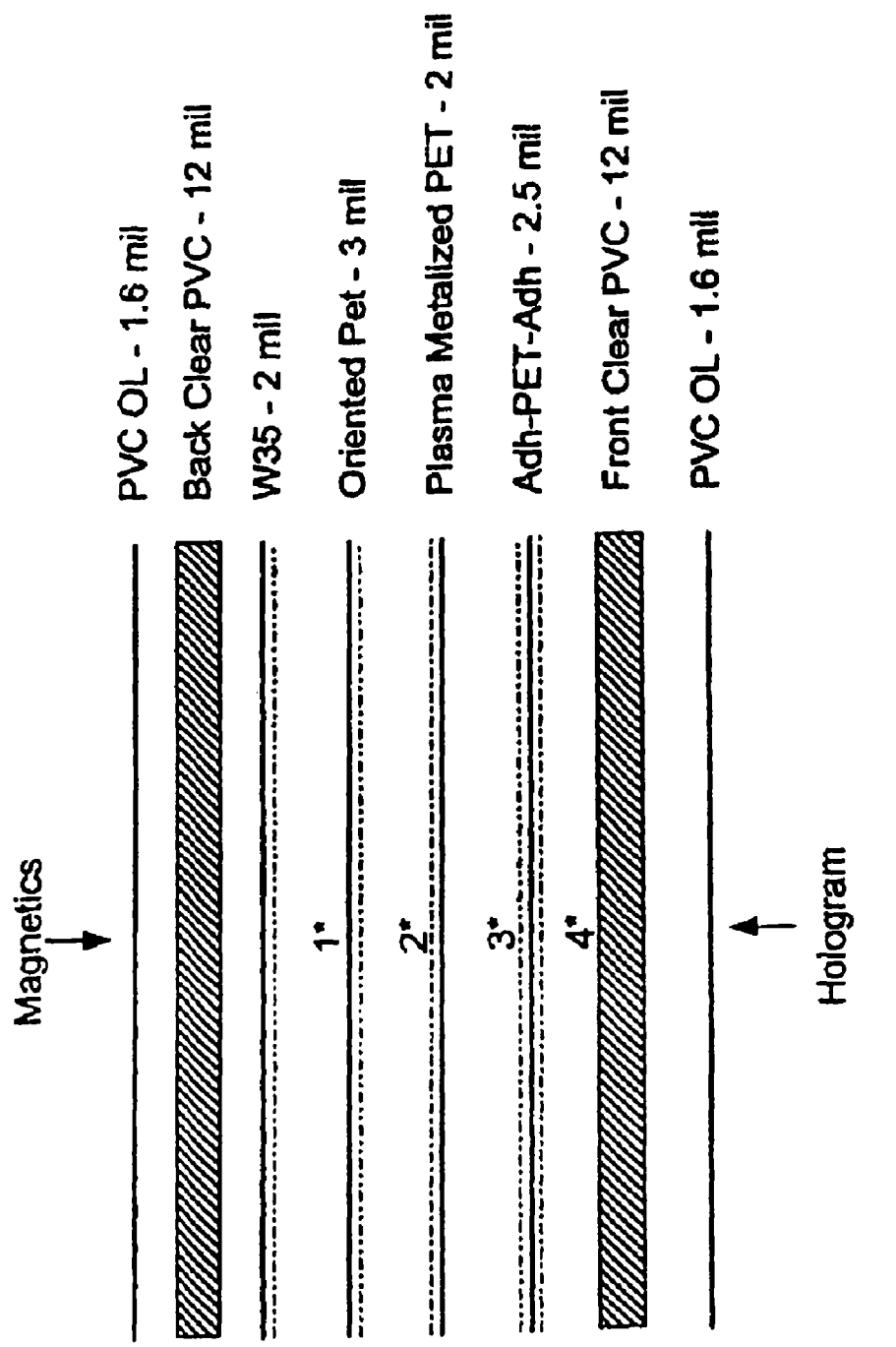
Figure 11E:
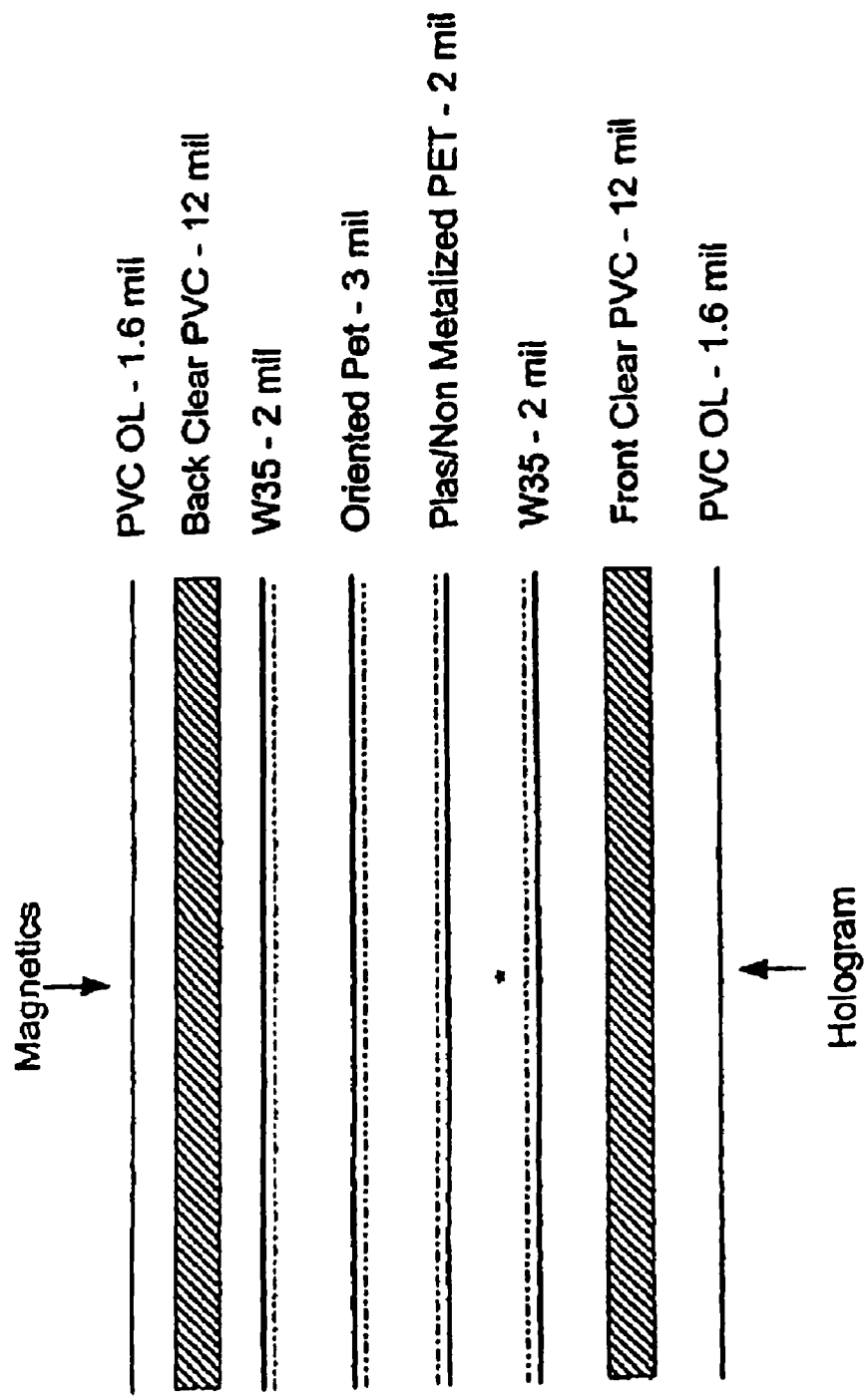
Figure 11F:
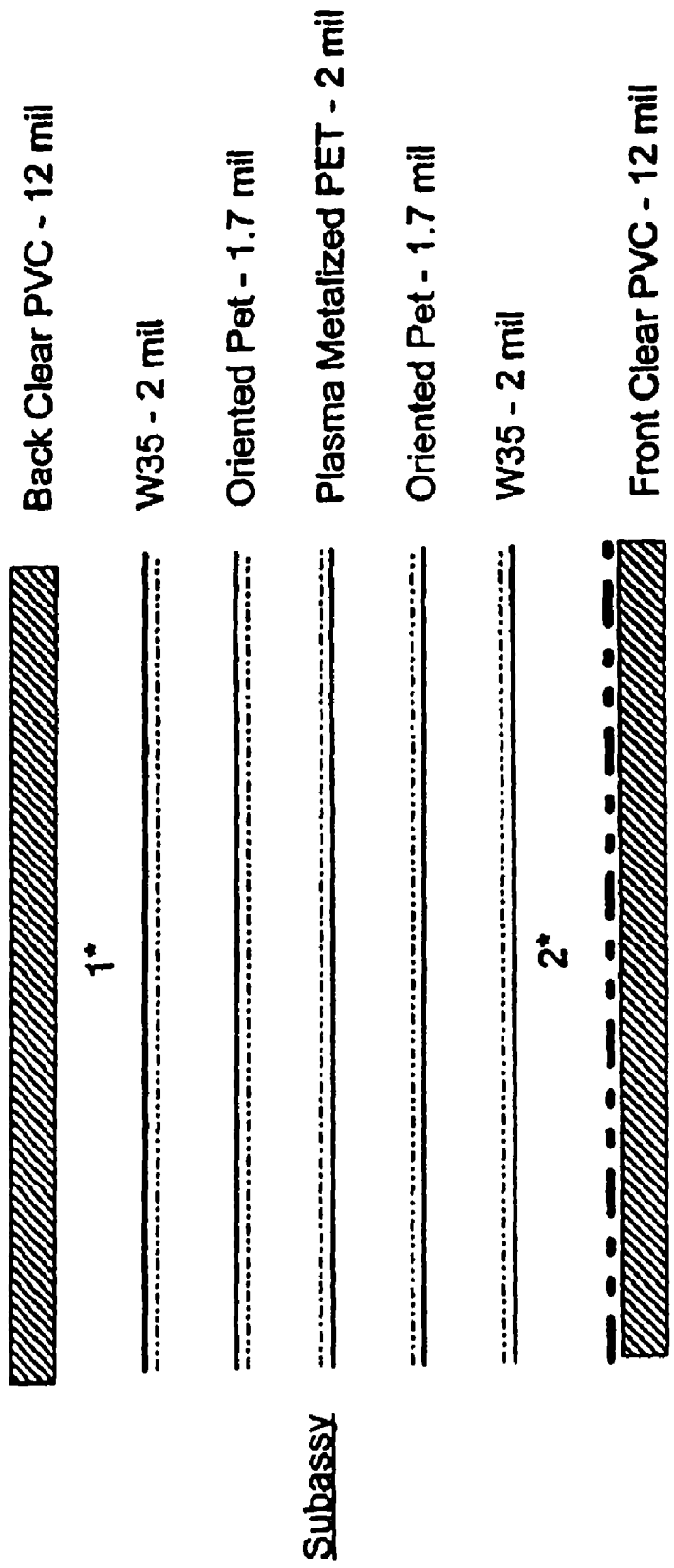

In another exemplary embodiment, the inlay may be adhered to the subassembly after the subassembly is laminated together, whereupon the subassembly and inlay are laminated to other layers of the transaction card to provide rigidity and strength. Preferably, the transaction card may include at least from five to seven layers (not including the adhesive layer). For example, as shown in FIG. 11A, the layers may be as follows: two layers of PVC on the outside of the card, which may be adhered to printable layers, and the aforementioned three layers of subassembly (two layers of PVC, one layer of optically recognizable compound). As noted, the inlay containing the RFID circuitry including the antenna may be embedded within any other layers according to the present invention. As described herein, the subassembly layers, or other layers within the card, may be milled to provide room for the RFID circuitry so that the card maintains a constant thickness and a smooth surface.

The resulting cards comprise (from the card front towards the card back) 2.0 mil outer laminate (PVC, polyvinylchloride) having the holographic foil, embossed surface, RFID circuitry, subassembly or inlay, and other indicia on its surface, 9.0 mil printed PVC core with print side out (card front), 2.0 mil PVC adhesive, 1.7 mil PET GS (extrusion coated polyethyleneterephthalate—gluable/stampable) manufactured by D&K (525 Crossen, Elk Grove Village, Ill. 60007), 2.0 mil PET IR blocking film, 1.7 mil PET GS, 2.0 mil PET adhesive, 9.0 mil printed PVC core with the print side out (card back), and 2.0 mil outer back laminate with a signature panel, applied magnetic stripe and other indicia. Optimally, the PET IR blocking film is fabricated in the middle of the layers to balance the card and minimize warping of the resulting card product. Other exemplary embodiments of the layers are shown in FIGS. 11B-11F, and described in U.S. Pat. No. 6,581,839 to Lasch.

Figure 12A:
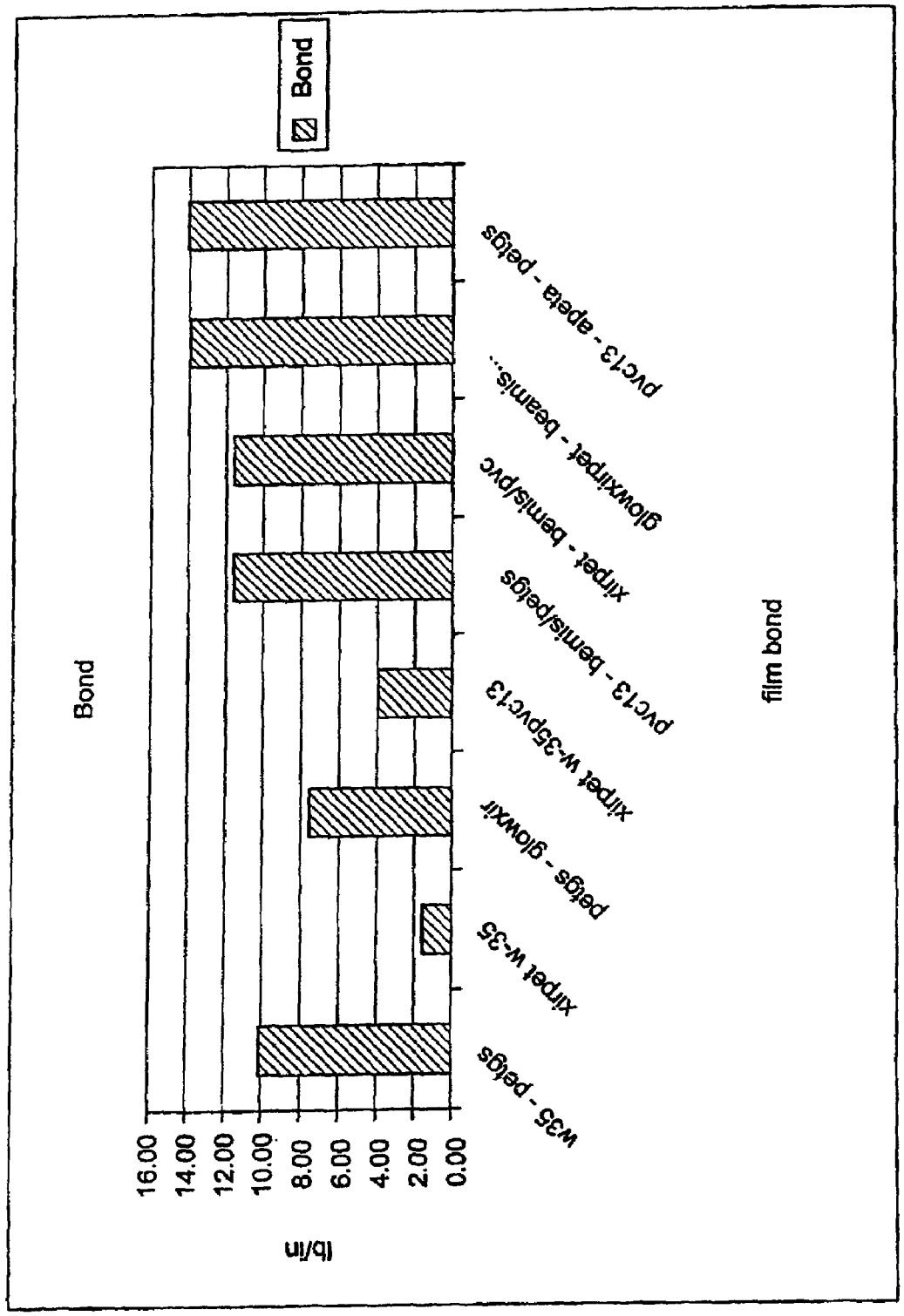
FIG. 12A shows exemplary film bond strengths on a graph of strength (lb/in) v. film bond for various film bonds in accordance with an exemplary embodiment of the present invention.
Figure 12B:
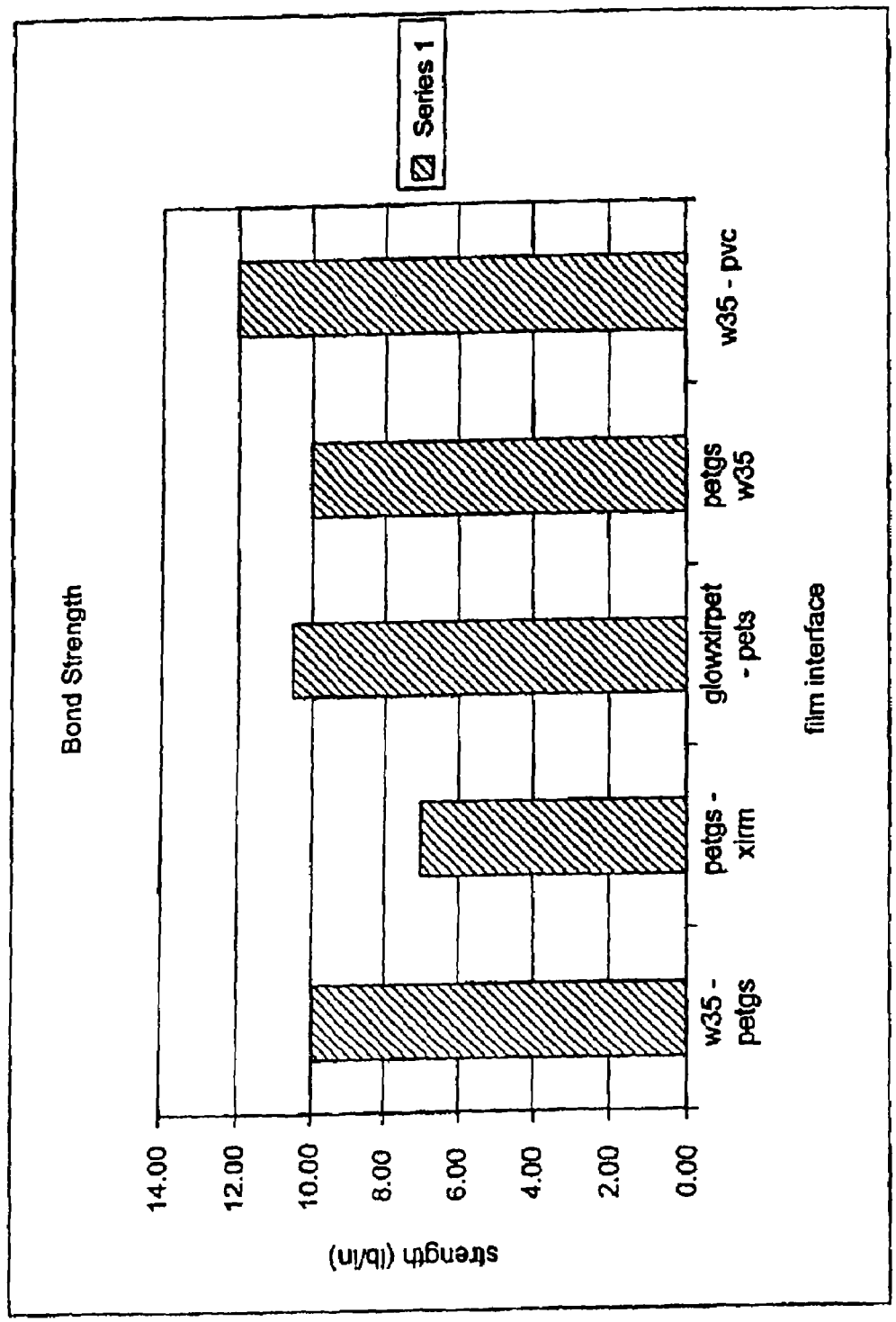
FIG. 12B shows exemplary bond strengths at the film interfaces on a graph of strength (lb/in) v. film interface for various film interfaces in accordance with an exemplary embodiment of the present invention.

FIG. 13 details exemplary embodiments of layers/sheets for card construction, including layer number, material, layer thickness (in mil), source/manufacturer of the material, comments regarding bond strength data and total thickness (in mil). With respect to FIG. 12A, the film bond strength is indicated on a graph of strength (lb/in) v. film bond for various film bonds. With respect to FIG. 12B, the bond strength at the film interfaces is indicated on a graph of strength (lb/in) v. film interface for various film interfaces.

After eventually combining the sheets (step 160), by preferably adhering the front sheet 11 on top of the back sheet 17, the total thickness of the transaction card 500 is about 0.032 in. (32 mil.), which is within the ISO thickness standard for smart cards. Because the RFID circuitry 20 is eventually embedded into the surface of the substrate (step 195), and the surface of chip 20 is co-extensive with the outer surface of the front sheet 10, the IC circuitry 20 does not affect the thickness of the overall card 500. Moreover, the about 3'×4' sheets include markings which define the boundaries of the individual cards 500 which will be cut from the sheet. Each exemplary sheet yields over 50 transaction cards (typically 56 cards), wherein each card 500 is within the ISO card size standard, namely about 2"×3.5".

In general, an exemplary process for construction of card 500 having an IR film includes chemical vapor deposition of PET film which has optimal visible and infrared properties (step 105). The chemical deposition is preformed by a Magnetron Machine manufactured by the Magnetron Company. With respect to FIG. 14, the process incorporates a roll chemical vapor deposition sputtering system with three coating zones. The Magnetron roll vapor deposition machine deposits evaporation batches containing Ag, Au and Indium oxide onto optical grade polyethyleneterephthalate using chemical vapor deposition. The Ag/Au/Indium layers are about 100 angstroms each and, depending on the lower wavelength reflections, about three to five layers exist. More details related to vacuum coating, solar coating and Magnetron sputtering can be found in, for example, "Handbook of Optical Properties, Volume I, Thin Films for Optical Coatings" edited by Rolf Hummel and Karl H. Guenther, 1995, CRC Press, Inc, the entire contents of which is hereby incorporated by reference.

Next, plasma or flame treatment is applied to the PET film for surface tension reduction of the film (step 110). During the deposition and assembly of the layers, the IR film is monitored to optimize the IR blocking spectrum. Thus, the film is then tested against a standard by using a spectrophotometer to test the visible and infrared properties of the PET film (step 115). With respect to FIG. 9, a reflection and transmission monitor with various optical components for vacuum evaporation in-line roll coating operations is utilized to monitor the IR film. In-line spectrophotometric monitoring is part of the vapor deposition process. Transmission at various wavelengths is monitored during the entire run. A tack adhesive is applied to PET GS (polyethyleneterephthalate—gluable/stampable) (step 120) and a pressure laminate is applied to the Indium Oxide metal surface of the PET IR blocking film (step 125). Next, a tack adhesive is applied to the PET side of the IR blocking film (step 130) and a pressure laminate is applied to the PET GS (step 135). Exemplary lamination conditions include 280F. degrees and 600 psi for 22 minutes, then cooled under pressure for about 18 minutes. A heat seal adhesive is applied to both outer sides of the PET GS, or alternatively, a PVC adhesive is applied to both outer sides of the PET GS (step 140).

In an exemplary embodiment, certain compounds are printed over the surface of sheets 11 and 17. One skilled in the art will appreciate that the printing of the text 30, 32, 34, logos 50, optically recognizable ink and opacity gradient 25 may be applied to any surface of card 5 such as, for example, the front 11 face, the rear 17 face, the inside or outside surface of either face, between the two sheets of base material and/or a combination thereof. Moreover, any suitable printing, scoring, imprinting, marking or like method is within the scope of the present invention.

The opacity gradient 25 and optically recognizable ink are printed onto the sheets by a silk screen printing process (step 150). With respect to the opacity gradient 25, the exemplary gradient is comprised of a silver pearl ink gradation having an ink stippling which is more dense at the top of card 500 and gradually becomes less dense or clear as it approaches the bottom of card 500. One skilled in the art will appreciate that the opacity gradient 25 can be any density throughout the gradient 25 and the gradient 25 can traverse any direction across card 500 face. The opacity gradient 25 can be formed by any substance which can provide a similar gradient 25 on card 5. The exemplary ink gradient 25 for each card 500 is printed using known printing inks suitably configured for printing on plastic, such as Pantone colors. In an exemplary embodiment, the ink used for the stippling 25 is a silver pearl ink and is applied to the outside surface of each plastic sheet. Ink gradient 25 is printed on the surface of each of the sheets using a silkscreen printing process which provides an opaque, heavier ink coverage or using offset printing process which provides halftone images in finer detail. A trademark or logo, such as the words "American Express," may be printed in Pantone 8482 using a similar silkscreen process.

More particularly, with respect to silk screen printing, artwork containing the desired gradient 25 is duplicated many times to match the number of individual cards 500 to be produced from the sheets. The duplicated artwork is then suitably applied to a screen by any suitable known in the art photo-lithographic process and the screen is then developed. The screen is placed over the sheet and ink is suitably washed across the surface of the screen. The exposed portions of the screen allow the ink to pass through the screen and rest on the sheet in the artwork pattern. If multiple colors are desired, this process can be repeated for each color. Moreover, other security features are optionally silk printed on card 500 such as, for example, an invisible, ultraviolet charge card logo (visible in black light) is printed in a duotone of Pantone 307 and 297 using offset and silk screen presses.

The text 30, 32, 34 and logo 50 are printed on the outside surface of each sheet by a known printing process, such as an offset printing process (step 155) which provides a thinner ink coverage, but clearer text. More particularly, with respect to offset printing, the artwork is duplicated onto a metal plate and the metal plate is placed onto an offset press-printing machine which can print up to four colors during a single run. The offset printed text includes, for example, a corporate name 30, a copyright notice 33, a batch code number 34, an "active thru" date 32, contact telephone numbers, legal statements (not shown) and/or the like. The exemplary offset text is printed in 4 DBC in opaque white ink or a special mix of Pantone Cool Gray 11 called UV AMX Gray.

Because the resulting card 500 is transparent, the text can be seen from both sides of card 500. As such, if the text is only printed on one sheet, the text may be obscured when viewing the text from the opposite side of card 500 (in other words, viewing the text "through" the plastic substrate). To minimize the obscuring of the text, the front sheet 11 is printed on its outside surface with standard format text and the back sheet 17 is printed on its outside surface with the same text, but the text is in "reverse" format. The back 17 text is aligned with the text on the front face 11, wherein the alignment of the text is aided by card 500 outline markings on the full sheet. Certain text or designs which may be obscured by an compound of card 500 (magnetic stripe 40, transponder system/RFID circuitry 20, etc.) may be printed on only one sheet. For example, in an exemplary embodiment, the corporate logo 50 is printed on only one sheet and is located behind the RFID circuitry 20, thereby being hidden from the front 10 view and hiding at least a portion of the circuitry 20 from the back 17 view. One skilled in the art will appreciate that any of the offset printing can occur on the outside or inside surface of the sheets.

The sheet of laminate which is applied to the back 17 of card 500 (step 170) preferably includes rows of magnetic stripes 40, wherein each magnetic stripe 40 corresponds to an individual card 500. The magnetic stripe 40 extends along the length of card 500 and is applied to the back 17 surface, top portion of card 500 in conformity with ISO standards for magnetic stripe 40 size and placement. However, the magnetic stripe 40 may be any width, length, shape, and placed on any location on card 500. The two track magnetic stripe 40, including the recorded information, can be obtained from, for example, Dai Nippon, 1-1, Ichigaya Kagacho 1-chome, Shinjuku-ku, Tokyo 162-8001, Japan, Tel: Tokyo 03-3266-2111. In an exemplary embodiment, the magnetic stripe is applied to the outer laminate using a tape layer machine which bonds the cold peel magnetic stripe to the outer laminate roll with a rolling hot die and at suitable pressure. The roll is then cut into sheets at the output of the tape layer before the card layers are assembled and the stripe is fused to the card during the lamination process.

Although prior art magnetic stripes 40 in current use are black, in a particularly exemplary embodiment, the magnetic stripe 40 of the present invention is a silver magnetic stripe 40. Exemplary silver magnetic stripe 40 is 2750 oersted and also conforms to ISO standards. Moreover, the silver magnetic stripe 40 includes printing over the magnetic stripe 40. The printing on the magnetic stripe 40 can include any suitable text, logo 50, hologram foil 15 and/or the like; however, in an exemplary embodiment, the printing includes text indicative of an Internet web site address. Dai Nippon Printing Co., Ltd (more information about Dai Nippon can be found at www.d-np.co.jp) prints a hologram or text on the mag stripe using, for example, the Dai Nippon CPX10000 card printer which utilizes dye sublimation retransfer technology having a thermal head which does not contact the card surface. The card printer utilizes the double transfer technology to print the image with the thermal head over a clear film and then re-transferring the printed image onto the actual card media by heat roller. The printing of information on the surface of the magnetic stripe 40 is preformed by, for example, American Banknote Holographics, 399 Executive Blvd., Elmsford, N.Y. 10523, (914) 592-2355. More information regarding the printing on the surface of a magnetic stripe 40 can be found in, for example, U.S. Pat. No. 4,684,795 issued on Aug. 4, 1987 to United States Banknote Company of New York, the entire contents of which is herein incorporated by reference.

After the desired printing is complete and the magnetic stripe applied, the front 11 and back 17 sheets are placed together (step 160), and the sheets are preferably adhered together by any suitable adhering process, such as a suitable adhesive. One skilled in the art will appreciate that, instead of printing on two sheets and combining the two sheets, a single plastic card 500 can be used, wherein card 500 is printed on one side, then the same card 500 is re-sent through the printer for printing on the opposite side. In the present invention, after adhering the sheets together, a sheet of lamination, approximately the same dimensions as the plastic sheets, namely 3'×4', is applied over the front 10 and back 17 of card 500. After the laminate is applied over the front 11 and back 17 of the combined plastic sheets (step 170), card 500 layers are suitably compressed at a suitable pressure and heated at about 300 degrees, at a pressure of between 90-700 psi, with a suitable dwell time to create a single card 500 device. The aforementioned card fabrication can be completed by, for example, Oberthur Card Systems, 15 James Hance Court, Exton, Pa.

In an exemplary embodiment, the card layers are fused together in a lamination process using heat and pressure. During the hot press phase, the press is heated to about 300° F. and the pressure builds to about 100 psi and holds for about 90 seconds. The pressure then ramps up to about 350 psi over an about 30 second period and holds for 16 minutes at the same temperature, namely 300° F. The card is then transferred to a cold press which is at about 57° F. The pressure builds to about 400 psi and is held for about 16 minutes as chilled water of about 57 is circulated in the plates. The cold press then unloads the card.

With respect to FIGS. 5 and 6, after the laminate is applied, a signature field is applied to the back surface 17 of card 500 (step 175) and the holographic foil 15 is applied to the front 10 of card 500 (step 190). With respect to signature field 45, although prior art signature fields are formed from adhering a paper-like tape to the back 17 of card 500, in an exemplary embodiment of the present invention, the signature field 45 is a translucent box measuring about 2" by ⅜" and is applied to the card using a hot-stamp process. The verification of the signature in signature field 45 by the merchant is often a card 500 issuer requirement for a merchant to avoid financial liability for fraudulent use of card 500. As such, the translucent signature field 45 on the transparent card 500 not only allows the clerk to view at least a portion of the signature field 45 from the front of the card 500, but the signature view also encourages the clerk to turn over card 500 and verify the authenticity of the signature with the signed receipt.

After the card sheets are laminated, the sheets are cut into individual cards 500 (step 180) by a known stamping process, including any necessary curing, burrowing, heating, cleaning and/or sealing of the edges. The individual transaction cards 500 are about 3"×4" and conform to ISO standards for transaction card 500 shape and size. In an exemplary embodiment, the laminated sheets of 56 cards are suitably cut in half on a guillotine device, resulting in two half-sheets of 28 cards. The half-sheets are loaded onto a card punch machine which aligns the sheets to a die (x and y axes) using predetermined alignment marks visible to the optics of the machine. The half-sheets are then fed under the punch in seven steps. Particularly, a fixed distance feed is followed by another optic sensor search to stop the feed at the pre-printed alignment mark, then the machine punches a row of four cards out at one time. After die cutting and finishing according to standard processing, the IR reflection properties are verified in-line (step 185) before application of the holographic foil 15.

With respect to the application of an exemplary holographic foil, the holographic foil 15 is adhered to card 500 (step 190) by any suitable method. In an exemplary embodiment, a substantially square steel die, which is about 1¼"×1¼" with rounded corners and a 0.0007" crown across the contacting surface, stamps out the individual foils 15 from a large sheet of holographic foil 15. The die is part of a hot stamp machine such that the die is sent through a sheet of foil 15, cutting the foil 15 around a particular image and immediately applying the foil 15 with heat to the front 10 surface of card 5 after the card has been laminated. The die temperature is in the range of about 300° F.+/−10° F. The dwell time is approximately ½ seconds and the application speed is set based upon the individual hot stamp applicator; however, the foregoing temperature and dwell is identified for a speed of 100 cards per minute. U.S. Pat. Nos. 4,206,965; 4,421,380; 4,589,686; and 4,717,221 by Stephen P. McGrew provide more details about hot stamping of a holographic image and are hereby incorporated by reference.

With respect to the holographic foil 15, the foil 15 can be any color, contain any hologram, can be applied to any location on card 500, and can be cut to any size, shape and thickness. In an exemplary embodiment, the holographic foil 15 sheet preferably includes a gray adhesive on the bottom side and a blue, mirror-like, three-dimensional holographic surface on the top side containing numerous holographic images about 1¼"×1¼" each. The exemplary hologram includes a 360 degree viewability and diffracts a rainbow of colors under white light. The full color hologram is created by, for example, American Banknote Holographics.

The corners of the individual foil 15 are preferably rounded to minimize the likelihood that the foil 15 will peal away from the surface of card 500. Moreover, when applied to the card, the blue holographic surface faces away from card 5 while the gray adhesive side is applied to card 500 surface. The top surface of the holographic foil 15 may be created by any suitable method such as reflection holographics, transmission holographics, chemical washing, the incorporation of mirror compounds and/or any combination thereof. The holographic foil 15 can be fabricated by, for example, American Banknote Holographics, Inc. located at 1448 County Line Road, Huntingdon Valley, Pa. 19006.

The exemplary holographic foil includes various layers. One skilled in the art will appreciate that any ordering, combination and/or composition of these layers which provides a similar holographic effect is still within the scope of the present invention. In an exemplary embodiment, the holographic transfer foil structure includes the following layers: 90 gauge polyester carrier, release coat, embossable resin, vacuum deposited aluminum, tie coat and size coat. During the transfer process, the embossable resin, vacuum deposited aluminum, tie coat and size coat layers are deposited onto a substrate.

In an exemplary embodiment, the sheets of holographic foil 15 are transmission holograms suitably created by interfering two or more beams of converging light, namely an object beam and reference beam, from a 20 watt Argon laser at 457.9 nm, onto a positive photoemulsion (spun coat plates using shiply photoresist). The system records the interference pattern produced by the interfering beams of light using, for example, a 303A developer. The object beam is a coherent beam reflected from, or transmitted through, the object to be recorded which is preferably a three-dimensional mirror. The reference beam is preferably a coherent, collimated light beam with a spherical wave front 10.

The incorporation of the holographic foil 15 onto a transaction card 500 provides a more reliable method of determining the authenticity of the transaction card 500 in ordinary white light, namely by observing if the hologram has the illusion of depth and changing colors. Thus, to allow the hologram to be viewed with ordinary, white light, when the hologram is recorded onto the transaction card 500 the image to be recorded is placed near the surface of the substrate. Moreover, the hologram is be embossed on a metallized carrier, such as the holographic foil 15, or alternatively the hologram may be cast directly onto the transparent plastic material. When formed on the clear plastic material, the hologram is made visible by the deposit of a visible substance over the embossed hologram, such as a metal or ink. More information regarding the production of holograms on chargecards 500 or the production of holographic foil 15 can be found in, for example, U.S. Pat. No. 4,684,795 issued on Aug. 4, 1987 to United States Banknote Company of New York or from the American Banknote Holographics, Inc. web site at www.abnh.com, both of which are herein incorporated by reference.

In an exemplary embodiment, the application of holographic foil onto vinyl credit cards is accomplished by using a metallized credit card foil. The foil is un-sized, metallized, embossable, abrasion, and chemical resistant hot stamping foil on a 1.0 mil (92 gauge) polyester carrier. All of the exemplary materials are tinted with raw materials supplier color code #563 (blue). The foil is vacuum metallized with aluminum and has an optical density range of about 1.60 to 2.00. The optimum foil is free of visible defects and particulate matter. The foil contains release characteristics of about 0 to 7 grams based upon a release testing unit having a die face of 300° F., 80 psi, 1.0 seconds dwell, 0.1 seconds delay in the removal of the carrier at a 45 degree angle. An exemplary base material is capable of receiving a permanent, high fidelity (based upon an embossing die of 100%, having at least 70% diffraction efficiency) impression of the holographic image surface by embossing with a hard nickel die in the range of about 1600 pounds per linear inch at about 100 pounds air pressure and in the range of about 200 to 350° F. die temperatures. When testing the embossibility of the base material, the testing includes a primary and secondary image to assure the embossable coating is capable of producing an optimal secondary image.

With respect to the mechanical and chemical durability of the holographic foil, the foil resists abrasions. As such, after sizing and stamping the foil onto the vinyl credit card, the transferred hologram withstands about 100 cycles on the Taber Abrader using CS-10 wheels and about a 500 gram load before signs of breakthrough. The foil resists scuffing such that the foil withstands about 6 cycles on Taber Abrader under the same conditions without any substantial visual marks, scratches or haze. The holographic foil also resists any substantial evidence of cracking the vinyl in the hologram area when embossed on a DC 50000 encoder or an equivalent system. Moreover, the embossed, un-sized foil on the polyester carrier is capable of being stretched 15% without cracking of the base coat. Moreover, the exemplary vinyl card with the exemplary hologram withstands 15 minutes in an oven at 110° C. with the image clearly visible after the test. Additionally, the exemplary hologram does not show any visible effects after 5 cycles of 8 hours at 0° and 16 hours at 60° C. The exemplary holograms on the vinyl cards also resist plasticizers, alkalis, acids and solvents. In particular, the cards with holograms withstand immersion in warm liquid plasticizers (typically dioctyl phthalate) up to the point of severe swelling of the card. The image on the card is not substantially affected by contact with plasticized vinyl for a period of 5 days at 60° C. With respect to alkalis, the holograms on the cards withstand approximately 1 hour immersion in 10% ammonium hydroxide at room temperature without deterioration. Moreover, the hologram does not show substantial deterioration after 50 hours of immersion at room temperature in artificial alkaline perspiration (10% sodium chloride, 1% sodium phosphate, 4% ammonium carbonate, and pH 8.0). With respect to acids, the exemplary holograms on the cards substantially withstand approximately 1 hour immersion in 10% acetic acid at room temperature without substantial deterioration. Moreover, the exemplary hologram substantially withstand, without substantial deterioration, 50 hours immersion at room temperature in artificial acetic perspiration (10% sodium chloride, 1% sodium phosphate, 1% lactic acid, pH 3.5).

With respect to solvents, the exemplary holograms on cards substantially withstand the following: ethylene glycol (100% and 50% in water) with no substantial effects after 4 hours at room temperature, ethyl alcohol (100% and 50% in water) with no substantial effect after 4 hours at room temperature, methyl ethyl ketone has no substantial effect after 1 minute at room temperature, toluene has no substantial effect up to severe swelling of the card (30 minutes at room temperature), water has no substantial effect after 16 hours at 60°

C. and concentrated laundry detergent has no substantial effect after 20 hours at room temperature.

Moreover, the exemplary holograms on the vinyl cards do not show substantial effects after being washed and dried in a commercial washer and dryer inside a pants pocket at permanent press settings.

The charge card substrate is comprised of a vinyl base or other comparable type material which is suitably capable of accepting a hot stamping of a hologram without substantially violating the present composition of the hologram or its coatings. When adhering the hologram to the vinyl card, the coating exhibits a consistent blush and is uniform in color, viscosity and free of contamination. The adhesion of the hologram to the card is also sufficiently strong enough such that the application of Scotch 610 tape over the hologram which is removed at a 45° angle will not result in a significant amount of foil removed from the substrate.

With respect to the brightness of the image, a diffraction reading is obtained at a minimum of about 2 microwatts on the registration blocks. Moreover, with respect to image quality, the images are substantially free of defects such as large spots, scratches, wrinkles, mottle, haze, and/or any other defects which substantially distort the image.

The final exemplary product is slit at a width of 1 53/64"+/- 1/64" and length of 10,000 images per roll. The registration block is located no more than about 5/64" from the edge of the slit material. All finished rolls are wound with the metal side facing in on a 3.0" ID core with a maximum of 3 splices permitted per finished reel and the registration blocks are 0.125"×0.125" square.

After stamping out the individual cards 500 and applying the holographic foil, the RFID circuitry 20 may be applied to card 500 (step 195) by any suitable method, such as adhesive, heat, tape, groove and/or the like. More particularly, a small portion of the front 11 of card 500 is machined out using, for example, a milling process. The milling step removes about 0.02 mils of plastic from the front 11 surface, such that the routed hole cuts into the two core layers of plastic, but does not go through the last outer laminate layer of plastic, thereby forming a 5235HST pocket. RFID circuitry 20 may include a 5235 palladium plated with silver, rather than the standard gold plating. Circuitry 20 may be applied to the card using a process known as "potting". Any suitable adhesive, such as a non-conductive adhesive, is placed into the machined hole and the RFID circuitry 20, including antenna, is placed over the adhesive such that the topmost surface of the circuitry 20 and antenna are substantially even with the front 10 surface of card 500. Suitable pressure and heat is applied to the circuitry 20 to ensure that the circuitry 20 is sufficiently affixed to card 500. As noted, the circuitry 20 is any suitable RFID circuit located anywhere on card 500. In an exemplary embodiment, the RFID circuit 20 structure, design, function and placement conforms to ISO standards for IC chips and smart cards. Further, the antenna may be any suitable antenna for use with a RFID transponder for facilitating contactless transactions. The antenna may take any form, shape or arrangement permitting the antenna to be positioned for receipt of an interrogation signal. Such methods for constructing and arranging RFID antennas are well known and will not be repeated here for brevity.

After applying the holographic foil 15 and the RFID circuitry 20 to card 500, certain information, such as account number 35 and "active thru" 32 date (not shown), are preferably embossed into card 500 (step 200) by known embossing methods. The embossing can be completed by, for example, Oberthur Card Systems. Although any information can be embossed anywhere on card 500, in a particularly exemplary embodiment, the account numbers 35 are embossed through the holographic foil 15 to reduce the possibility of the transfer of the holographic foil 15 to a counterfeit card 500 for fraudulent use. Additionally, although prior art cards 500 include a beginning and ending validity date, the present card 500 may only include an "active thru" 32 date, namely a date in which the card expires.

While the foregoing describes an exemplary embodiment for the fabrication of card 500, one skilled in the art will appreciate that any suitable method for incorporating text 30, 32, 34, logos 50, embossed numbers 35, a magnetic stripe 42, a signature field 45, holographic foil 15, an RFID circuitry 20 and opacity gradient 25 (see FIGS. 1 and 2) onto a substrate is within the scope of the present invention. Particularly, the holographic foil 15, RFID circuitry 20, logo 50, magnetic stripe 40, signature field 45 or any other compound may be affixed to any portion of card 500 by any suitable means such as, for example, heat, pressure, adhesive, grooved and/or any combination thereof.

In another exemplary embodiment, the transaction card may have a plurality of perforations through one or more layers of the multilayer transaction card. Alternatively, the transaction card may have infrared-blocking ink printed on a layer of the transaction card thereby giving the transaction card the appearance of having perforations in one or more layers (both called "perforations" herein for ease in understanding). In this way, the perforations can be arranged to form an outline of a shape, a picture, a security enhancing visage or the like. Suitable methods for providing perforations are disclosed in U.S. Ser. No. 10/288,945, entitled "PERFORATED TRANSACTION CARD," filed Nov. 6, 2002, incorporated herein by reference in its entirety.

Figure 15A:
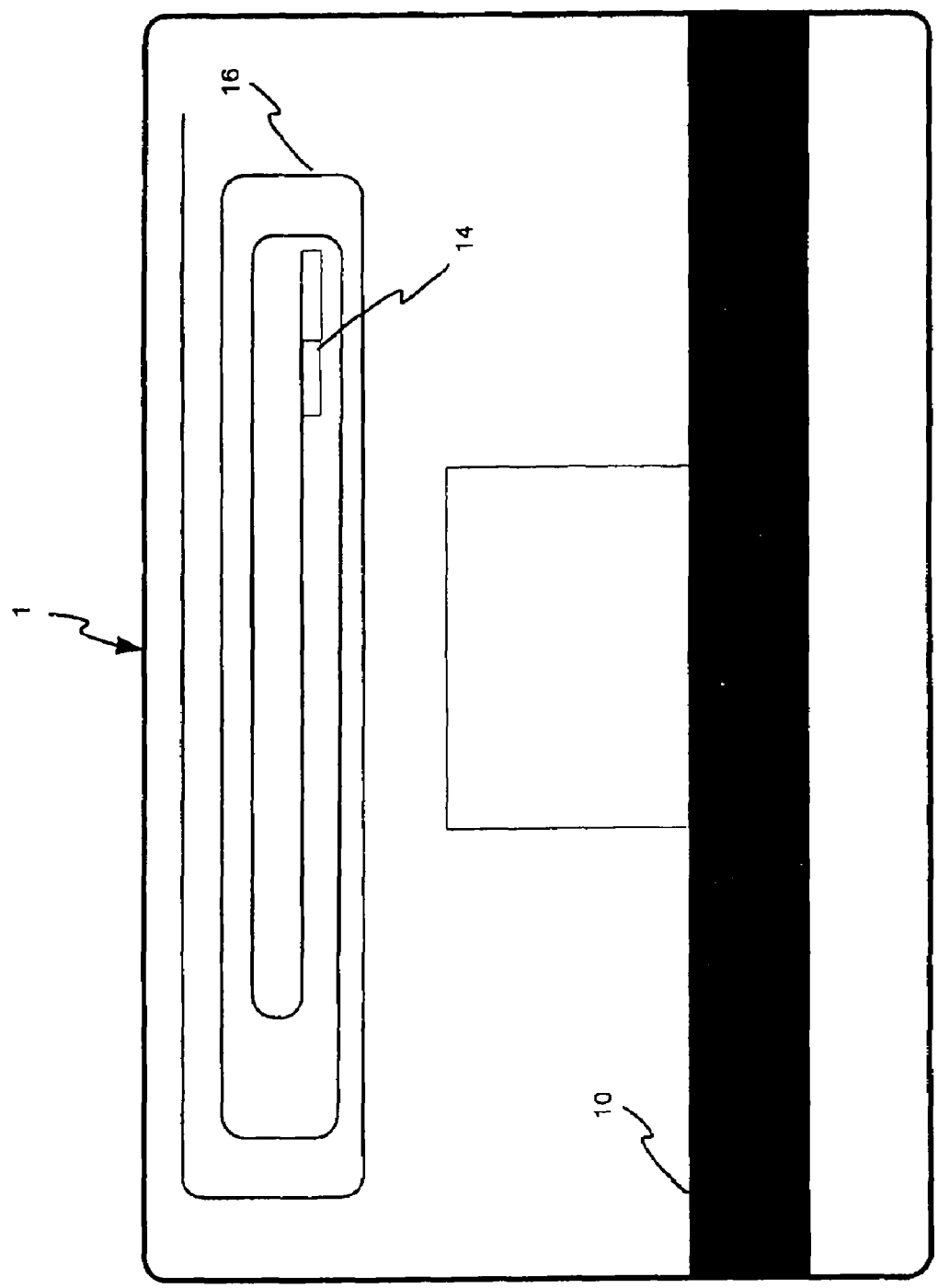
FIGS. 15A-15B illustrate plan views of a back side and front side, respectively, of a transparent transaction card having RFID circuitry including an antenna coil embedded therein in accordance with an exemplary embodiment of the present invention.
Figure 15B:
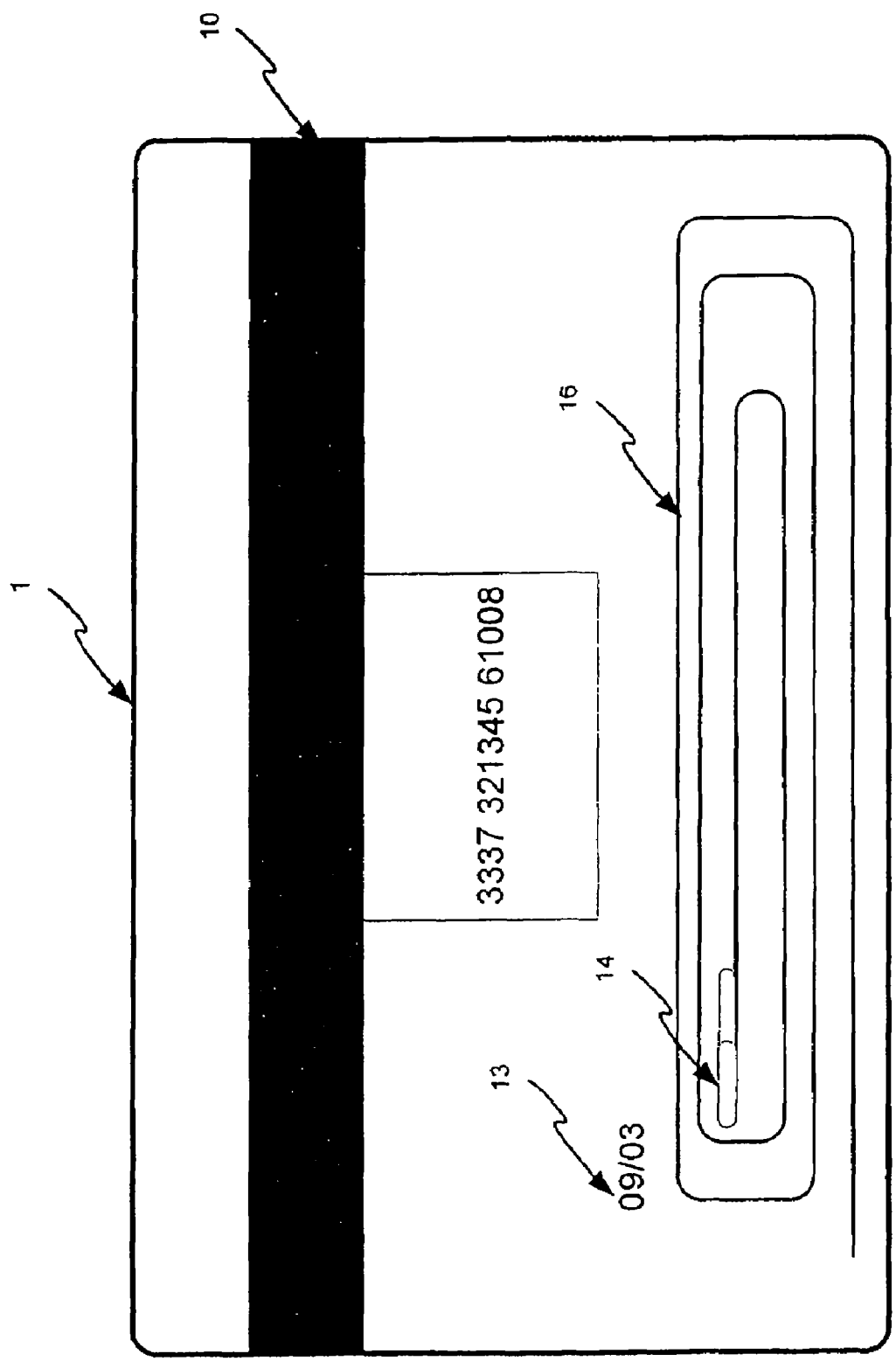
Figure 16:
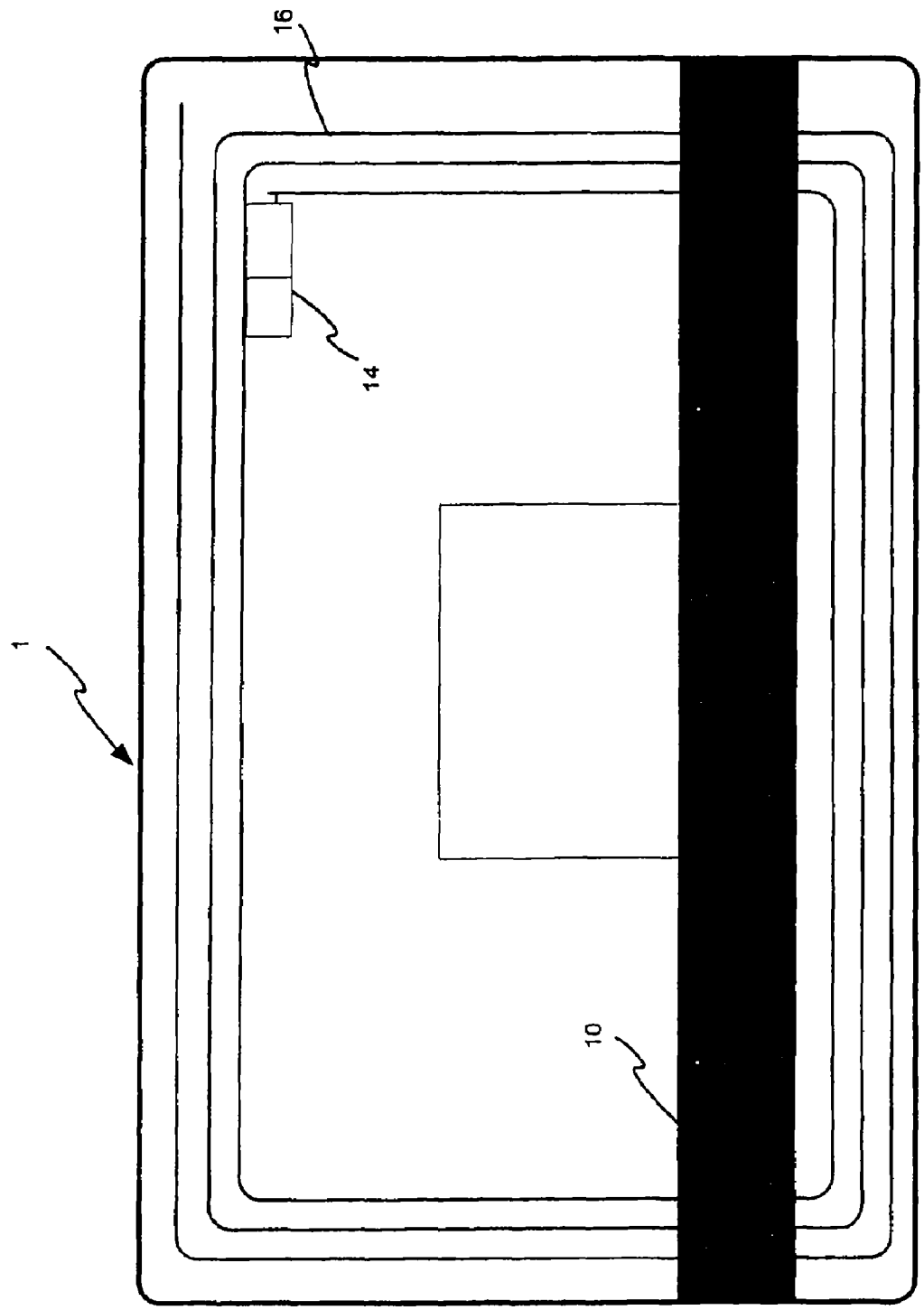
Figure 17:
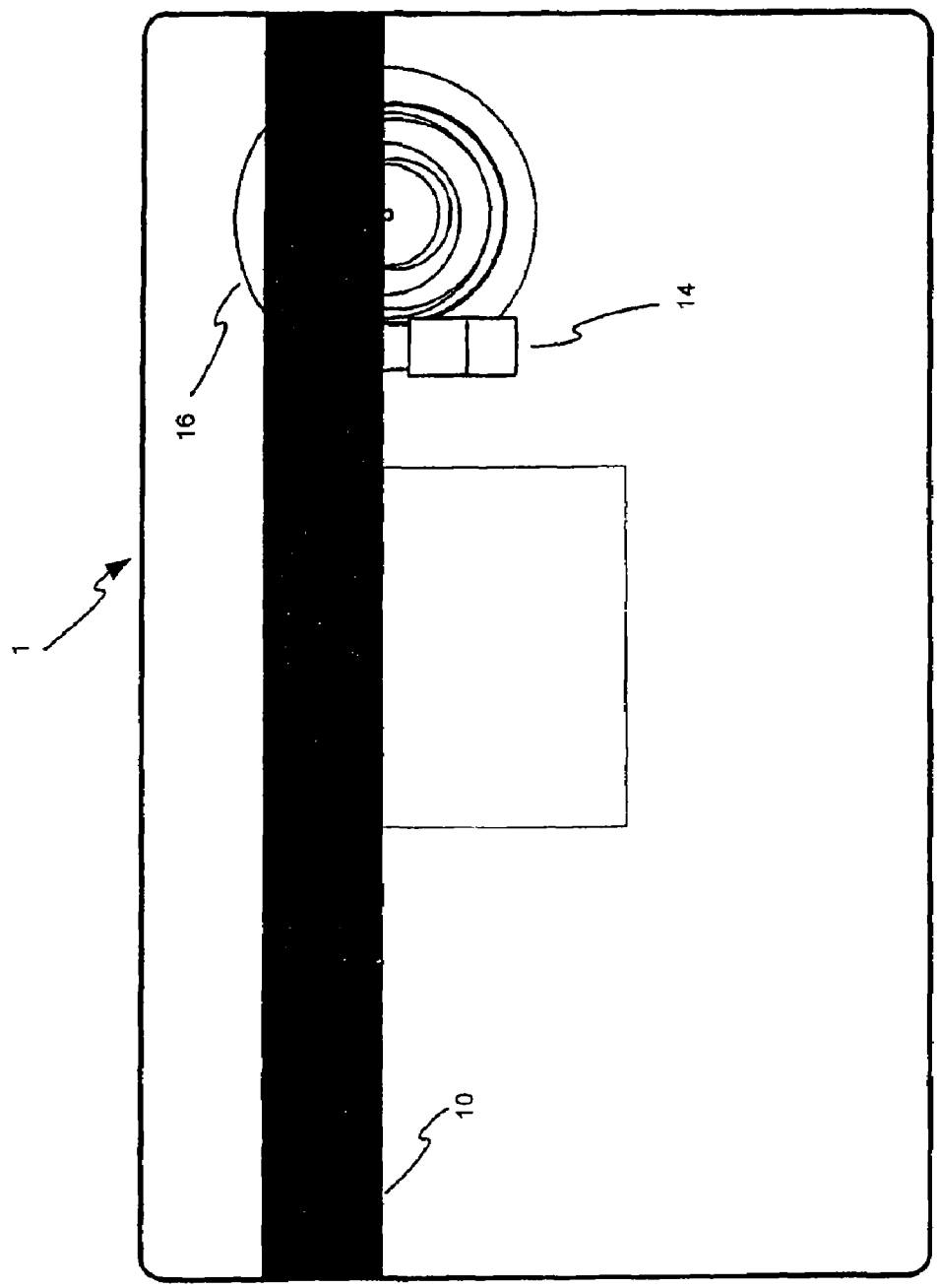

FIGS. 15A through 18, illustrate exemplary transparent transaction cards constructed in accordance with the present invention. The transaction cards may be partially, substantially and/or fully transparent throughout. To emphasize this point, FIGS. 15 through 18 show the contactless transaction card including an internally positioned antenna of varying arrangements and configurations which are visible through the card body. FIGS. 15A and 15B depict a transparent/translucent card 1 including a RFID circuit 20 and antenna coil 16 substantially coiled at one end of the card body. FIG. 15A depicts the card 1 from a frontal view, and FIG. 15B depicts card 1 from a rearward view. As can be seen, RFID circuitry 20 and coil 16 (an any other internal card components) are visible from the front and the rear of the card 1. Although not specifically stated with respect to FIGS. 16 and 17, it should be understood that the internal circuitry of those exemplary embodiments are also visible from the front and the rear of the cards depicted, in similar manner as described with respect to FIGS. 15A and 15B. For example, FIG. 16 illustrates RFID circuitry 20 and an antenna coil 16 that may be disposed along the edges of the transaction card 1. With respect to FIG. 17, a representation of a transparent transaction card having a RFID circuit 20 and circular antenna coil 16 is shown. It should be noted that the circular antenna pattern may be incorporated in any location of the transaction card and should not be limited as described herein with reference to FIG. 17. Also, the RFID circuitry 20 and antenna coil 16 may be as illustrated in FIG. 18, which illustrates circuitry 20 and antenna coil 16 formed in the shape of a rectangle that may be disposed in any location of the transparent transaction card.

The location of the RFID circuitry 20 and antenna coil 16 may, in general, be in any location within the transaction card such that the antenna coil may be aesthetically pleasing to a user of the transaction card or that provides an optimum or improved signal to an RF-based reader. For example, since the transaction card is transparent, the antenna coil may be readily seen, thereby providing the transaction card with a unique appearance and design. Alternatively, an antenna coil that is disposed along the periphery of the transaction card may provide a stronger and clearer signal to the RF-based reader when the transaction card is brought within a specific proximity of the RF-based reader.

In an exemplary process, a user of the contactless transparent transaction card simply approaches an RF-based reader when the user wishes to conduct a transaction using the transaction card. The item to be purchased or the service to be performed may be entered into the RF-based reader prior to, during and/or after presentation of the transaction card. The user simply waves the transparent transaction card at a certain distance from the RF-based reader until the RF-based reader acknowledges that the information contained in the RFID circuitry has been transferred to the RF-based reader. The RF-based reader then utilizes at least a portion of the information to complete the transaction.

Alternatively, the user of the card may approach a representative of a merchant and conduct a transaction. After the merchant's representative adds the information to the RF-based reader relating to the transaction, the user of the transparent transaction card simply waves the transparent transaction card a certain distance from the RF-based reader until the RF-based reader acknowledges that it has received the information contained in the RFID circuitry. The transaction then proceeds to completion. A user of the transparent transaction card may never need to relinquish control of the transaction card to any other individual, such as the merchant's representative, or to any other person. In addition, a signature may not be required. However, a signature may be included, or some other form of authentication may be used for high-risk purchases, for example.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the preceding detailed description is presented for purposes of illustration only and not of limitation, and the scope of the invention is defined solely by the appended claims and their legal equivalents when properly read in light of the preceding description. For example, the steps recited in any of the method or process claims may be executed in any order and are not limited to the order presented.

The invention claim is:

1. A card, a through portion of which is substantially transmissive to visible light, comprising:
 a machine recognizable compound containing an infrared blocking material, said machine recognizable compound substantially uniformly covering said card that is substantially transmissive to visible light; and
 a first transponder associated with said card, said first transponder responsive to a first RF interrogation signal.

2. The card of claim 1, wherein said card is at least one of a transaction card, identification card, smartcard, credit card, charge card, debit card, access card, information storage card, and electronic commerce card.

3. The card of claim 1, wherein said first transponder is operable to receive said first RF interrogation signal, authenticate said first RF interrogation signal, and transmit a transponder account data, said card further comprising:
 a transponder authentication circuit in communication with said first transponder for authentication of a first verification data; and
 a transponder database for storing said transponder account data, said transponder database in communication with said first transponder.

4. The card of claim 1, wherein said machine recognizable compound includes at least one of a chemical, solution, dye, layered material, pigment, encapsulated pigment, coating, film, thread, plastic, ink, concentrate, thermoplastic matrix, thermoset matrix, fiber, paper, and planchette.

5. The card of claim 1, wherein said machine recognizable compound includes at least one of an invisible, visible and colored compound.

6. The card of claim 1, wherein said machine recognizable compound includes an infrared ink.

7. The card of claim 1, wherein said machine recognizable compound includes an infrared ink comprising in the range of about 0.001 to 40.0 wt. (%) of an infrared activated material.

8. The card of claim 1, wherein said machine recognizable compound includes an optically recognizable compound.

9. The card of claim 1, wherein said machine recognizable compound is configured to at least one of block, diffuse, reflect, refract and absorb infrared light.

10. The card of claim 1, wherein said machine recognizable compound includes at least one of a binder, UV absorber, reflector, antioxidant, optical brightener, color shifter, chemical configured to improve processing, and chemical configured to adjust rheological properties.

11. The card of claim 1, wherein said machine recognizable compound includes PET plastic.

12. The card of claim 1, further comprising a transponder protocol/sequence controller configured to control the order of operation of said first transponder, a second transponder, said transponder authentication circuit, and said transponder database, said protocol/sequence controller in communication with at least one of said first transponder, said second transponder, said transponder authentication circuit, and said transponder database.

13. The card of claim 1, wherein said transponder includes a biometric circuit.

14. The card of claim 1, further comprising at least one of: a holographic foil, an integrated circuit chip, a magnetic stripe, an opacity gradient, embossed characters, signature field, text and logo, associated with said card.

15. The card of claim 1, wherein said transponder comprises at least one antenna operable to receive said interrogation signal.

16. The card of claim 1, wherein said machine recognizable compound substantially blocks infrared light from being transmitted through said portion that is substantially transmissive to visible light.

17. A card according to claim 1, wherein said transponder is configured to provide information in magnetic stripe format.

18. A card of claim 1, wherein said machine recognizable compound contains an infrared blocking material substantially covering said portion.

19. A method of fabricating a card at least a through portion of which is substantially transmissive to visible light, comprising:
 placing a substantially continuous machine recognizable compound over at least two layers of PET IR forming a subassembly, a portion of said subassembly being substantially transmissive to visible light; and placing RFID circuitry between at least one layer of the PET and the machine recognizable compound.

20. A method for fabricating a card including placing an IR film substantially continuously over two layers of PET GS, a combined portion of said layers and said IR film being substantially transmissive to visible light, and incorporating RFID circuitry between said two layers.

21. A card, a through portion of which is substantially transmissive to visible light, comprising:
  an infrared blocking material associated with all machine recognizable points of said portion that is substantially transmissive to visible light; and
  an RFID transponder associated with said card.

* * * * *

UNITED STATES PATENT AND TRADEMARK OFFICE
CERTIFICATE OF CORRECTION

| | | |
|---|---|---|
| PATENT NO. | : 7,607,583 B2 | Page 1 of 1 |
| APPLICATION NO. | : 11/871981 | |
| DATED | : October 27, 2009 | |
| INVENTOR(S) | : Michael J. Berardi et al. | |

It is certified that error appears in the above-identified patent and that said Letters Patent is hereby corrected as shown below:

On the Title page, Item (75) Inventors, please delete "Michael Bliman" and insert therefor
--Michal Bliman--.

Signed and Sealed this
Eighth Day of July, 2014

Michelle K. Lee
*Deputy Director of the United States Patent and Trademark Office*